US010747324B2

(12) United States Patent
Wakuda et al.

(10) Patent No.: US 10,747,324 B2
(45) Date of Patent: Aug. 18, 2020

(54) GESTURE INPUT SYSTEM AND GESTURE INPUT METHOD

(71) Applicant: Panasonic Intellectual Property Management Co., Ltd., Osaka (JP)

(72) Inventors: Daisuke Wakuda, Kyoto (JP); Takashi Matsumoto, Osaka (JP); Kenichi Ezaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/344,593

(22) PCT Filed: Oct. 27, 2017

(86) PCT No.: PCT/JP2017/038908
§ 371 (c)(1),
(2) Date: Apr. 24, 2019

(87) PCT Pub. No.: WO2018/084082
PCT Pub. Date: May 11, 2018

(65) Prior Publication Data
US 2019/0243451 A1    Aug. 8, 2019

(30) Foreign Application Priority Data

Nov. 2, 2016  (JP) ................................ 2016-215518
Nov. 11, 2016 (JP) ................................ 2016-220946

(51) Int. Cl.
*G06F 3/01* (2006.01)
*G06F 3/038* (2013.01)
*G06F 3/03* (2006.01)

(52) U.S. Cl.
CPC .............. *G06F 3/016* (2013.01); *G06F 3/011* (2013.01); *G06F 3/017* (2013.01); *G06F 3/0304* (2013.01); *G06F 3/038* (2013.01)

(58) Field of Classification Search
CPC .......... G06F 3/016; G06F 3/011; G06F 3/017; G06F 3/0304; G06F 3/038
See application file for complete search history.

(56) References Cited

U.S. PATENT DOCUMENTS 7,893,920 B2 *  2/2011  Endoh ................... G06F 3/0304
                                              345/156
9,405,373 B2 *  8/2016  Nakasu ................. G06F 3/0304
(Continued)

FOREIGN PATENT DOCUMENTS

JP       2005-292976      10/2005
JP       2008-18896        1/2008
(Continued)

OTHER PUBLICATIONS

International Preliminary Report on Patentability dated May 16, 2019 in International (PCT) Application No. PCT/JP2017/038908.
(Continued)

*Primary Examiner* — Tom V Sheng
(74) *Attorney, Agent, or Firm* — Wenderoth, Lind & Ponack, L.L.P.

(57) ABSTRACT

A gesture input system (100) that accepts a user operation based on a motion of a portion of the body of a user and that produces an input signal indicating a direction of the motion and/or an amount of the motion of the portion of the body, includes a sensor (1) that detects the motion of the portion of the body of the user, a tactile feeling presenting apparatus (3) that presents a tactile feeling at a base point (61) set inside a space, and a control apparatus (2) that sets a chasing point on the portion (50) of the body detected by the sensor and that produces the input signal based on a variation of the relative positional relation between the chasing point and the base point. The tactile feeling presenting apparatus (3) continuously presents the tactile feeling at the base point (61) during a time period for the gesture input system to be
(Continued)

in an input acceptable state where the gesture input system is able to accept the user operation.

15 Claims, 33 Drawing Sheets

(56) References Cited

U.S. PATENT DOCUMENTS

| | | | | |
|---|---|---|---|---|
| 2013/0100008 A1* | 4/2013 | Marti | ................. | G06F 3/011 345/156 |
| 2014/0237432 A1* | 8/2014 | Geurts | ................. | G06F 3/005 715/863 |
| 2015/0123919 A1* | 5/2015 | Yamada | ................. | G06F 3/013 345/173 |
| 2015/0277555 A1* | 10/2015 | Morishita | ................. | G06F 3/011 345/156 |
| 2016/0092062 A1 | 3/2016 | Miyagi et al. | | |
| 2016/0232713 A1* | 8/2016 | Lee | ................. | G06T 19/006 |
| 2016/0357264 A1* | 12/2016 | Tissot | ................. | B60K 35/00 |
| 2017/0011519 A1* | 1/2017 | Ohba | ................. | G06F 3/0346 |
| 2017/0115727 A1* | 4/2017 | Matsuike | ................. | G06F 3/005 |
| 2017/0262062 A1* | 9/2017 | Wakuda | ................. | G06F 3/017 |
| 2017/0364164 A1* | 12/2017 | Kim | ................. | G06F 3/0488 |
| 2018/0165514 A1* | 6/2018 | Lehtiniemi | ................. | G06F 3/0304 |
| 2018/0191990 A1* | 7/2018 | Motoyama | ................. | G06F 3/0304 |
| 2018/0203515 A1* | 7/2018 | Leppanen | ................. | G06F 3/0485 |
| 2018/0267627 A1* | 9/2018 | Kaneko | ................. | G06F 3/017 |
| 2018/0342106 A1* | 11/2018 | Rosado | ................. | G06T 19/20 |
| 2020/0033940 A1* | 1/2020 | Ohashi | ................. | G06F 3/012 |
| 2020/0050259 A1* | 2/2020 | Lam | ................. | G06F 3/011 |

FOREIGN PATENT DOCUMENTS

| | | |
|---|---|---|
| JP | 2014-148027 | 8/2014 |
| JP | 2014-219938 | 11/2014 |
| WO | 2015/086919 | 6/2015 |

OTHER PUBLICATIONS

International Search Report dated Jan. 9, 2018 in International (PCT) Application No. PCT/JP2017/038908.

* cited by examiner

*Fig.18*

|  | EMERGENCY DEGREE (HIGH) | EMERGENCY (LOW) |
|---|---|---|
| FREQUENCY OF TACTILE FEELING | HIGH FREQUENCY | LOW FREQUENCY |
| STRENGTH OF TACTILE FEELING | STRONG VIBRATION | WEAK VIBRATION |
| POSITION OF PRESENTATION | HEAD OR FACE | TRUNK OR HAND |
| TEMPERATURE (TEMPERATURE OF WIND OR LIKE) | COLD FEELING | WARM FEELING |
| STRENGTH OF WIND | STRONG WIND | WEAK WIND |

GESTURE INPUT SYSTEM AND GESTURE INPUT METHOD

TECHNICAL FIELD

This disclosure relates to a gesture input system that accepts an input in accordance with a motion of the body of a user, and a gesture input method of accepting an input in accordance therewith.

BACKGROUND ART

As to Patent Document 1, a virtual interface control apparatus disclosed in, for example. Patent Document 1 is present as an input control apparatus that accepts an input from a user in accordance with an operation of the user inside a space. The virtual interface control apparatus of Patent Document 1 includes a position detecting means that detects an operation position inside the space of the user, an input accepting means that accepts an input of the user when the operation position detected by the position detecting means is a predetermined input acceptance position, and an air ejecting apparatus that ejects air into the space to provide resistance resisting the operation of the user for the input acceptance position using an air flow.

With the virtual interface control apparatus of Patent Document 1, because the resistance resisting the operation of the user for the input acceptance position is provided using the air flow, the resistance (the tactile feeling) caused by the air flow enables the user to learn the position inside the space at which the operation is to be executed.

PRIOR ART DOCUMENT

Patent Document

Patent Document 1: Japanese Laid-Open Patent Publication No. 2005-292976

SUMMARY OF THE INVENTION

Problem to be Solved by the Invention

The system described in Patent Document 1 can cause the user to learn the position inside the space at which the operation is to be executed while this system does not present any tactile feeling to cause the user to perceive the move direction and the move distance of the hand of the user in the operation for the virtual input device.

This disclosure provides a gesture input system and a gesture input method that each can cause a user to perceive the direction and the operation amount of a user operation.

Means for Solving Problem

In a first aspect of this disclosure, a gesture input system is provided that accepts a user operation based on a motion of a portion of the body of a user and that produces an input signal indicating the direction of the motion and/or the amount of the motion of the portion of the body. The gesture input system includes a sensor that detects the motion of the portion of the body of the user, a tactile feeling presenting apparatus that presents a tactile feeling at a base point set inside a space, and a control apparatus that sets a chasing point on the portion of the body detected by the sensor and that produces an input signal based on a variation of a relative positional relation between the chasing point and the base point. The tactile feeling presenting apparatus continuously presents a tactile feeling at the base point during a time period for the gesture input system to be in an input acceptable state where the gesture input system can accept any user operation.

In a second aspect of this disclosure, a gesture input method of accepting a user operation based on a motion of a portion of the body of a user and producing an input signal indicating a direction of the motion and/or the amount of the motion of the portion of the body is provided. According to the gesture input method, a sensor detects the motion of the portion of the body of the user, a tactile feeling presenting apparatus presents a tactile feeling at a base point set inside a space, a control apparatus sets a chasing point on the portion of the body detected by the sensor, and the control apparatus produces an input signal based on a variation of a relative positional relation between the chasing point and the base point. The tactile feeling presenting apparatus continuously presents a tactile feeling at the base point during a time period for an input acceptable state to be established where any user operation is acceptable.

In a third aspect of this disclosure, an electronic device is provided that includes the gesture input system or that executes the gesture input method.

Effect of the Invention

According to the gesture input system and the gesture input method of this disclosure, a user can perceive the reference position for a gesture operation and can perceive the move direction and the move amount for the reference position when the user performs a gesture operation inside a space. The convenience of the gesture operation can thereby be improved.

BRIEF DESCRIPTION OF DRAWINGS

FIG. 18 is a diagram explaining the method for tactile feeling presentation, that varies the tactile feeling in accordance with the level of the emergency degree.

MODES FOR CARRYING OUT THE INVENTION

Embodiments of the present invention will be described below with reference to the accompanying drawings.

First Embodiment

A gesture input system described below is an apparatus that enables a gesture input of a user. The "gesture input" is an input method of delivering an intention for an operation of the user using a motion of at least a portion of the body of the user (such as, for example, a hand). The gesture input system outputs a signal that indicates an operation based on a motion of the body of the user (operation information) to an electronic device or the like. The electronic device or the like executes an order correlated with the operation in accordance with the operation based on the motion of the body of the user detected by the gesture input system.

1. Configuration of Gesture Input System

Figure 1:
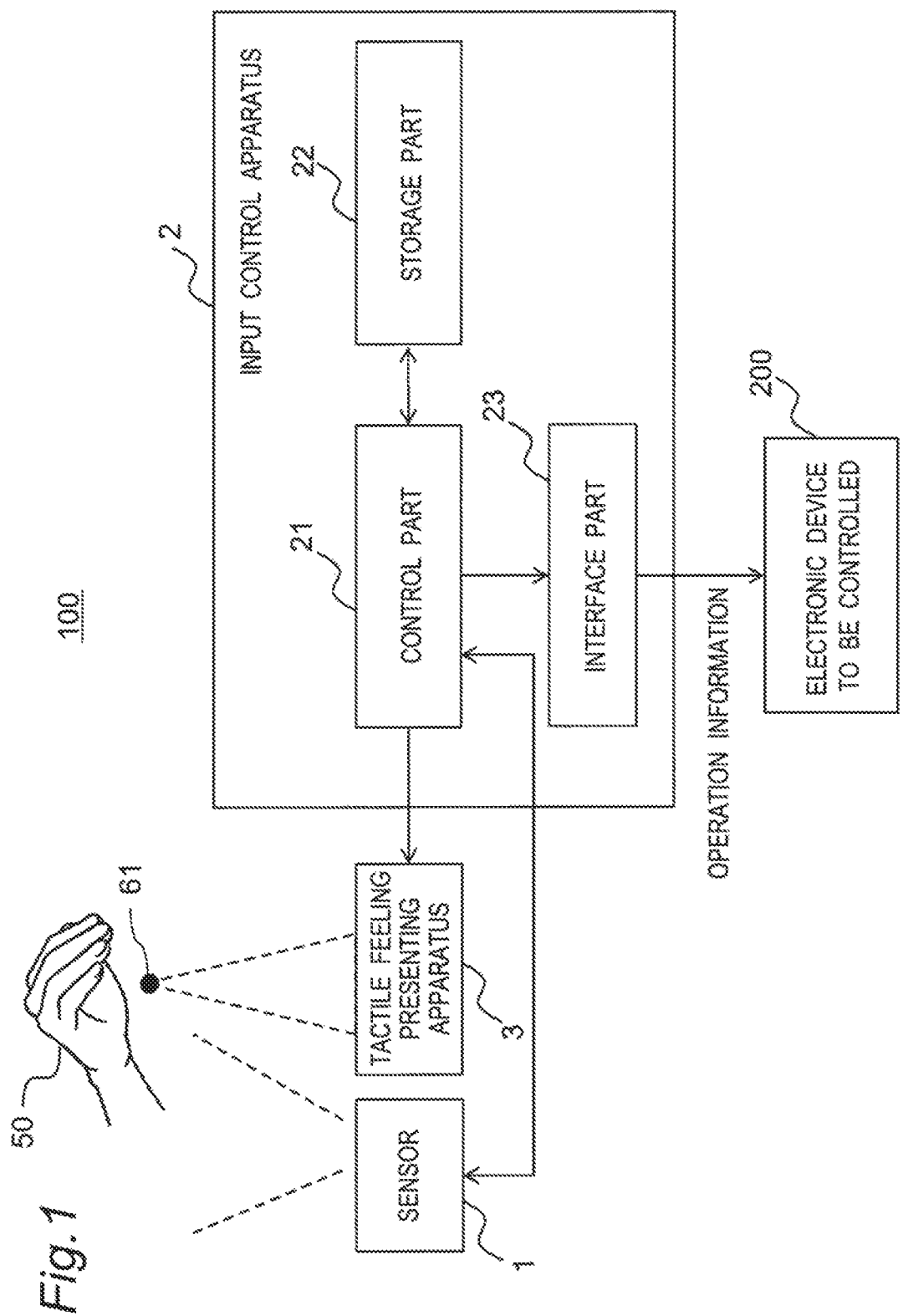
FIG. 1 is a block diagram of the configuration of a gesture input system in a first embodiment of this disclosure.

FIG. 1 is a diagram of the configuration of a gesture input system of the first embodiment of this disclosure. A gesture input system 100 of this embodiment includes a sensor 1 that detects a motion of the body of the user, an input control apparatus 2 that accepts a gesture input of the user based on an output of the sensor 1, and a tactile feeling presenting apparatus 3 that presents a tactile feeling to the user in accordance with the control by the input control apparatus 2.

The sensor 1 is a sensor capable of detecting a motion of an object in a predetermined range, and includes a vision sensor such as a camera. For example, the sensor 1 is a range image sensor (a TOF sensor) or a laser sensor that is capable of three-dimensionally detecting a motion of an object in a non-contact manner. The sensor 1 only has to be able to detect a motion of a human body and may also be, for example, an ultrasonic sensor, an IR sensor, or a visible light sensor.

The sensor 1 detects a motion of a portion of the body of the user. The sensor 1 acquires the three-dimensional coordinates of a reference point as information relating to the motion of the reference point. In this embodiment, the portion of the body to be detected is a hand of a human. The site to be detected may be another site of the body and may also be the upper body, the face, a finger, a finger tip, or the like of the human.

The input control apparatus 2 detects an operation by the user based on the motion of the hand of the user detected by the sensor 1, and outputs information that indicates a user operation. The input control apparatus 2 includes a control part 21 that determines the gesture input, a storage part 22 that has various types of information necessary for the control stored therein, and an interface part 23 to execute communication with an external device. The control part 21 can be realized by a semiconductor element or the like, and includes a microcomputer, a CPU, an MPU, a DSP, an FPGA, an ASIC, or the like. The control part 21 may include only hardware or may be realized by a combination of hardware and software. The control part 21 outputs the information that indicates the user operation determined based on the output of the sensor 1 to an electronic device 200 to be controlled. The electronic device 200 is an optional apparatus and is a personal computer or each of various types of electronic device.

The storage part 22 can be realized by, for example, a DRAM, a flash memory, a ferroelectric memory, or the like.

The interface part 23 is an apparatus (a circuit) that executes communication between the input control apparatus and the electronic device 200 to be controlled in accordance with a communication standard such as USB, HDMI (a registered trademark), or a PCI bus.

The tactile feeling presenting apparatus 3 is a notifying apparatus capable of presenting a tactile feeling in the air. The "tactile feeling" is a feeling recognizable by a human body through its skin. Examples of the feeling recognizable through the skin include a sense of touch, a sense of vibration, a sense of pressure, a sense of warmth, a sense of cold, and a sense of pain. "To present a tactile feeling" may be to provide stimulation using, for example, a vibration and/or a pressure, or may be some item that provides a warm feeling and/or a cold feeling. For example, the tactile feeling presenting apparatus 3 may provide a vibration and/or an acoustic radiation pressure to the user using a vibrator (such as, for example, an ultrasonic vibrator), or may provide an impact produced by bringing plasma produced by a laser beam and the skin into contact with each other. Otherwise, the tactile feeling presenting apparatus 3 may provide an air flow to the user using a compressor or a fan. Otherwise, the tactile feeling presenting apparatus 3 may provide a warm feeling to the user using an IR beam source, or may provide a cold feeling to the user using a Peltier element. In other words, the tactile feeling presenting apparatus 3 may include at least one selected from the group consisting of a vibrator, a laser, a compressor, a fan, a Peltier element, and an IR beam source. "To present the tactile feeling in the air" is to cause the human body to feel the tactile feeling without being in contact with the human body.

An acoustic radiation pressure of an ultrasonic wave may be used as the tactile feeling presentation. For example, the tactile feeling presenting apparatus 3 may include an ultrasonic vibrator array that is constituted by placing plural ultrasonic vibrators side by side. The ultrasonic vibrator array can present a tactile feeling to the surface of the human body by producing a focus of the ultrasonic wave at an optional position in the air. At the focus of the ultrasonic wave, a static pressure called "acoustic radiation pressure" is generated in addition to the vibration of the acoustic pressure. The static pressure called "acoustic radiation pressure" is generated when an ultrasonic wave propagating in the air is blocked by an object whose acoustic impedance is different from that of the air. With an ultrasonic wave having a high acoustic pressure level, a force is generated that pushes the surface of the body and that is recognizable by the human, by the fact that the ultrasonic wave is blocked by the surface of the body.

The force can thereby be presented to the body in the non-contact manner. The "ultrasonic wave" generally refers to a sonic wave at a frequency of 20 kHz or higher and is unheard by the human ears. To present a tactile feeling not relying on the sense of hearing, the frequency thereof only has to be set to be 20 kHz or higher. No restriction is imposed on the upper limit of the frequency of the ultrasonic wave while the attenuation of the ultrasonic wave propagating in the air becomes larger as the frequency becomes higher, and the frequency at which the tactile feeling presentation is executed using an ultrasonic wave is therefore preferably 20 kHz to 200 kHz and more preferably 20 kHz to 100 kHz. The acoustic pressure level of an ultrasonic wave at which a pressure recognizable by a human can be presented to the surface of the body is 140 dB or higher, preferably 150 dB or higher, and further preferably 160 dB or higher.

An acoustic radiation pressure is temporally varied by intermittently driving or amplitude-modulating an ultrasonic vibrator, and the temporally varied acoustic radiation pressure can be presented to the user as vibrations. In this case, a vibration frequency is present for which the cutaneous sense receptor supervising the vibration feeling has high sensitivity. A stronger tactile feeling can be provided at an equal acoustic radiation pressure by matching the modulation driving of the acoustic radiation pressure with the vibration frequency for the high sensitivity. This modulation frequency is preferably 0 to 300 Hz and more preferably 100 Hz to 300 Hz.

Otherwise, an air flow may be used as the tactile feeling presentation. The tactile feeling presenting apparatus 3 may include an apparatus that includes a nozzle and a pump and that ejects an air flow.

2. Operations of Gesture Input System

Figure 2:
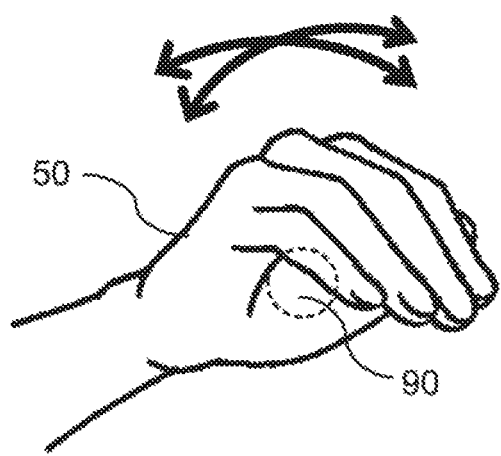
FIG. 2 is a diagram for explaining an operation for a virtual trackball by the gesture input system.

Operations of the gesture input system 100 configured as above will be described. The gesture input system 100 detects using the sensor 1 a motion (a move) of a hand 50 of the user inside a space and transmits information that indicates the direction of the motion (the move) and the amount of the motion as operation information (an operation signal) to an external electronic device 200. As depicted in FIG. 2, the user can thereby executes an operation for the electronic device 200 with a feeling causing the user to feel as if a virtual trackball 90 is present inside the space and the user rotates and operates the virtual trackball 90. For the user, moving a cursor upward, downward, rightward, and leftward or scrolling a screen upward, downward, rightward and leftward on a displaying part of the electronic device 200 is realized by operating the hand 50 to rotate the virtual trackball 90 frontward, backward, rightward and leftward.

The gesture input system 100 also detects the shape of the hand 50 of the user and transmits the information that indicates the shape as operation information to the electronic device 200. For example, the gesture input system 100 detects the shape of a closed palm of the hand 50 (the state where the rock is formed in paper-rock-scissors) or the shape of an fully opened palm thereof (the state where the paper is formed in paper-rock-scissors) as the shape of the hand 50 of the user, and transmits the information indicating the shape as operation information (an operation signal) to the electronic device 200.

Figure 3:
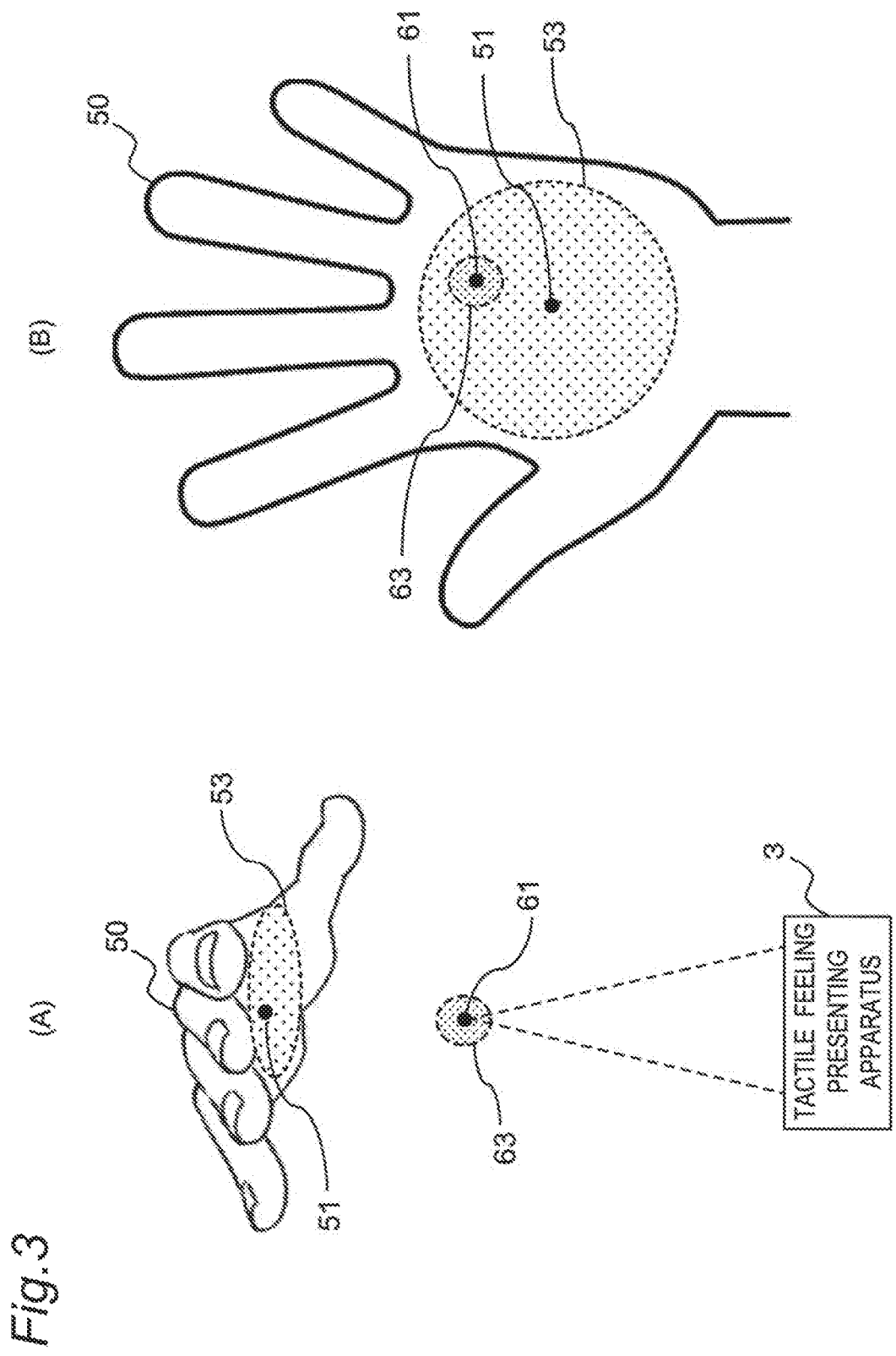
FIG. 3 is a diagram explaining a base point, a chasing point, a tactile feeling presentation area, and an input acceptable area that are set by the gesture input system.

Some terms relating to the operations of the gesture input system 100 will first be described with reference to FIG. 3.

A "base point" is the reference position used when the user executes a gesture input operation. As depicted in FIG. 3(A), the gesture input system 100 sets the coordinates of the base point 61 in the space for the user to execute therein the gesture input operation. The user executes an input operation inside the space touching this base point 61. The gesture input system 100 (the tactile feeling presenting apparatus 3) therefore presents a tactile feeling in a range 63 centering the base point 61 inside the space (see FIGS. 3(A) and (B)). The range having the tactile feeling presented therein is referred to as "tactile feeling presentation area". The user feels a tactile feeling on the hand thereof during the time period for the hand 50 (an example of the portion of the body) to be in contact with the tactile feeling presentation area 63. Once the coordinates of the base point 61 are determined, the coordinates are fixed without being temporally varied.

A "chasing point" is a position in the region of the hand 50 of the user, that is set as a criterion for the gesture input system 100 to determine the position of the hand 50 of the user. In this embodiment, as depicted in FIGS. 3(A) and (B), the chasing point 51 is set at a predetermined position in the region of the hand 50 of the user. The gesture input system 100 detects a gesture input (a user operation) performed by the user, based on the variation of the relative positional relation between the chasing point 51 and the base point 61. This chasing point moves incidentally with the motion of the hand 50.

The gesture input system 100 sets an "input acceptable area" 53 in the overall region or a portion of the region of the palm of the hand 50 of the user. The size of the input acceptable area 53 is larger than the size of the tactile feeling presentation area 63 and is equal to or smaller than the size of the hand 50 of the user. Acceptance of the gesture input is enabled during the time period for the input acceptable area 53 to be in contact with the tactile feeling presentation area 63. The input acceptable area 53 moves incidentally with the motion of the hand 50.

Figure 4:
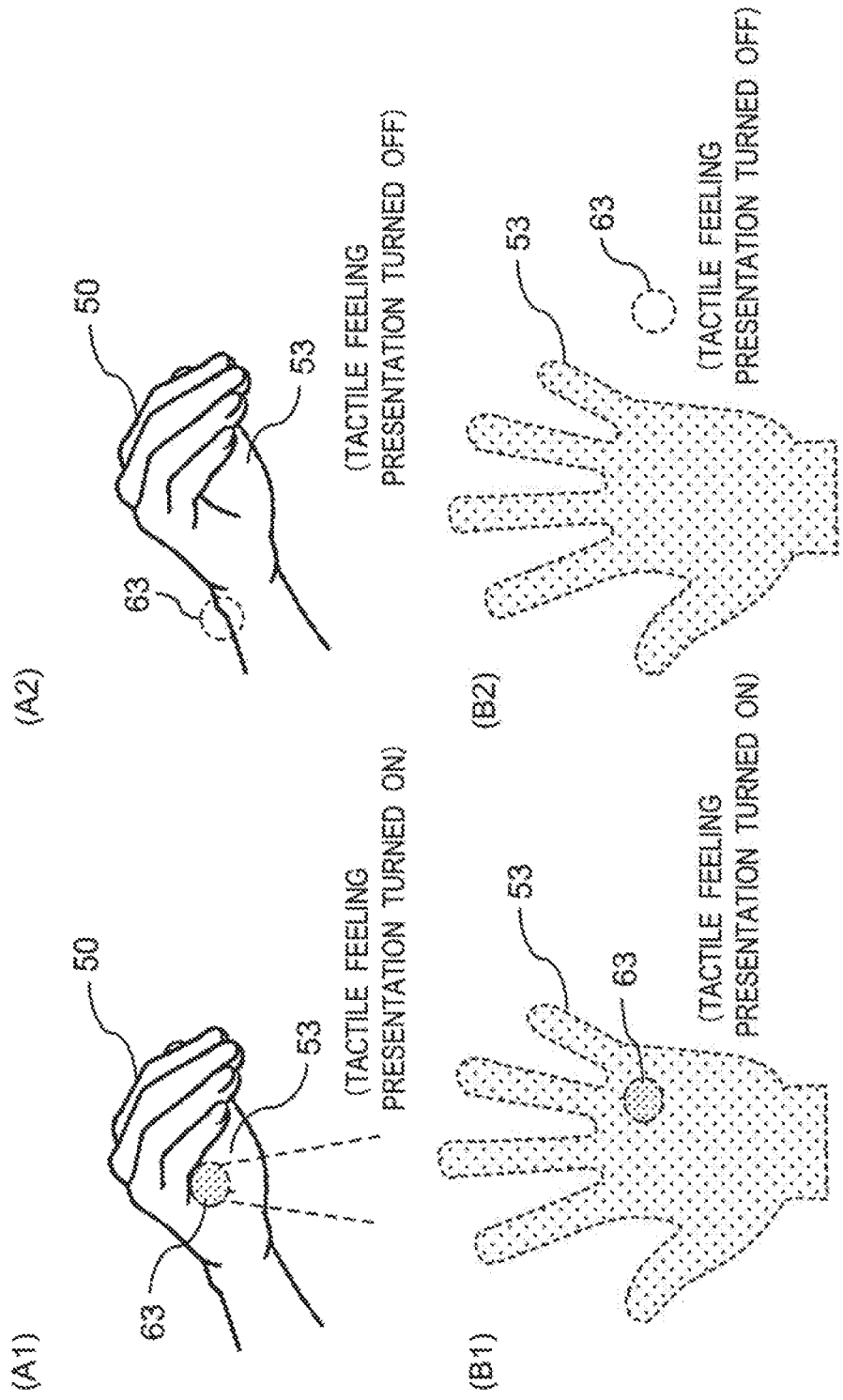
FIG. 4 is a diagram explaining turning on/off of a tactile feeling presentation output by a relative positional relation between the input acceptable area and the tactile feeling presentation area (in the case where the input acceptable area is set in the overall region of the palm of the hand of the user).
Figure 5:
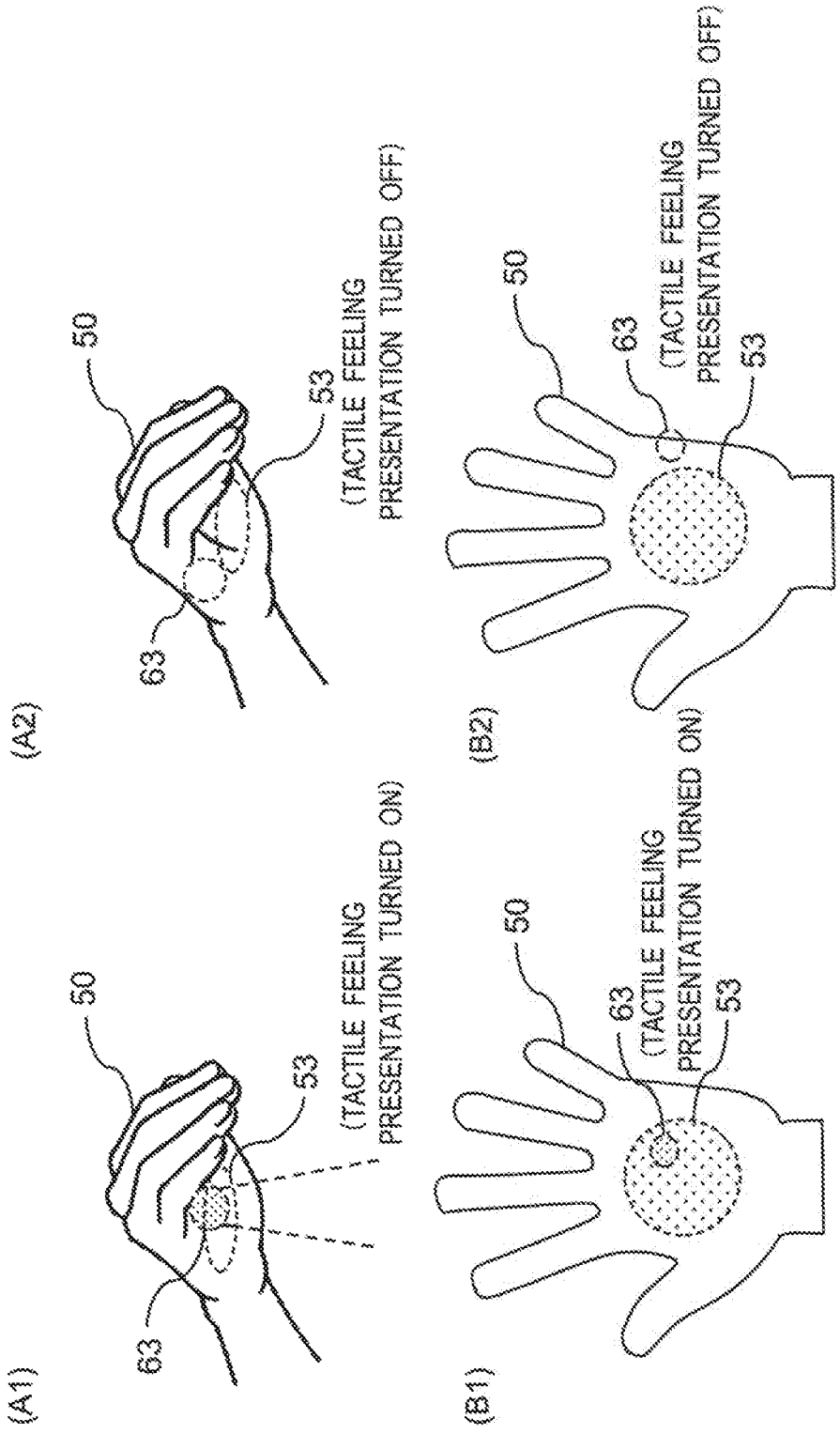
FIG. 5 is a diagram explaining the turning on/off of the tactile feeling presentation output by the relative positional relation between the input acceptable area and the tactile feeling presentation area (in the case where the input acceptable area is set in a portion of the region of the palm of the hand of the user).

For example, as depicted in (B1) and (B2) of FIG. 4, the input acceptable area 53 may be set in the overall region of the palm of the hand or, as depicted in (B1) and (B2) of FIG. 5, may be set in a portion of the region of the palm of the hand. In this embodiment, the description will be made as below assuming that the input acceptable area 53 is set in the overall region of the palm of the hand as depicted in (B1) and (B2) of FIG. 4.

The gesture input system 100 has an input acceptable state where the gesture input system 100 can accept any gesture input and an input unacceptable state where the gesture input system 100 accepts no gesture input, as its operation states. When the input acceptable area 53 is in contact with the tactile feeling presentation area 63, the gesture input system 100 sets its operation state to be the input acceptable state where any gesture input is acceptable. In the input acceptable state, the tactile feeling presenting apparatus 3 presents a tactile feeling to the tactile feeling presentation area 63 (see FIGS. 4(A1) and (B1), and FIGS. 5(A1) and (B1)). The user can recognize that the gesture input acceptable, by feeling the tactile feeling on the palm of the hand thereof.

Figure 6:
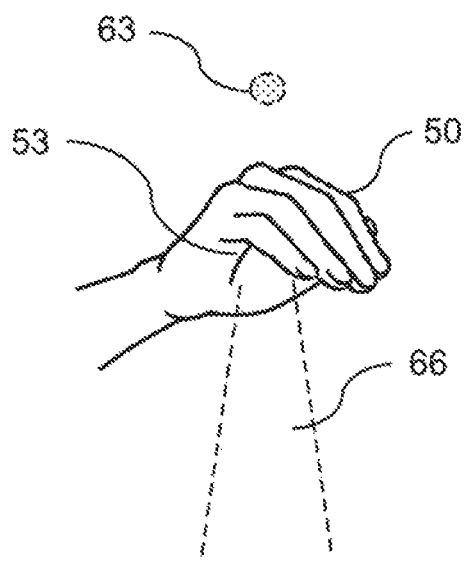
FIG. 6 is a diagram for explaining the reason for turning off the tactile feeling presentation output when the input acceptable area is not in any contact with the tactile feeling presentation area.

On the other hand, when the input acceptable area 53 is not in contact with the tactile feeling presentation area 63, the gesture input system 100 sets its operation state to be the gesture input unacceptable state. In this case, the tactile feeling presenting apparatus 3 does not present any tactile feeling to the tactile feeling presentation area 63 (see FIGS. 4(A2) and (B2) and FIGS. 5(A2) and (B2)). The reason why any tactile feeling presentation is stopped in the input unacceptable state is to prevent any wrong understanding of the user that the operation state is the input acceptable state, by the fact that the user feels the tactile feeling in the state where the gesture input is not acceptable. For example, as depicted in FIG. 6, when the tactile feeling is provided using an air flow 66 and the palm of the hand (the input acceptable area 53) is positioned under the tactile feeling presentation area 63, the input acceptable area 53 is not in contact with the tactile feeling presentation area 63 and the gesture input system 100 is therefore set to be in the input unacceptable state. In this case, when the tactile feeling presentation output is not turned off, the air flow 66 impinges on the palm of the hand of the user and the user may therefore wrongly understand that the gesture input is acceptable, by feeling the tactile feeling. In this embodiment, when the input acceptable are 53 is not in contact with the tactile feeling presentation area 63, the user is caused to learn that the input is not acceptable by turning off the tactile feeling presentation output.

Figure 7:
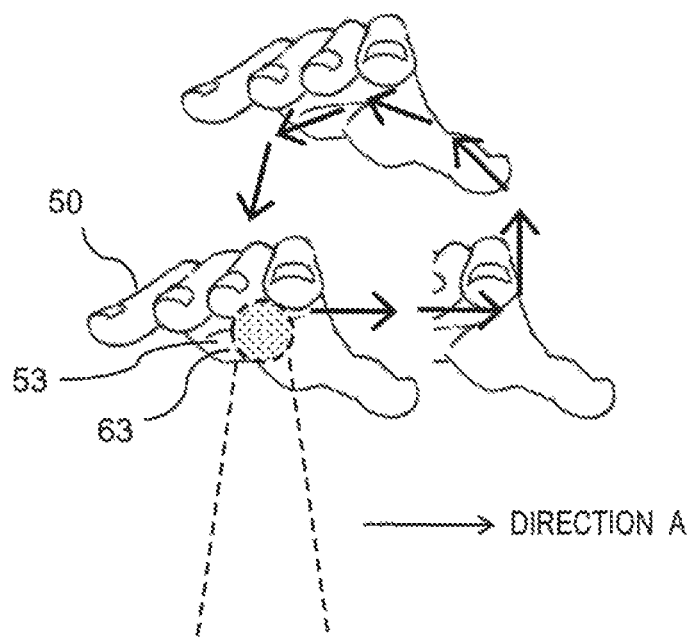
FIG. 7 is a diagram explaining an intermittent input operation for the gesture input system in the first embodiment.
Figure 8:
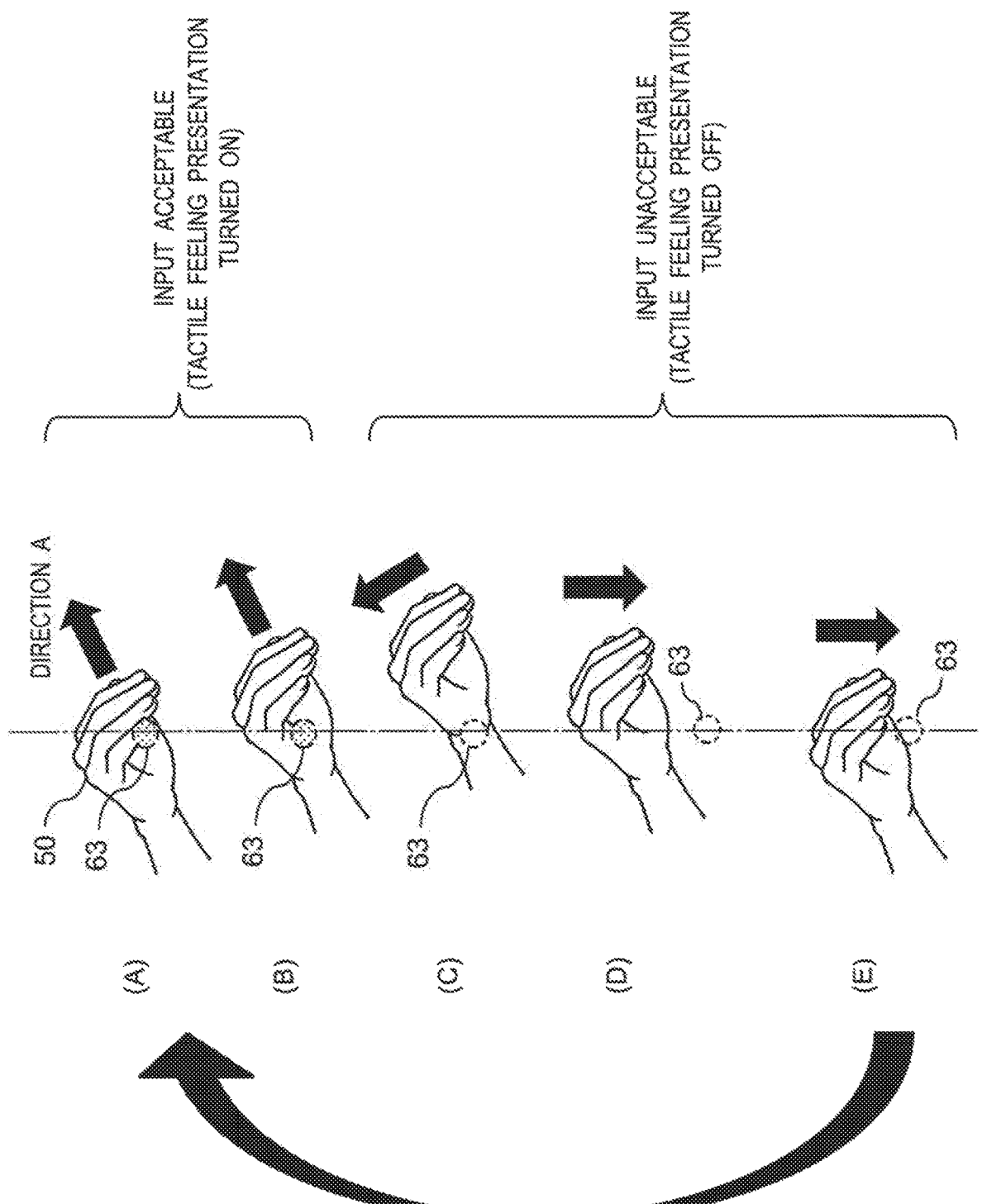
FIG. 8 is a diagram explaining the intermittent input operation for the gesture input system in the first embodiment.

FIG. 7 and FIG. 8 are each a diagram explaining an intermittent user operation to consecutively instruct a motion (a move) in one direction (a direction A) in the gesture input system 100. FIG. 7 is a diagram explaining the motion of the hand of the user seen from the front side of the user performing the operation. FIG. 8 is a diagram explaining the transition of the relative positional relation between the hand 50 of the user and the tactile feeling area 63 seen from the lateral side of the user. As depicted in FIG. 7, FIG. 8(A), and FIG. 8(B), the user first moves the hand 50 (that is, the input acceptable are 53) in one direction (the direction A) keeping the hand 50 in contact with the tactile feeling presentation area 63. At this time, an operation instruction indicating an direction in the direction A is input into the gesture input system 100 based on the variation of the relative positional relation between the base point 61 and the chasing point 51. For example, the cursor is thereby moved in the direction corresponding to the direction A on the electronic device 200.

When the user further moves the hand 50 in the direction A, the input acceptable area 53 moves to the outer side of the tactile feeling presentation area 63 to be not in contact with the tactile feeling presentation area 63 (see FIG. 8(C)). At this time, the gesture input system 100 is in the input unacceptable state. In this case, the cursor does not move on the electronic device 200.

As depicted in FIG. 7, the user moves the hand 50 to a position above the tactile feeling presentation area 63 maintaining the state where the input acceptable area 53 and the tactile feeling presentation area 63 are not in contact with each other (see FIG. 8(D)). The user further moves the hand 50 downward (see FIG. 8(E)) and moves the hand 50 again in the one direction (the direction A) at the time point at which the input acceptable area 53 is brought into contact with the tactile feeling presentation area 63 (see FIGS. 8(A) and (B)). The cursor is thereby further moved again in the direction A from the position of its stoppage.

As above, an operation of instructing a long-distance move in the one direction is enabled by repeating the operation of moving the hand 50 in the one direction in the state where the input acceptable area 53 and the tactile feeling presentation area 63 are brought into contact with each other, the operation of returning the hand 50 to its original position in the state where the input acceptable area 53 and the tactile feeling presentation area 63 are not in contact with each other, and the operation of moving the hand 50 to in the one direction in the state where the input acceptable area 53 and the tactile feeling presentation area 63 are brought into contact with each other. A move and the like of the cursor in a large virtual space by the operation in the limited space (the moves of the hand) are enabled by the above intermittent operation.

The gesture input system 100 may vary the output sensitivity in accordance with the position at which the user performs the operation. The gesture input system 100 may vary the rate (the sensitivity) of the output value indicating the move amount for the actual move amount of the hand, in accordance with the position (such as, for example, the height) for the user to perform the operation.

Figure 9:
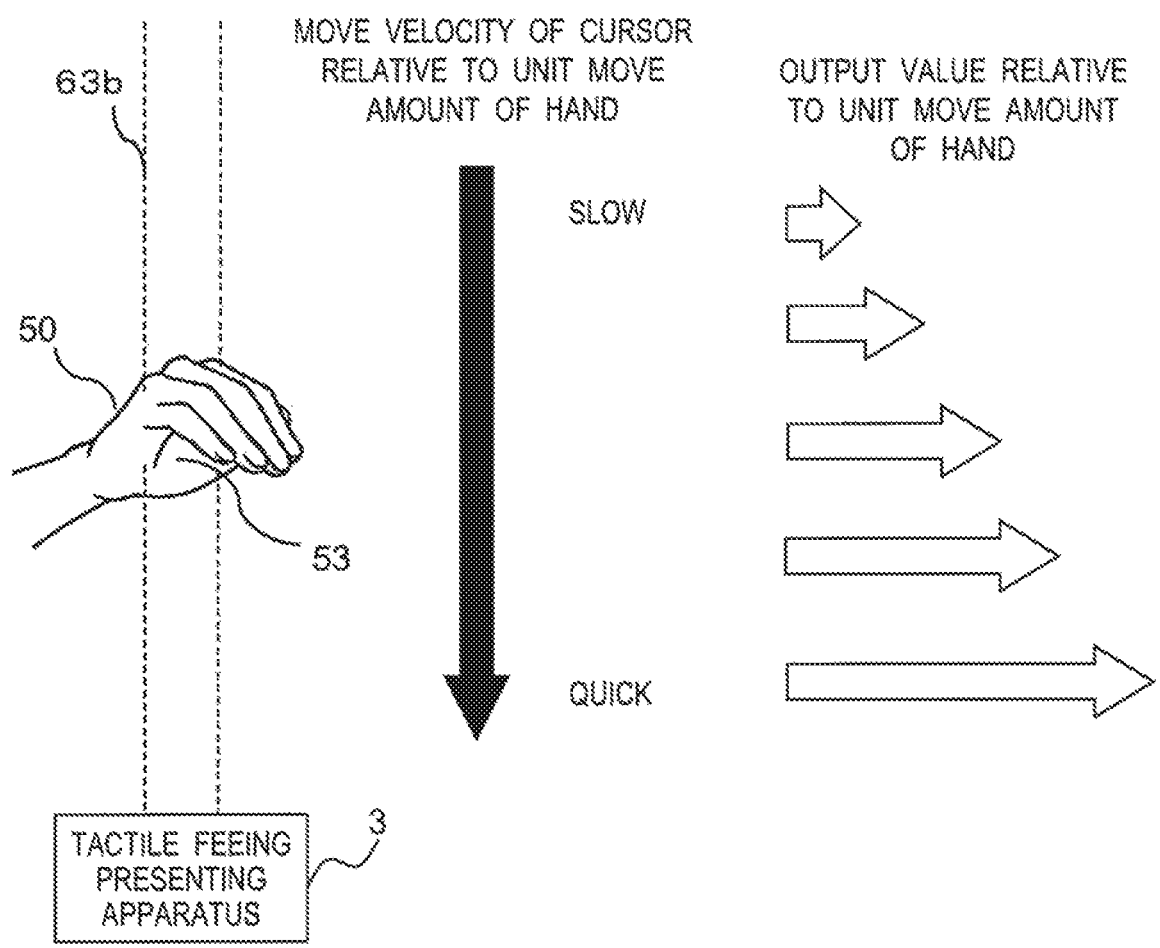
FIG. 9 is a diagram explaining a function of varying the sensitivity of the gesture input system in accordance with the operation position (the height).

For example, when the tactile feeling presentation is executed using an air flow and the tactile feeling presentation area is a cylinder-shaped region 63b as depicted in FIG. 9, the rate of the output value to the actual unit move amount of the hand may be increased as the gesture operation is performed in the lower side of the region 63b, that is, the input acceptable area 53 and the tactile feeling presentation area 63b are in contact with each other at a lower position. The user can thereby vary the move amount instructed to the electronic device, for the same move amount of the hand by varying the position (the height) at which the operation is performed. For example, when the user desires to move the cursor for a long distance (at a high speed), the user only has to perform the operation on the lower side of the tactile feeling presentation region 63b and, when the user desires to move the cursor for a short distance (at a low speed), the user only has to perform the operation on the upper side thereof. The move amount to be instructed to the electronic device can be varied for the same motion of the hand as above and the convenience of the user is therefore improved.

In this case, the strength of the presented tactile feeling may be varied matching with the variation of the sensitivity. The user can thereby perform the operation intuitively feeling the magnitude of the sensitivity (the move amount).

Figure 10:
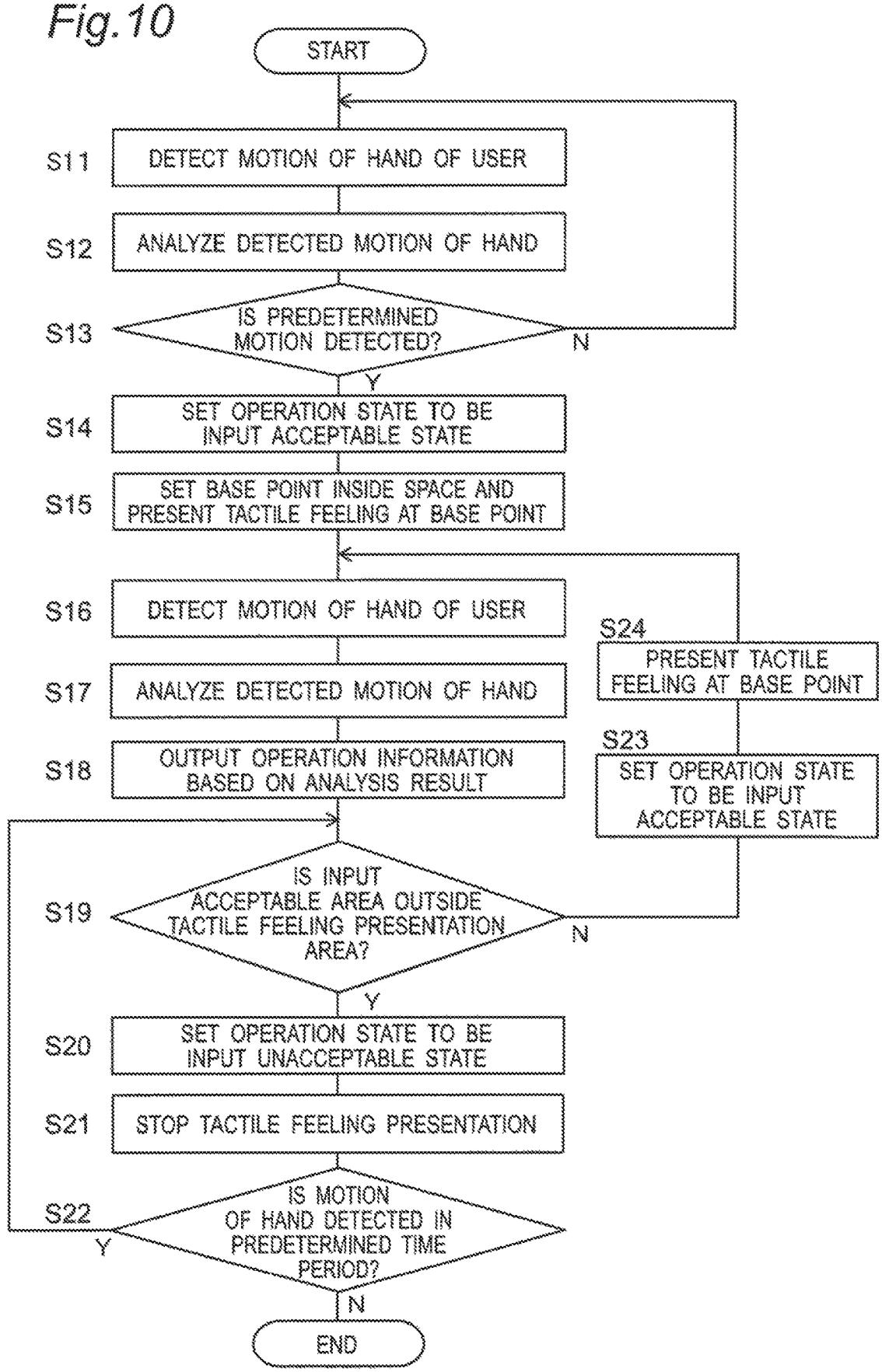
FIG. 10 is a flowchart of operations of the gesture input system in the first embodiment.

FIG. 10 is a flowchart of the gesture input operation in the gesture input system 100. The gesture input operation in the gesture input system 100 will be described below with reference to the flowchart.

In the gesture input system 100, the sensor 1 detects a motion of the hand 50 (the portion of the body) of the user (S11). The result of the detection by the sensor 1 is input into the input control apparatus 2. The input control apparatus 2 (the control part 21) analyzes the motion of the user based on the information from the sensor 1 (S12) and determines whether a predetermined motion to act as a trigger for starting the input acceptance is detected (S13). The predetermined motion is a motion that changes the state from the state where the palm of the hand 50 is closed (the state where the rock is formed in paper-rock-scissors) to the state where the palm is fully opened (the state where the paper is formed in paper-rock-scissors).

When the control part 21 of the input control apparatus 2 determines that no predetermined motion is detected (NO at S13), the control part 21 thereof returns to step S11 and continues the detection of the motion of the hand of the user.

When the control part 21 determines that the predetermined motion is detected (YES at S13), the control part 21 sets the operation state of the gesture input system 100 to be the input acceptable state where the gesture input is acceptable (S14). The control part 21 further sets the coordinates of the base point 61 and controls the tactile feeling presenting apparatus 3 to cause the tactile feeling to be presented in the tactile feeling presentation area 63 that includes the base point 61. The control part 21 sets the position (the coordinates) of the base point 61 for the user to be able to feel the tactile feeling by the palm of the hand 50, based on the detected position of the hand 50. The gesture input is thereby enabled. Once the coordinates of the base point 61 are determined, the coordinates are fixed to the determined coordinates until this process comes to an end.

The sensor 1 thereafter detects the motion of the hand 50 of the user (the gesture operation) (S16). Information indicating the result of the detection by the sensor 1 is input into the control part 21. The control part 21 analyzes the motion of the hand based on the information that indicates the detection result from the sensor 1 (S17). The control part 21 detects the position (the coordinates) of the chasing point 51 and the input acceptable area 53 based on the information on the detected region of the hand. Which portions of the palm of the hand are set to be the chasing point 51 and the input acceptable area 53 is determined in advance and the information indicating this is stored in the storage part 22. The control part 21 detects the user operation based on the variation of the relative positional relation between the detected base point 61 and the chasing point 51. For example, the control part 21 determines the variation of the coordinates of the chasing point 51 relative to the coordinates of the base point 61 and calculates the move direction and the move amount of the chasing point 51 from those at the time of the previous detection. The control part 21 determines the user operation (the direction and the amount of the operation) based on the calculated move direction and the calculated move amount of the chasing point 51.

The control part 21 may detect the shape of the hand 50. For example, the control part 21 may detect the state where the palm of the hand 50 is closed (the state where the rock is formed in paper-rock-scissors), the state where the palm of the hand 50 is fully opened (the state where the paper is formed in paper-rock-scissors), the state where one finger is raised, and the like and may detect the user operation that corresponds to each of the above.

The control part 21 outputs the operation information that indicates the user operation detected based on the analysis result to the electronic device 200 through the interface part 23 (S18). The electronic device 200 operates in accordance with the user operation based on the operation information received from the input control apparatus 2. For example, the electronic device 200 moves the cursor on the display screen based on the operation information.

The control part 21 thereafter determines whether the input acceptable area 53 set in the region of the hand 50 of the user is in contact with the tactile feeling presentation area 63 (S19).

In the case where the control part 21 determines that the input acceptable area 53 is in contact with the tactile feeling presentation area 63 (NO at S19), when the operation state of the gesture input system 100 is the input unacceptable state, the control part 21 sets the operation state to be the input acceptable state (S23). The control part 21 further controls the tactile feeling presenting apparatus 3 to present the tactile feeling in the tactile feeling presentation area 63 that includes the base point 61. The control part 21 thereafter returns to step S16 to repeat the above processes.

On the other hand, when the control part 21 determines that the input acceptable area 53 is present outside the tactile feeling presentation area 63 (YES at S19), the control part 21 sets the operation state of the gesture input system 100 to be the input unacceptable state (S20). The control part 21 further controls the tactile feeling presenting apparatus 3 to stop the output for the tactile feeling presentation (S21). In this manner, when the input acceptable area 53 is present outside the tactile feeling presentation area 63, the setting is established for the gesture input to be unacceptable and the tactile feeling presentation is discontinued.

The control part 21 thereafter determines whether the sensor 1 detects any motion of the hand of the user within a predetermined time period (S22). When the control part 21 determines that the sensor 1 detects a motion of the hand of the user within the predetermined time period (YES at S22), the control part 21 returns to step S19 and repeats the above processes (S16 to S22). For example, when the user performs the intermittent operation described with reference to FIG. 7 and FIG. 8, steps S16 to S22 are repeated.

On the other hand, when the control part 21 determines that the sensor 1 detects no motion of the hand of the user within the predetermined time period (NO at S22), the control part 21 causes this process to come to an end.

As above, the gesture input system 100 of this embodiment can detects the operation information on the gesture of the user performed inside the space from the gesture thereof and can input the operation information into the electronic device 200 to be controlled. In this case, the gesture input system 100 sets the one point inside the space to be the base point 61 and presents the tactile feeling in the region (the tactile feeling presentation area) 63 centering the position of the base point 61. The user can easily recognize the direction and the amount of the operation by performing the operation feeling the tactile feeling presented in the vicinity of the base point 61 by the palm of the hand.

3. Conclusion

As above, the gesture input system 100 of this embodiment accepts the user operation based on the motion of the hand 50 (an example of the portion of the body) of the user and produces the input signal that indicates the direction of the motion and/or the amount of the motion of the hand. The gesture input system 100 includes the sensor 1 that detects the motion of the hand 50 of the user, the tactile feeling presenting apparatus 3 that presents the tactile feeling at the base point 61 set inside the space, and the input control apparatus 2 that sets the chasing point 51 on the portion of the body detected by the sensor 1 and that produces the input signal based on the variation of the relative positional relation between the chasing point 51 and the base point 61. The tactile feeling presenting apparatus 3 continuously presents the tactile feeling at the base point 61 during the time period for the gesture input system 100 to be in the input acceptable state where the user operation is acceptable. Because the tactile feeling is continuously presented during the time period of the input acceptable state, the user can perform the gesture operation recognizing that the input operation is currently executed, by the tactile feeling.

In the case where the sensor 1 detects a predetermined motion of the hand 50 of the user (such as, for example, a motion for a change from the state where the hand is closed to the state where the hand is opened) when the operation state is not the input acceptable state, the input control apparatus 2 sets the base point 61 inside the space and sets the gesture input system 100 to be in the input acceptable state. The position of the base point 61 is fixed until the base point 61 is again set. The base point 61 inside the space is set when the user performs the predetermined operation. The user can recognize the reference position for the gesture operation by the fact that the position of the base point 61 is fixed.

The base point 61 is set on the hand 50 of the user. The tactile feeling can thereby be presented to the hand 50 of the user.

The tactile feeling presenting apparatus 3 present the tactile feeling in the tactile feeling presentation area 63 that is the predetermined range including the base point 61 inside the space. The user can recognize the range inside the space for the user to be able to perform the gesture operation by the fact that the tactile feeling is presented in the tactile feeling presentation area 63.

The input control apparatus 2 sets the input acceptable area 53 on the hand 50 and, when at least a portion of the input acceptable area 53 overlaps on the tactile feeling presentation area 63, sets the gesture input system to be in the input acceptable state. When the input acceptable area does not overlap on the tactile feeling presentation area, the input control apparatus 2 sets the gesture input system to be in the input unacceptable state where any user operation is unacceptable (S19 and S20). The user can thereby perform the intermittent input operation.

When the gesture input system 100 is in the input unacceptable state, the tactile feeling presenting apparatus 3 stops the presentation of the tactile feeling (S21). The user can thereby recognize that any input is unacceptable and electric power saving can thereby be realized.

The input control apparatus 2 varies the rate (the sensitivity) of the variation of the amount of the motion indicated by the input signal to the actual motion of the hand, in accordance with the position of the chasing point 51 in the tactile feeling presentation area 63. The user can thereby easily vary the move velocity of, for example, the cursor by a simple operation.

The tactile feeling presenting apparatus 3 presents the tactile feeling using an acoustic radiation pressure or an air flow. The tactile feeling presenting apparatus 3 may provide vibrations and/or an acoustic radiation pressure to the user using a vibrator (such as, for example, an ultrasonic vibrator) or may provide an impact generated by bringing plasma produced by a laser beam and the skin into contact with each other to the user. Otherwise, the tactile feeling presenting apparatus 3 may provide an air flow to the user using a compressor or a fan. Otherwise, the tactile feeling presenting apparatus 3 may provide a warm feeling to the user using an IR beam source, or may provide a cold feeling to the user using a Peltier element. In other words, the tactile feeling presenting apparatus 3 may include at least one selected from the group consisting of a vibrator, a laser, a compressor, a fan, a Peltier element, and an IR beam source.

This embodiment discloses a gesture input method of accepting a user operation based on a motion of the hand 50 of the user (that is an example of a portion of the body) and producing an input signal that indicates the direction of the motion and/or the amount of the motion of the hand 50. According to the gesture input method, the sensor 1 detects the motion of the hand 50 of the user (S12). The tactile feeling presenting apparatus 3 presents a tactile feeling in the tactile feeling presentation area 63 that includes the base point 61 set inside the space (315). The input control apparatus 2 sets the chasing point 51 on the hand 50 detected by the sensor 1 and produces an input signal based on the variation of the relative positional relation between the chasing point 51 and the base point 61 (S17). The tactile feeling presenting apparatus 3 continuously presents the tactile feeling at the base point during the time period for the operation state to be the input acceptable state where any user operation is acceptable.

The gesture input system and the gesture input method of this disclosure are each realized by hardware resources such as, for example, a processor and a memory, and programs, in cooperation with each other.

Second Embodiment

This embodiment presupposes the fact that the input acceptable area 53 is set in the overall region of the palm of the hand. With the gesture input system 100 of the first embodiment, when the input acceptable area 53 is present outside the tactile feeling presentation area 63, the operation state of the gesture input system 100 is set to be the input unacceptable state (S20) and the tactile feeling presentation output from the tactile feeling presenting apparatus 3 is discontinued (S21). In contrast, with a gesture input system 100 of the second embodiment, when the input acceptable area 53 is present outside the tactile feeling presentation area 63, the operation state is set to be the input unacceptable state while the tactile feeling presentation output from the tactile feeling presenting apparatus 3 is continued. The other configurations and operations are same as those of the first embodiment.

Figure 11:
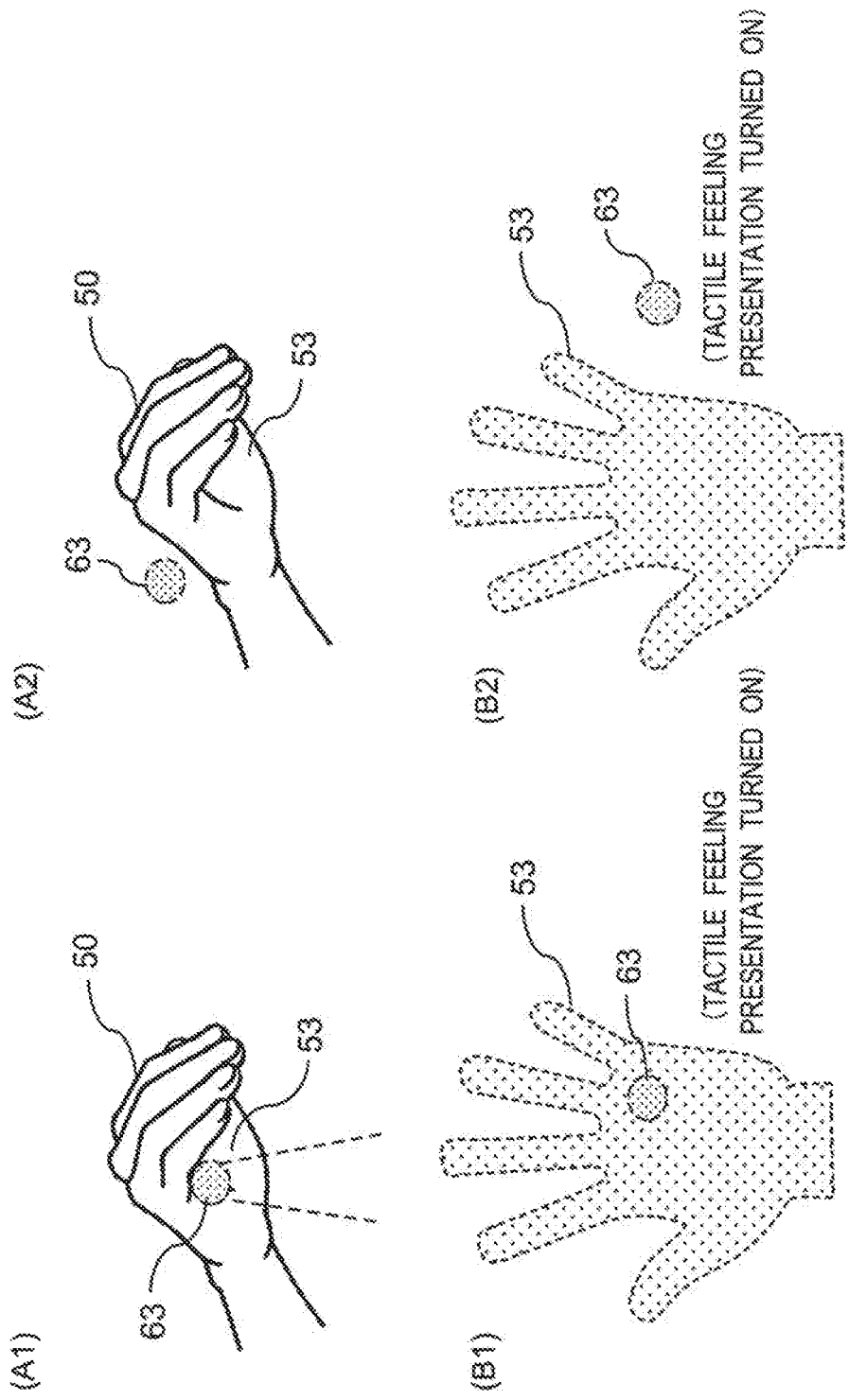
FIG. 11 is a diagram explaining a function of maintaining the tactile feeling presentation output to be turned on regardless of the relative positional relation between the input acceptable area and the tactile feeling presentation area in a second embodiment of this disclosure.

FIG. 11 is a diagram explaining a function of maintaining the tactile feeling presentation output to be turned on regardless of the relative positional relation between the input acceptable area and the tactile feeling presentation area in the second embodiment. When the input acceptable area (the overall palm of the hand) 53 is in contact with the tactile feeling presentation area 63, the gesture input system 100 sets the operation state thereof to be the input acceptable state for any gesture input. In this case, the tactile feeling presenting apparatus 3 turns on the output of the tactile feeling presentation and presents the tactile feeling to the tactile feeling presentation area 63 (see FIGS. 11(A1) and (B1)).

On the other hand, when the input acceptable area 53 is present outside the tactile feeling presentation area 63, the gesture input system 100 sets the operation state thereof to be the input unacceptable state for any gesture input. In this case, the tactile feeling presenting apparatus 3 does not turn off the output of the tactile feeling presentation and continues the tactile feeling presentation output (see FIGS. 11(A2) and (B2)).

In this embodiment, the input acceptable area 53 is set in the overall area of the palm of the hand. When the input acceptable area 53 is present outside the tactile feeling presentation area 63, the tactile feeling is therefore presented outside the region of the palm of the hand and the user therefore does not feel the tactile feeling. Even when the tactile feeling is continuously presented, the problem that the user wrongly understands that any input is acceptable by the tactile feeling does not arise.

Figure 12:
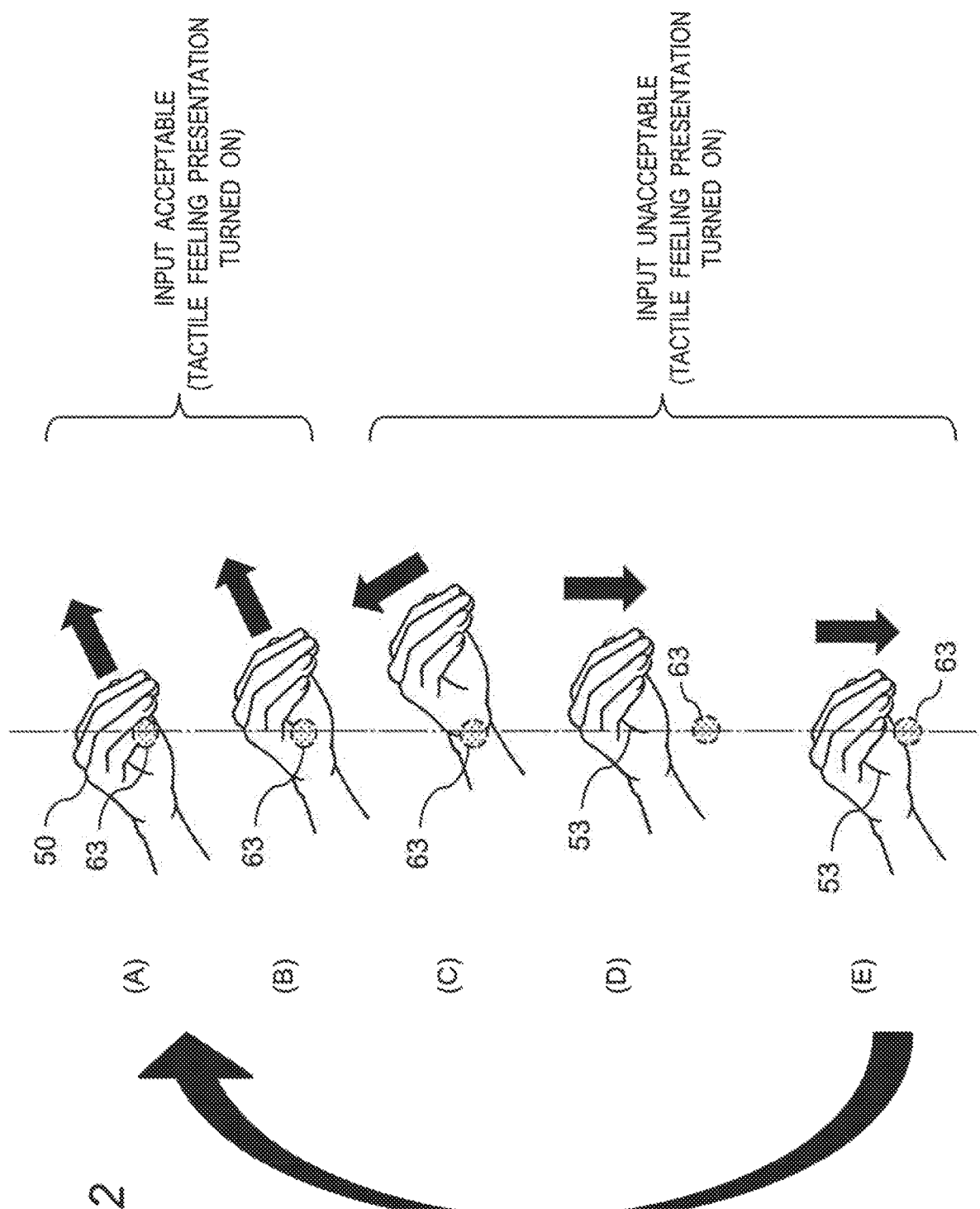
FIG. 12 is a diagram explaining an intermittent input operation for a gesture input system in the second embodiment.

FIG. 12 is a diagram explaining an intermittent input operation (see FIG. 7) to a gesture input system in the second embodiment. In the case where the intermittent operation is executed, as depicted in FIGS. 12(C) to (E), the tactile feeling presenting apparatus 3 continuously presents the tactile feeling even when the input acceptable area 53 is present outside the tactile feeling presentation area 63.

Figure 13:
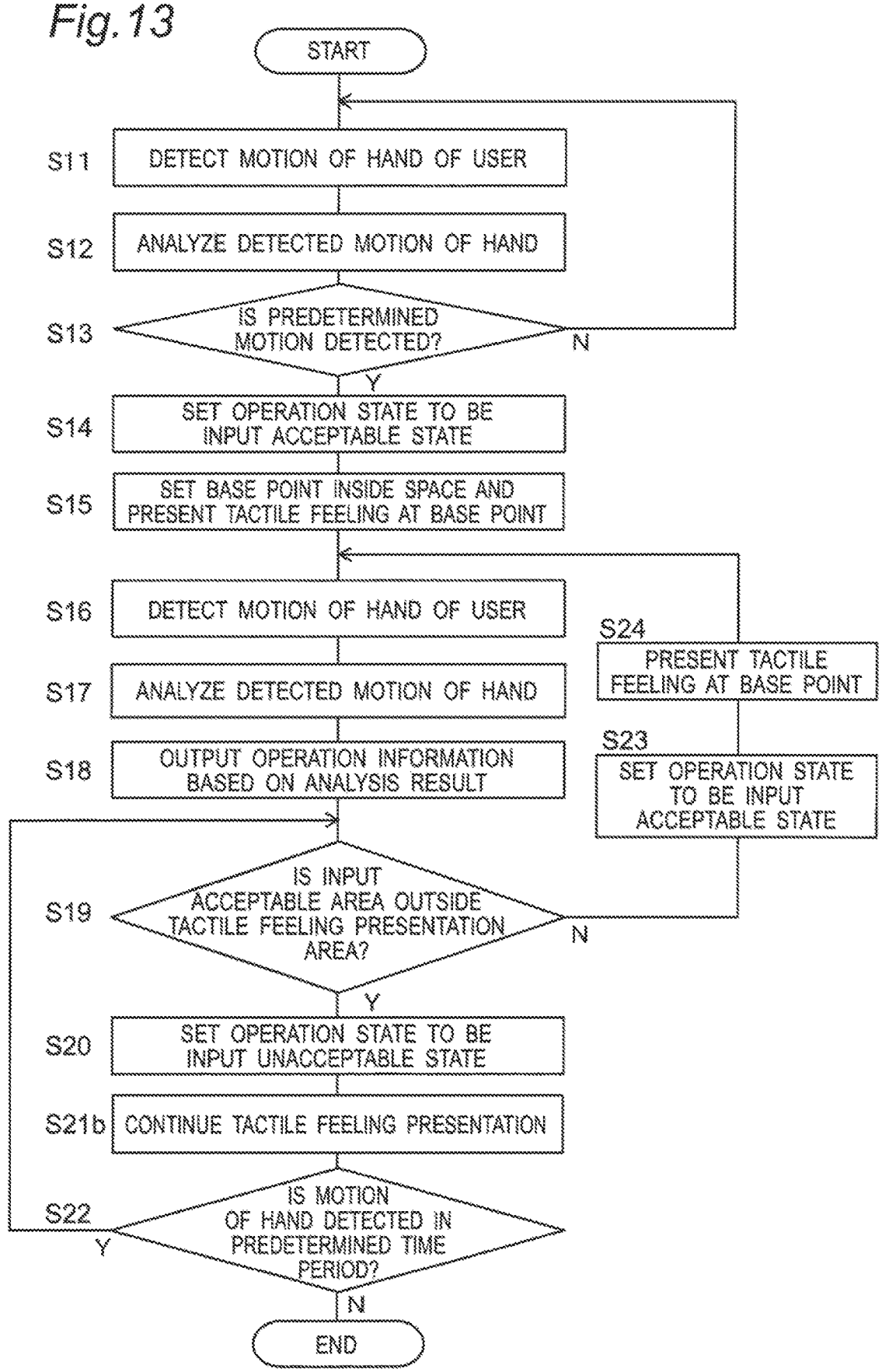
FIG. 13 is a flowchart of operations of the gesture input system in the second embodiment.

FIG. 13 is a flowchart of the operations of the gesture input system in the second embodiment. The flowchart depicted in FIG. 13 is a flowchart acquired by replacing step S21 in the flowchart depicted in FIG. 10 with step S21b. In this embodiment, even when the input acceptable area 53 is present outside the tactile feeling presentation area 63, the tactile feeling presenting apparatus 3 continuously presents the tactile feeling (S21b).

As above, even when the input acceptable area 53 is present outside the tactile feeling presentation area 63, the tactile feeling presentation output is continued and the tactile feeling presenting apparatus 3 therefore does not need to frequently switch the turning on and off therebetween of the tactile feeling presentation. The control thereof therefore becomes easy.

Third Embodiment

The configuration of an information processing apparatus to which the gesture input system described in each of the above embodiments is applied as one of the input means will be described below.

Figure 14:
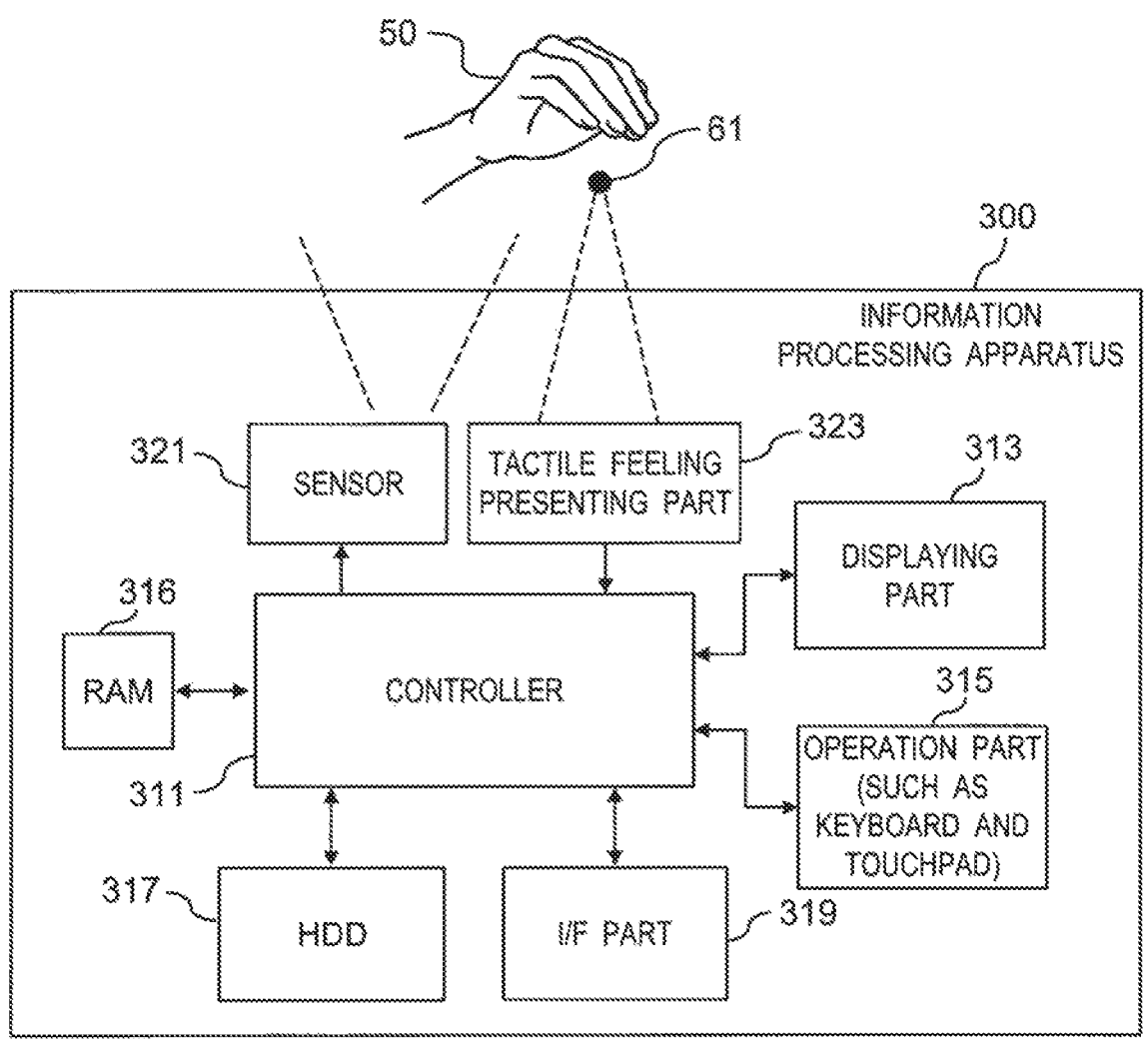
FIG. 14 is a block diagram of the configuration of an information processing apparatus of a third embodiment of this disclosure.

FIG. 14 is a diagram of the configuration of the information processing apparatus to which the gesture input system described in each of the above embodiments is applied as one of the input means. The information processing apparatus is, for example, a personal computer.

As depicted in FIG. 14, an information processing apparatus 300 includes a controller 311 that controls the overall operations of the information processing apparatus 300, a displaying part 313 that displays various types of information thereon, an operation part 315 on which the user operates the information processing apparatus 300, a RAM 316, and a hard disc drive (HDD) 317 that has data and programs stored therein. The information processing apparatus 300 further includes an interface part 319 to execute communication with an external device. The information processing apparatus 300 further includes a sensor 321 and a tactile feeling presenting part 323.

The displaying part 313 includes, for example, a liquid crystal display or an organic EL display. The operation part 315 includes a keyboard, a touchpad, a touch panel, buttons, and/or the like. The touch panel is arranged such that the operation region thereof is superimposed on the display region of the displaying part 313. The buttons include buttons physically disposed on the information processing apparatus 300 and virtual buttons displayed on the displaying part 313.

The interface part 319 is a circuit (a module) to execute the communication with the external device in accordance with a communication standard such as HDMI, USB, LAN, Bluetooth (a registered trademark), or WiFi.

The RAM 316 includes a semiconductor device such as, for example, a DRAM or an SRAM, temporarily has data stored therein, and functions also as a work area of the controller 311.

The hard disc drive (HDD) 317 is a recording medium that has parameters, data, control programs, and the like stored therein that are necessary for realizing predetermined functions. Another recording medium such as a semiconductor storage device (SSD) may be used instead of the hard disc drive (HDD).

The controller 311 is a CPU or an MPU and realizes predetermined functions by executing the control programs (software). In this embodiment, the hard disc drive 317 has a program to function the gesture input system (a driver) mounted thereon in advance and the controller 311 realizes the functions of the gesture input system by executing this program.

The sensor 321 is a sensor that has the configuration and functions same as those of the sensor 1 described in each of the above embodiments and that can detect a motion of an object in a predetermined range. The tactile feeling presenting part 323 is also a reporting apparatus that has the configuration and functions same as those of the tactile feeling presenting apparatus 3 described in each of the above embodiments and that can present a tactile feeling in the air.

The sensor 321 and the tactile feeling presenting part 323 together with the controller 311 constitute a gesture input part. The gesture input part has a gesture input function same as that of the gesture input system 100 in each of the above embodiments. The controller 311 realizes a gesture input function in accordance with the processes described in the flowchart depicted in FIG. 10 or FIG. 13.

In addition to the direct operation by the user to the operation part 315, the information processing apparatus 300 can also accept an input by a gesture operation by the user in the air. The information processing apparatus 300 presents the tactile feeling at the base point coordinates from the tactile feeling presenting part 323 and detects a motion of the hand of the user in the vicinity of the base point using the sensor 321. The controller 311 executes scrolling of the position of the cursor or the screen displayed on the displaying part 313 based on the detected motion of the hand.

Figure 15:
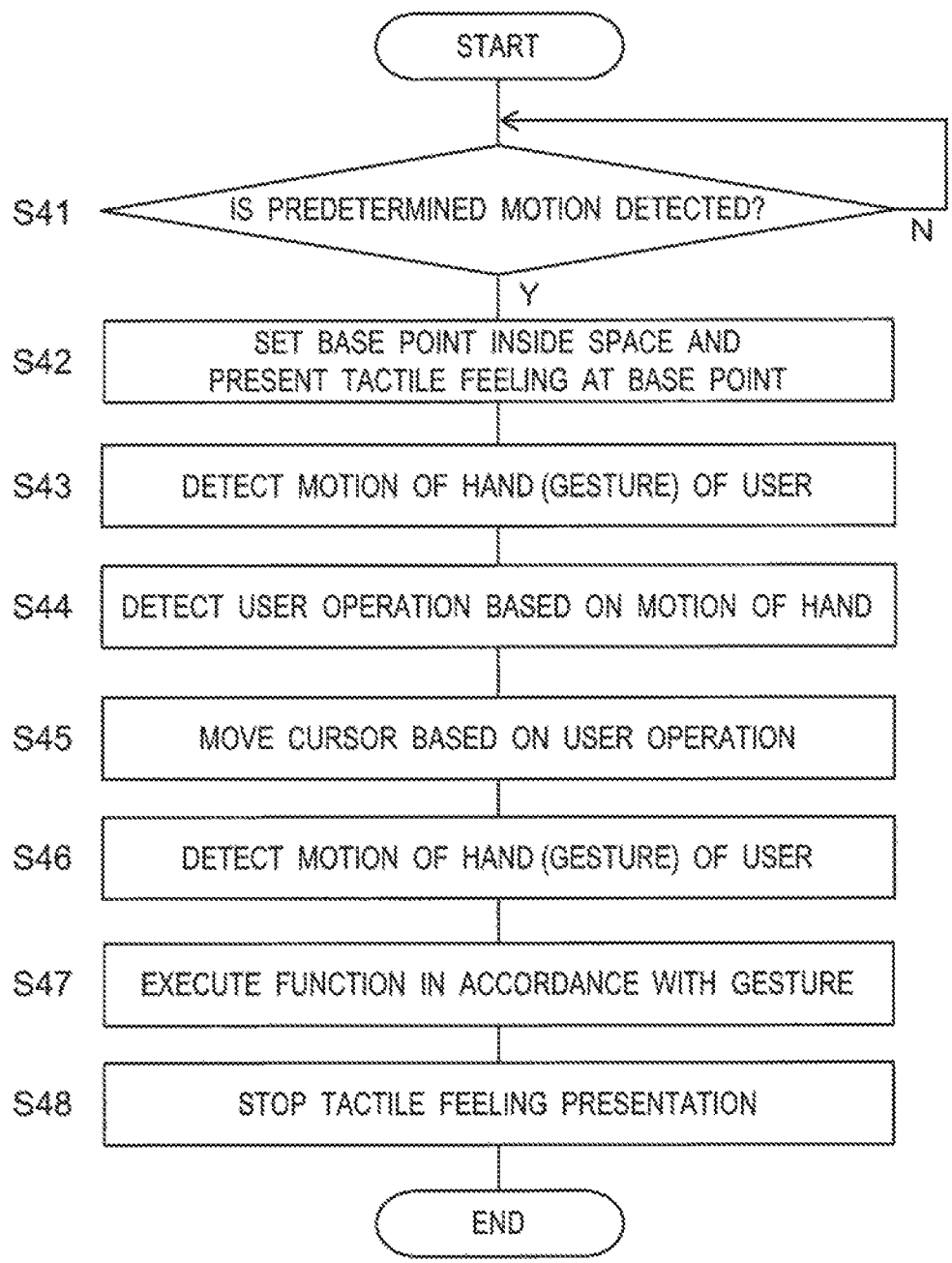
FIG. 15 is a flowchart of operations of the information processing apparatus in the third embodiment.

FIG. 15 is a diagram of a flowchart of a series of operations of the information processing apparatus 300 in this embodiment executed when the cursor is moved by a gesture input.

The controller 311 checks whether the user performs a predetermined motion to turn on the gesture input (a trigger movement) based on information acquired from the sensor 311 (S41). The "trigger movement" is, for example, a movement that changes the state where the fingers of the hand are closed to the state where the fingers of the hand are fully opened. When the controller 311 determines that the trigger movement is detected (YES at S41), the acceptance of the gesture input is started.

The controller 311 sets the base point coordinates inside the space based on the detected position of the hand and controls the tactile feeling presenting part 323 to present the tactile feeling in the range centering the base point coordinates (the tactile feeling presentation area 63) (S42). In this case, the user performs the gesture operation (an instruction of the move direction) feeling the tactile feeling presented inside the space on the palm of the hand. The user moves the hand by a desired amount in the direction in which the user desires to move the cursor, feeling the tactile feeling on the palm of the hand. The sensor 321 detects this motion of the hand of the user (the gesture) and delivers this motion to the controller 311 (S43).

The controller 311 detects the user operation (the move direction and the move amount) based on the detected motion of the hand of the user (the gesture) (S44). For example, the controller 311 determines the move direction and the move amount of the chasing point 51 based on a variation of the relative positional relation between the position of the base point 61 and the position of the chasing point 51 in the region of the hand.

The controller 311 varies the position of the cursor displayed on the displaying part 313 based on the detected user operation (S45).

The user thereafter performs a predetermined gesture to execute a specific process for the function (an icon) selected by the cursor. The "predetermined gesture" is, for example, a movement that changes the state where the fingers of the hand are all opened (the paper in paper-rock-scissors) to the state where the fingers of the hand are closed (the rock in paper-rock-scissors). The controller 311 detects the predetermined gesture performed by the user through the sensor 321 and executes the process that is correlated with this gesture (47).

The controller 311 thereafter controls the tactile feeling presenting part 323 to discontinue the presentation of the tactile feeling (S48).

Any gesture input is enabled for the information processing apparatus 300 by the above configuration. In this embodiment, a personal computer is exemplified as the information processing apparatus while the information processing apparatus may be a tablet terminal or a smartphone.

The gesture input system of this disclosure is applicable to not only the information processing apparatus but also each of other various types of electronic device. For example, the gesture input system of this disclosure is applicable as an input means of a car navigation apparatus, an air conditioner, an audio apparatus, or a gaming machine.

(This Disclosure 1)

The first to the third embodiments disclose the following configurations.

(1) The gesture input system is disclosed that accepts a user operation based on a motion of a portion of the body of a user and that produces an input signal indicating the direction of the motion and/or the amount of the motion of the portion of the body.

The gesture input system includes a sensor that detects the motion of the portion of the body of the user, a tactile feeling presenting apparatus that presents a tactile feeling in a predetermined region including a base point set inside a space, and a control apparatus that sets a chasing point on the portion of the body detected by the sensor and that produces an input signal based on a variation of a relative positional relation between the chasing point and the base point. The tactile feeling presenting apparatus continuously presents the tactile feeling in the predetermined region during the time period for the gesture input system to be in an input acceptable state where the gesture input system can accept any user operation.

During the input acceptable state, the tactile feeling is thereby continuously presented at the base point and the user can therefore perform the gesture operation recognizing that the input operation is currently continued, by the tactile feeling.

(2) in (1), in the case where the operation state is not the input acceptable state, when the sensor detects the predetermined motion of the portion of the body of the user, the control part may set the base point inside a space and may set the gesture input system to be in the input acceptable state. The position of the base point may thereafter be fixed until the base point is again set. The base point inside the space is thereby set when the user performs the predetermined operation. The user can recognize the reference position of the gesture operation by the fixation of the position of the base point.

(3) in (2), the base point may be set on the portion of the body of the user. The base point inside the space is thereby set by the predetermined operation by the user as the trigger and the tactile feeling presentation is started.

(4) in (1), the tactile feeling presenting apparatus may present the tactile feeling in the tactile feeling presentation area that is a predetermined range including the base point inside the space. The user can recognize the range inside the space for the user to be able to perform the gesture operation, by setting the tactile feeing presentation area.

(5) in (4), the control apparatus may set the input acceptable area on the portion of the body, may set the gesture input system to be in the input acceptable state when at least a portion of the input acceptable area overlaps on the tactile feeling presentation area, and may set the gesture input system to be in the input unacceptable state where no user operation is accepted when the input acceptable area does not overlap on the tactile feeling presentation area. The user can thereby perform an intermittent input operation.

(6) in (5), when the gesture input system is in the input unacceptable state, the tactile feeling presenting apparatus discontinues the presentation of the tactile feeling. The user can thereby recognize that the input is unacceptable and electric power saving is realized.

(7) in (5), the control apparatus may vary the rate of the variation of the amount of the motion indicated by the input signal to the actual motion of the portion of the body in accordance with the position of the chasing point in the tactile feeling presentation area. For example, the move velocity of the cursor can thereby be varied by a simple operation.

(8) in (1), the tactile feeling presenting apparatus may present the tactile feeling using an acoustic radiation pressure or an air flow.

(9) A gesture input method of accepting a user operation based on a motion of a portion of the body of a user and producing an input signal that indicates the direction of the motion and/or the amount of the motion of the portion of the body is disclosed. According to the gesture input method, a sensor detects the motion of the portion of the body of the user, a tactile feeling presenting apparatus presents the tactile feeling at a base point set inside a space, a control apparatus sets a chasing point on the portion of the body detected by the sensor, the control apparatus produces the input signal based on a variation of the relative positional relation between the chasing point and the base point, and the tactile feeling presenting apparatus continuously presents the tactile feeling at the base point during an input acceptable state where any user operation is acceptable.

(10) An electronic device (such as each of a personal computer, a navigation apparatus, an air conditioner, an audio apparatus, and a gaming machine) is disclosed that includes the gesture input system in any one of (1) to (8), or that executes the gesture input method of (9).

The gesture input system and the gesture input method described in this disclosure are each realized by hardware resources such as, for example, a processor, and a memory and programs in cooperation with each other.

Fourth Embodiment

The technology for a machine (a robot) has recently been developed and the opportunities for a human and a machine to coexist with each other have increased not only in a production site like a plant or an office but also on a street or in a house. Various types of warning apparatus have been proposed that each notify the human of a hazard of the machine not using a light beam or a sound but using a tactile feeling (see, e.g., Japanese Laid-Open Patent Publication No. 2008-018896 and Japanese Laid-Open Patent Publication No. 2014-148027).

A traditional warning apparatus only notifies a human of the fact that the human is present at a position close to a vehicle or a robot, and does not report to the human items including the direction for avoiding the vehicle or the robot and the degree of the approach to the vehicle or the robot.

In each of the fourth to the tenth embodiments as below, an information transmitting apparatus will be described that can notify a human of not only any approach of the human to a predetermined object or a predetermined region (such as, for example, an apparatus or a region to which any approach of a human is unfavorable for safety) but also the situation of the approach of the human to the predetermined object or the predetermined region.

1. Configuration

Figure 16:
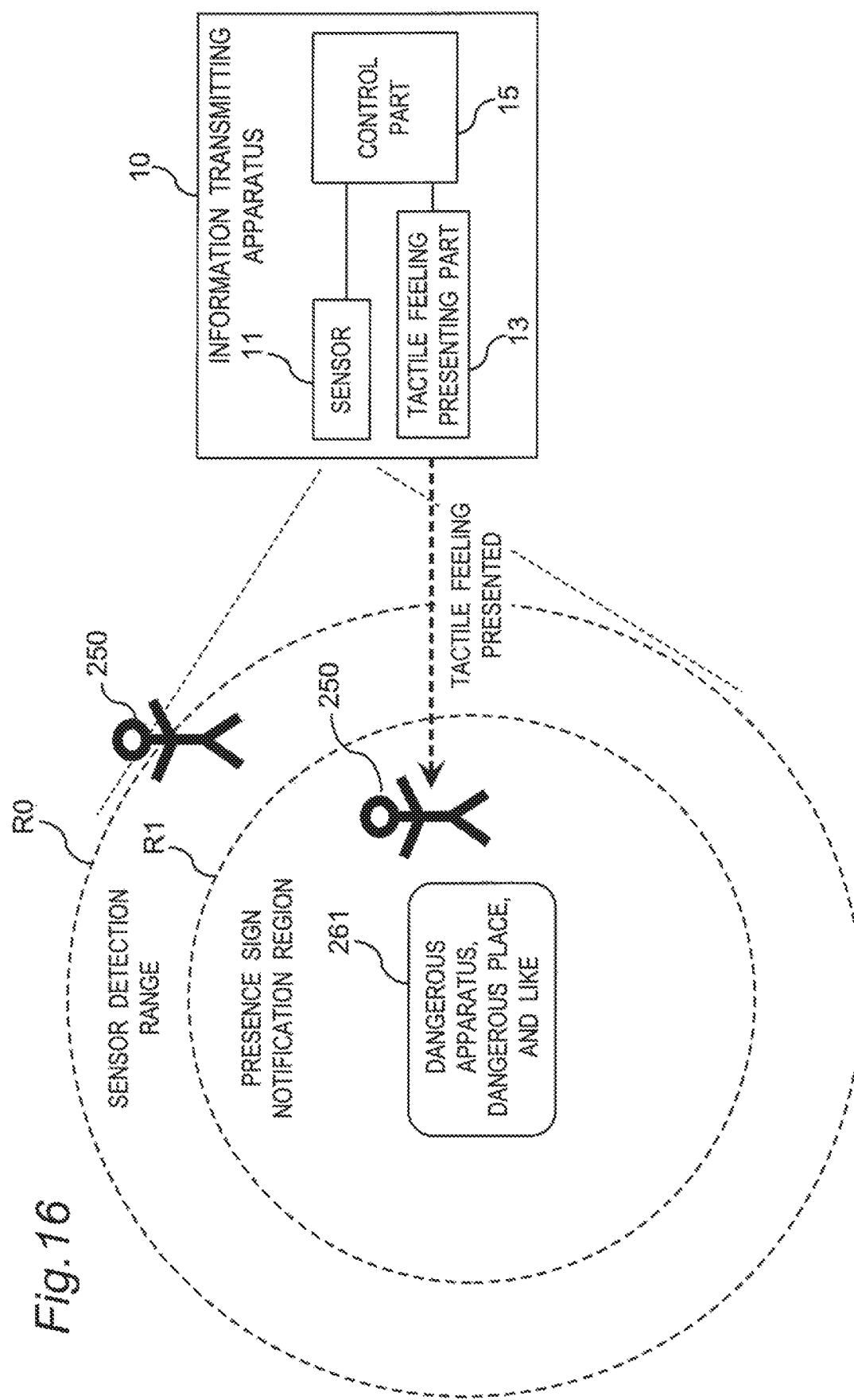
FIG. 16 is a block diagram of the configuration of an information transmitting apparatus in a fourth embodiment of this disclosure.

FIG. 16 is a diagram of the configuration of an information transmitting apparatus in the fourth embodiment of this disclosure. In this embodiment, the predetermined region including a target 261 to which any approach of a human is unfavorable is set to be a presence sign notification region R1 (an example of a warning region). The "target 261 to which any approach of a human is unfavorable" is a region in the vicinity of a motionless machine, a region in the vicinity of a mobile body such as a vehicle (a car), a drone, or a transport robot, a dangerous place (such as, for example, a stairway or a turn), or a place having an expensive item on display exhibited therein. The "presence sign notification region" is a region that notifies a human of a sign of presence of the target 261. When the information transmitting apparatus 10 detects that a human 250 enters the presence sign notification region R1, the information transmitting apparatus 10 transmits to the human 250 a warning that indicates the approach of the human 250 to the target 261, using a tactile feeling. In other words, the information transmitting apparatus 10 presents the sign of presence of the target 261 to which any approach is unfavorable, to the human 250 using the tactile feeling.

The information transmitting apparatus 10 includes a sensor 11 that detects an object in a predetermined detection range R0, a tactile feeling presenting part 13 that presents the tactile feeling to a human, and a control part 15 that controls the presentation of the tactile feeling to the human based on an output of the sensor 11.

The sensor 11 is a sensor capable of detecting the presence of an object such as a human or a machine and a motion thereof in the predetermined detection range R0. For example, the sensor 11 is a range image sensor (a TOF sensor) or a laser sensor capable of three-dimensionally detecting a motion of an object in a non-contact manner. The sensor 11 only has to be able to detect a motion of a human body and may also be a camera. The sensor 11 outputs a detection signal indicating the result of the detection to the control part 15.

The tactile feeling presenting part 13 is an apparatus capable of presenting a tactile feeling to a human (an example of the target object). The "tactile feeling" is a feeling recognizable by a human body through the skin. Examples of the feeling recognizable through the skin include a sense of touch, a sense of vibration, a sense of pressure, a sense of warmth, a sense of cold, and a sense of pain. "To present a tactile feeling" may be to provide stimulation using, for example, vibrations and/or a pressure, or may be some item that provides a warm feeling and/or a cold feeling. For example, the tactile feeling presenting part 13 may provide vibrations and/or an acoustic radiation pressure to the user using a vibrator (such as, for example, an ultrasonic vibrator), or may provide an impact caused by bringing plasma produced by a laser beam and the skin into contact with each other. Otherwise, the tactile feeling presenting part 13 may includes a nozzle and a pump and may provide an air flow to the user. Otherwise, the tactile feeling presenting part 13 may provide a warm feeling to the user using an IR beam source, or may provide a cold feeling to the user using a Peltier element. In other words, the tactile feeling presenting part 13 may include at least one selected from the group consisting of a vibrator, a laser, a compressor, a fan, a Peltier element, and an IR beam source. "To present the tactile feeling in the air" is to cause the human body to feel the tactile feeling without being in contact with the human body. Otherwise, the tactile feeling presenting part 13 may be an apparatus that includes a nozzle and a pump and that ejects an air flow (an air flow producing apparatus).

An acoustic radiation pressure of an ultrasonic wave may be used as the tactile feeling presentation. For example, the tactile feeling presenting part 13 may include an ultrasonic vibrator array that is constituted by placing plural ultrasonic vibrators side by side. The ultrasonic vibrator array can present a tactile feeling to the surface of the human body by producing a focus of the ultrasonic wave at an optional position in the air. At the focus of the ultrasonic wave, a static pressure called "acoustic radiation pressure" is generated in addition to the vibrations of the acoustic pressure. The static pressure called "acoustic radiation pressure" is generated when an ultrasonic wave propagating in the air is blocked by an object whose acoustic impedance is different from that of the air. With an ultrasonic wave having a high acoustic pressure level, a force is generated that pushes the surface of the body and that is recognizable by the human, by the fact that the ultrasonic wave is blocked by the surface of the body. The force can thereby be presented to the body in a non-contact manner.

The "ultrasonic wave" generally refers to a sonic wave at a frequency of 20 kHz or higher and is unheard by the human ears. To present a tactile feeling not relying on the sense of hearing, the frequency only has to be set to be 20 kHz or higher. No restriction is imposed on the upper limit of the frequency of the ultrasonic wave while the attenuation of the ultrasonic wave propagating in the air becomes larger as the frequency becomes higher, and the frequency at which the tactile feeling presentation is executed using an ultrasonic wave is therefore preferably 20 kHz to 200 kHz and more preferably 20 kHz to 100 kHz. The acoustic pressure level of an ultrasonic wave at which a pressure recognizable by a human can be presented to the surface of the body is 140 dB or higher, preferably 150 dB or higher, and more preferably 160 dB or higher.

An acoustic radiation pressure is temporally varied by intermittently driving or amplitude-modulating an ultrasonic vibrator, and a more perceivable tactile feeling can thereby be presented to the user. In this case, a vibration frequency is present for which the cutaneous sense receptor supervising the vibration feeling has high sensitivity. A stronger tactile feeling can be provided for an equal acoustic radiation pressure by matching the modulation driving of the acoustic radiation pressure with the vibration frequency for the high sensitivity. This modulation frequency is preferably 0 to 300 Hz and more preferably 100 Hz to 300 Hz. The user can be caused to always feel, for example, a tactile feeling of vibrations by an acoustic radiation pressure amplitude-modulated at several Hz and a tactile feeling like a static pressure by an acoustic radiation pressure amplitude-modulated at 200 Hz.

When the tactile feeling is provided to the user, it is effective that the static pressure provided to the user by the amplitude-modulating an acoustic radiation pressure at 200 Hz is doubly amplitude-modulated. For example, a more perceivable tactile feeling can be presented to the user by doubly modulating using, for example, vibrations at several Hz, vibrations generated when a switch is pressed, or vibrations generated when an object is hit.

The control part 15 presents a tactile feeling to a human by controlling the tactile feeling presenting part 13 based on the information detected by the sensor 11. The control part 15 can be realized by a semiconductor element or the like, and includes a microcomputer, a CPU, an MPU, a DSP, an FPGA, an ASIC, or the like. The control part 15 may be realized by a combination of hardware and software or may include only hardware.

2. Operation

A warning operation executed by the information transmitting apparatus 10 having the above configuration will be described. As above, for the information transmitting apparatus 10, a predetermined range including the target 261 to which any approach by a human is unfavorable (a dangerous place such as, for example, a robot, a vehicle, a turn, or a stairway) is set as a presence sign notification region R1. The sensor 11 is arranged such that the detection range R0 of the sensor 11 includes the presence sign notification region R1.

When the sensor 11 detects entrance of a human 250 into the presence sign notification region R1, the information transmitting apparatus 10 present a tactile feeling to the human 250. A sign of presence of the target 261 is thereby provided to the human 250. Especially, when the information transmitting apparatus 10 executes a warning using the tactile feeling, the information transmitting apparatus 10 changes the presentation method for the tactile feeling based on the behavior (the move direction and the move velocity) of the human 250 in the presence sign notification area R1. The presentation method for the tactile feeling, that differs based on the behavior of the human 250 in the presence sign notification area R1 will be described below with reference to FIG. 17.

Figure 17:
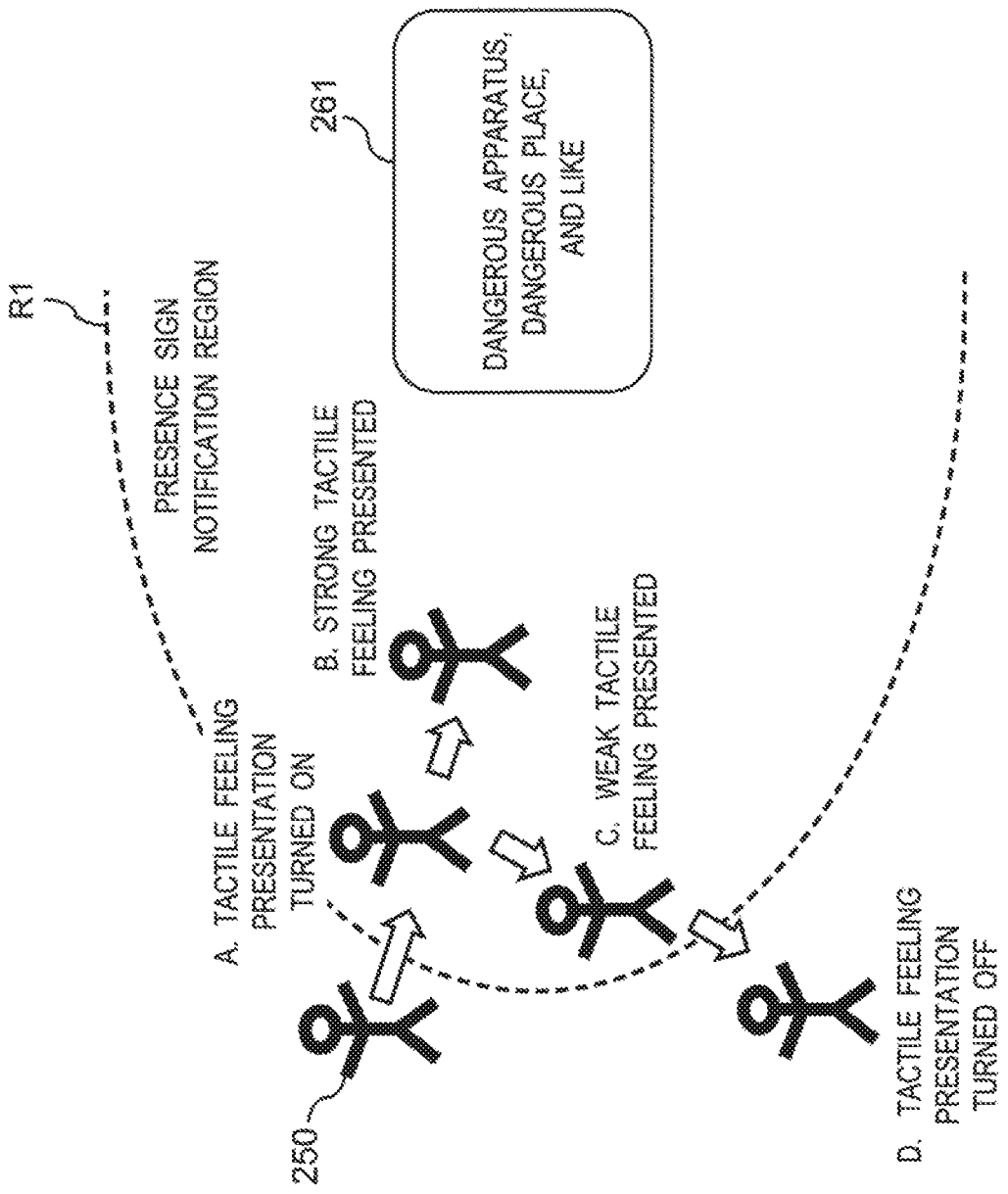
FIG. 17 is a diagram for explaining a method for tactile feeling presentation in a presence sign notification region in the fourth embodiment.

FIG. 17 is a diagram for explaining the change of the method for tactile feeling presentation executed by the information transmitting apparatus 10 when the human 250 enters the presence sign notification region R1. When the information transmitting apparatus 10 detects the entrance of the human 250 from the exterior of the presence sign notification region R1 into the presence sign notification region R1, the information transmitting apparatus 10 starts the presentation of the tactile feeling to the human 250 (a state A).

In this case, when the human 250 moves in the direction for the human 250 to become distant from the outer circumference of the presence sign notification region R1, in the presence sign notification region R1 (that is, the human 250 approaches the dangerous target 261), the information transmitting apparatus 10 determines that the emergency degree is high, and presents the tactile feeling to the human 250 using the tactile feeling presentation method for the high emergency degree. The information transmitting apparatus 10 presents, for example, a strong tactile feeling (a state B). On the other hand, when the human 250 moves toward the outer circumference of the presence sign notification region R1, in the presence sign notification region R1 (that is, the human 250 becomes distant from the dangerous target 261), the information transmitting apparatus 10 determines that the emergency degree is low, and presents the tactile feeling to the human 250 using the tactile feeling presentation method for the low emergency degree. The information transmitting apparatus 10 presents, for example, a weak tactile feeling (a state C).

When the information transmitting apparatus 10 thereafter detects that the human 250 exits the presence sign notification region R1 from the inside of the presence sign notification region R1, the information transmitting apparatus 10 discontinues the presentation of the tactile feeling to the human 250 (a state D).

As above, when the human 250 enters the presence sign notification region R1, the presentation method for the tactile feeling presented to the human 250 is changed in accordance with the move direction of the human 250. The human 250 can thereby intuitively learn from the presented tactile feeling that the human 250 approaches the dangerous target 261 or becomes distant therefrom when the human 250 enters the presence sign notification region R1, and the human 250 can reliably move to the outer side of the presence sign notification region R1.

FIG. 18 is a diagram explaining an example of the tactile feeling presentation method that is changed in accordance with the emergency degree. In the example in FIG. 18, the emergency degrees are divided into two levels of "high" and "low" and the tactile feeling presentation method is caused to differ in accordance with the emergency degree. As depicted in FIG. 18, in accordance with the emergency degree, the frequency and the site of the human body to present the tactile feeling at may be varied in addition to the strength of the tactile feeling. Otherwise, in accordance with the emergency degree, the height of the temperature of the tactile feeling (such as, for example, that of a wind) may be varied. For example, when the emergency degree is low, a tactile feeling at a low frequency may be presented and, when the emergency degree is high, a tactile feeling at a high frequency may be presented. When the emergency degree is low, a tactile feeling may be presented to a trunk of the body or the hand and, when the emergency degree is high, a tactile feeling may be presented to a site that is more sensitive of a human such as a head or a face of the human. When the emergency degree is low, a warm feeling (a warm wind) may be presented to the body of the human and, when the emergency degree is high, a cold feeling (a cold wind) may be presented thereto. When the emergency degree is low, the presentation may be executed using a weak wind and, when the emergency degree is high, the presentation may be executed using a strong wind. In accordance with the emergency degree, any one of the strength of the tactile feeling, the frequency of the tactile feeling, the presentation position of the tactile feeling, the strength of the warm feeling/the cold feeling, and the strength of the wind may be varied or any proper combination thereof may be varied.

Figure 19:
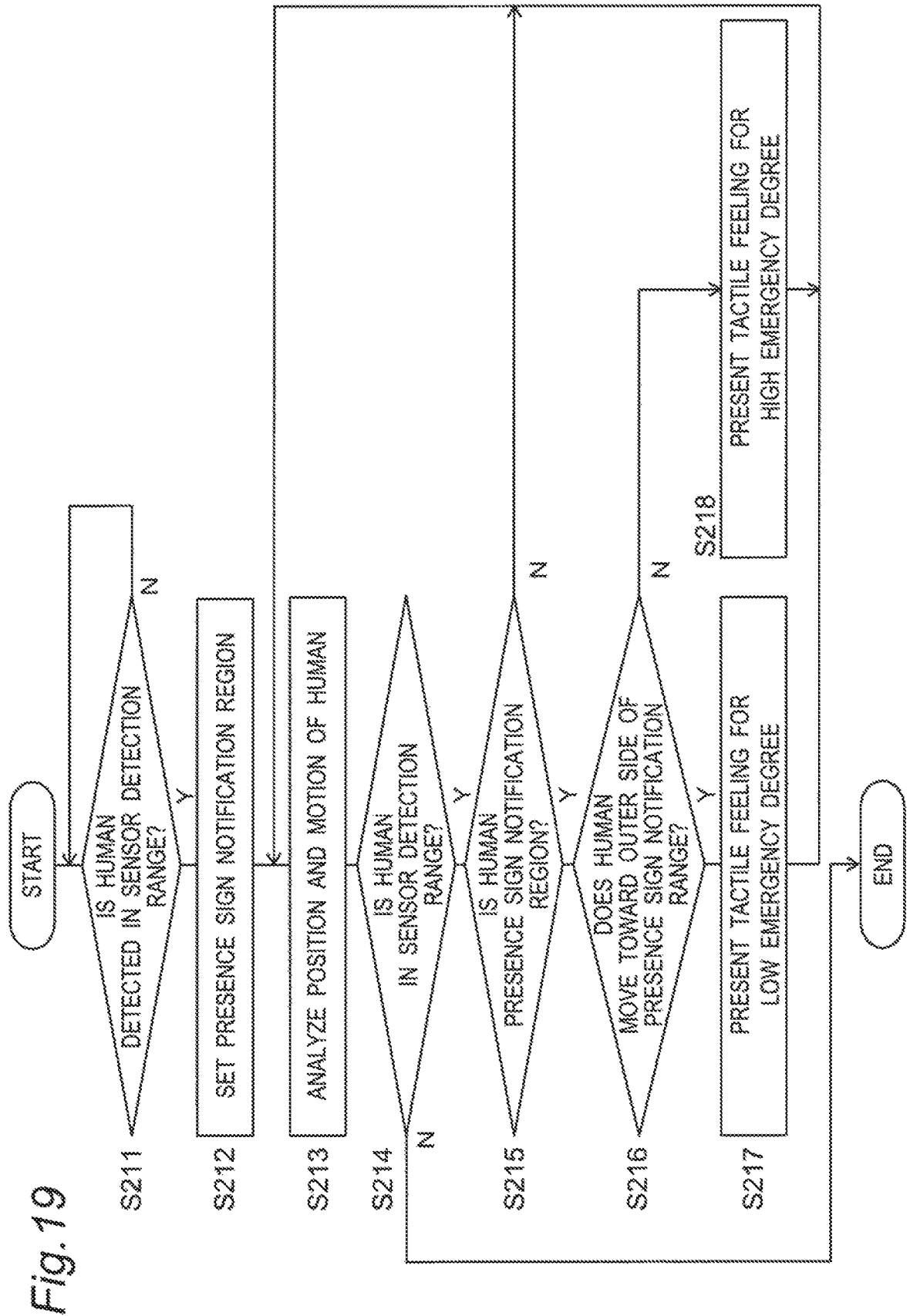
FIG. 19 is a flowchart of a warning operation of the information transmitting apparatus in the fourth embodiment.

FIG. 19 is a flowchart of the warning operation of the information transmitting apparatus 10 in the fourth embodiment. The operations of the information transmitting apparatus 10 will be described below with reference to the flowchart in FIG. 19.

In the information transmitting apparatus 10, when the sensor 11 detects the entrance of the human 250 into the detection range R0 (YES at S211), the control part 15 sets the predetermined range including the dangerous target 261 to be the presence sign notification region R1 (S212).

The control part 15 receives the detection signal from the sensor 11 and analyzes the position and the motion of the human 250 based on the detection signal (S213). When the human 250 is not detected in the detection range R0 as the result of the analysis (NO at S214), this process is caused to come to an end. When the human 250 is detected in the detection range R0 as the result of the analysis (YES at S214), the control part 15 determines whether the human 250 is detected in the presence sign notification region R1 (S215).

When the control part 15 determines that the human 250 is not detected in the presence sign notification region R1 (NO at S215), the control part 15 returns to step S213 and executes the above processes.

When the control part 15 determines that the human 250 is detected in the presence sign notification region R1 (YES at S215), the control part 15 determines whether the human 250 moves toward the outer circumference of the presence sign notification region R1 (S16). When the control part 15 determines that the human 250 moves toward the outer circumference of the presence sign notification region R1 (YES at S216), the control part 15 presents the tactile feeling for the low emergency degree (S17). When the control part 15 determines that the human 250 does not move toward the outer circumference of the presence sign notification region R1 (YES at S26), the control part 15 presents the tactile feeling for the high emergency degree (S18).

The control part 15 thereafter returns to step S213 and executes the above processes based on the detection signal from the sensor 11.

As above, the information transmitting apparatus 10 of this embodiment includes the sensor 11 capable of detecting the position and the velocity of the human 250 (an example of the object) entering the detection range R0 of the sensor (an example of the predetermined range), the tactile feeling presenting part 13 that presents the tactile feeling to the target object in the non-contact manner, and the control part 15 that controls the tactile feeling presenting part 13 to present the tactile feeling to the detected human when the human 250 is detected in the presence sign notification region R1 (an example of the warning region) set in the detection range R0 by the sensor 11. The control part 15 determines the type, the strength, and/or the position of the tactile feeling to be presented by the tactile feeling presenting part based on the behavior (the move direction and the move velocity) of the human in the presence sign notification region R1.

The information transmitting apparatus 10 presents the tactile feeling to the human changing the presentation method for the tactile feeling based on the motion of the human in the presence sign notification region R1 when the human enters the presence sign notification region R1. The human entering the presence sign notification region R1 receives the tactile feeling, can thereby sensuously recognize the sign of presence of the dangerous target 261, that is, the fact that the human approaches the target 261 and the direction of the target 261, and can take a proper avoidance action against the target 261.

Fifth Embodiment

Figure 20:
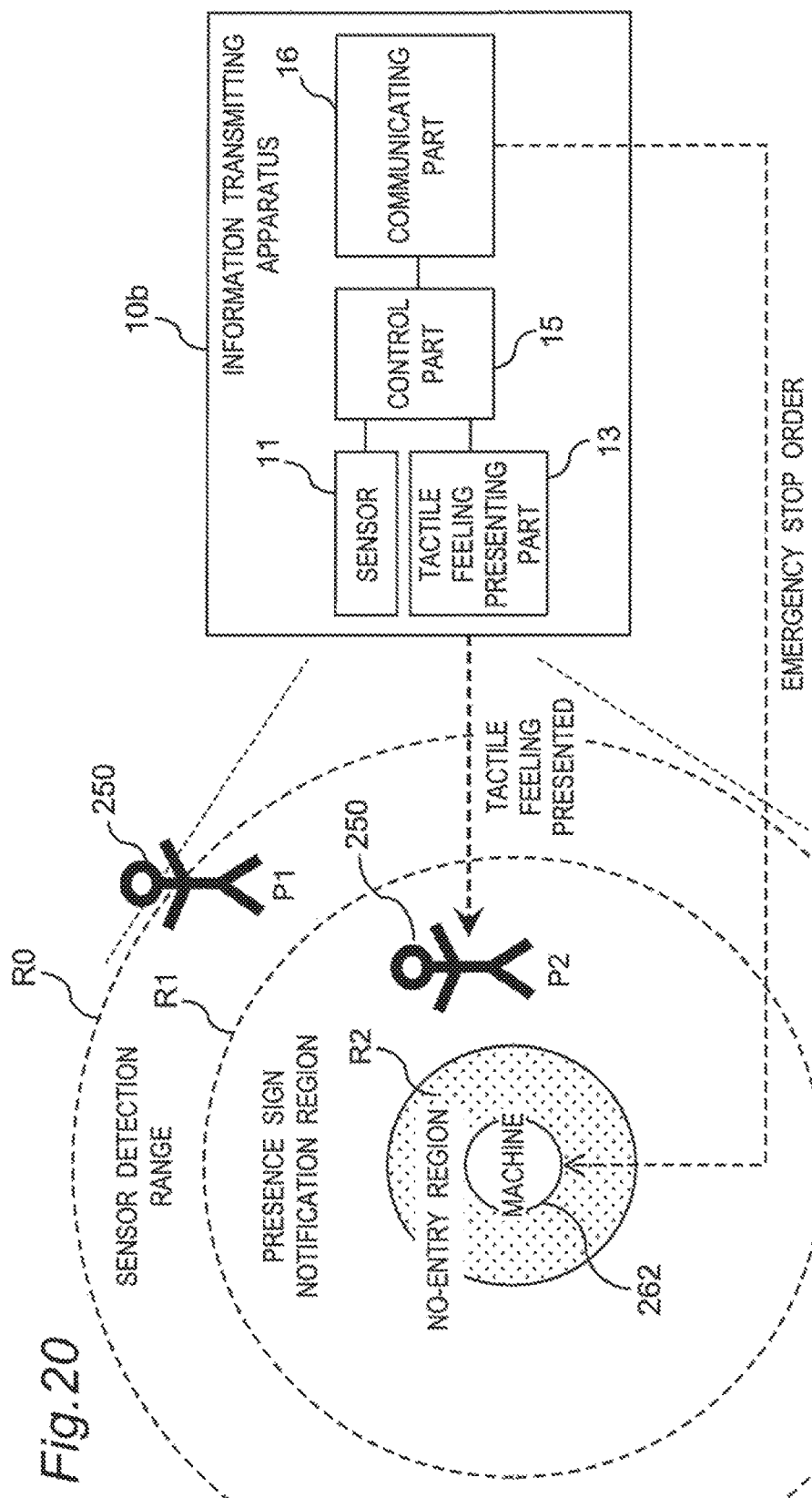
FIG. 20 is a block diagram of the configuration of an information transmitting apparatus in a fifth embodiment of this disclosure.

FIG. 20 is a block diagram of the configuration of an information transmitting apparatus 10b in the fifth embodiment of this disclosure. In the fifth embodiment, a no-entry region R2 is further set in addition to the presence sign notification region R1, as the warning region. The no-entry region R2 is set in the presence sign notification region R1. The no-entry region R2 has a machine 262 arranged (fixed) therein to which any approach of the human is unfavorable for safety.

The information transmitting apparatus 10b of this embodiment further includes a communicating part 16 to execute communication with the machine 262 in the configuration of the information transmitting apparatus 10 of the fourth embodiment. The information transmitting apparatus 10b can transmit an emergency stop order to stop the machine 262 to the machine 262 installed in the no-entry region R2 through this communicating part 16.

Figure 21:
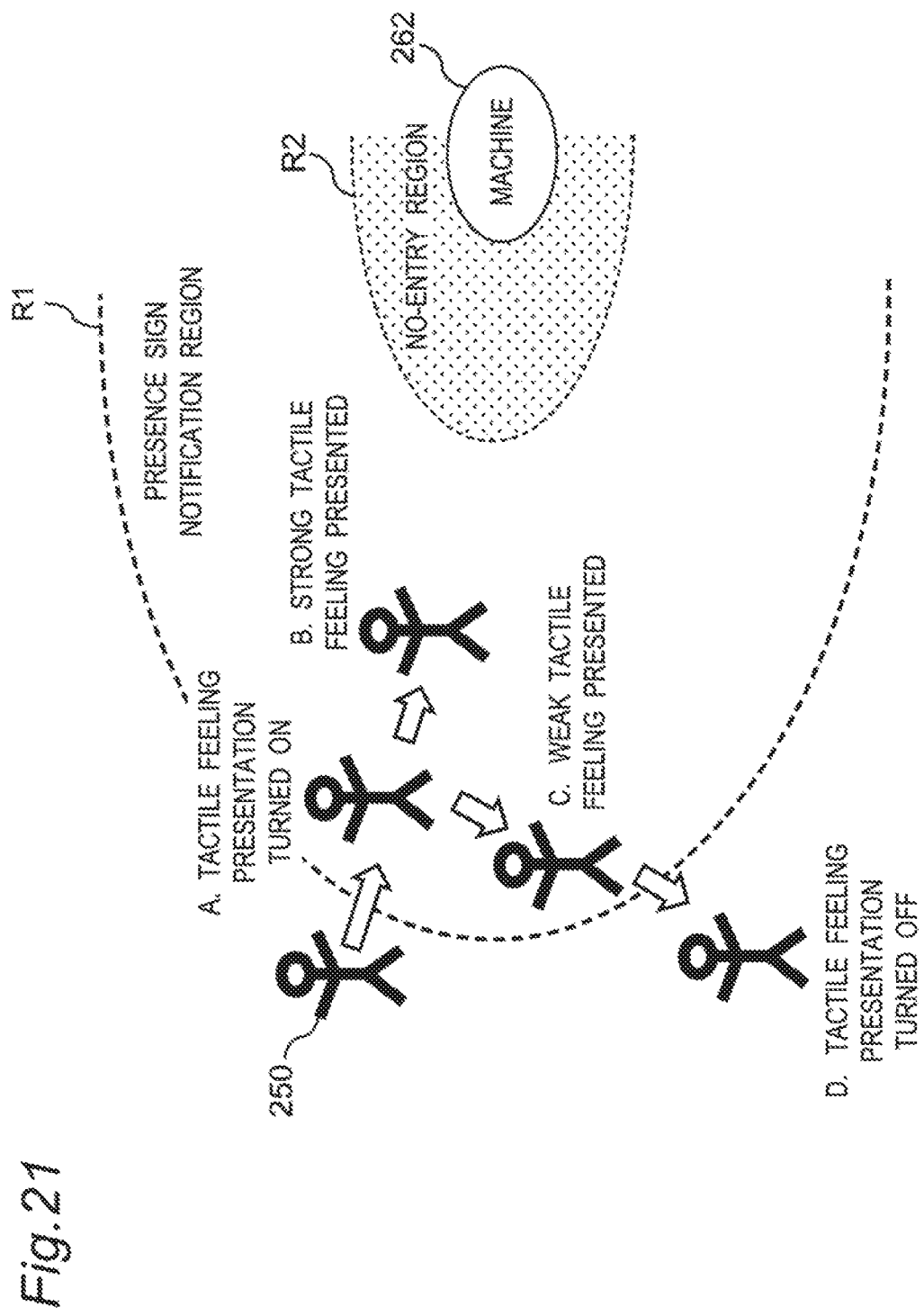
FIG. 21 is a diagram for explaining a method for tactile feeling presentation in a presence sign notification region in the fifth embodiment.

FIG. 21 is a diagram for explaining a tactile feeling presentation method executed by the information transmitting apparatus 10b of this embodiment. When the information transmitting apparatus 10b detects the entry of the human 250 into the presence sign notification region R1 from the exterior of the presence sign notification region R1, the information transmitting apparatus 10b starts the presentation of the tactile feeling to the human 250 (the state A). In this case, when the human 250 approaches the no-entry region R2 in the presence sign notification region R1, the information transmitting apparatus 10 determines that the emergency degree is high and presents the tactile feeling to the human 250 using the tactile feeling presentation method for the high emergency degree (the state B). On the other hand, when the human 250 becomes distant from the no-entry region R2 in the presence sign notification region R1, the information transmitting apparatus 10b determines that the emergency degree is low and presents the tactile feeling to the human 250 using the tactile feeling presentation method for the low emergency degree (the state C). The manner of changing the tactile feeling presentation method is as described in the fourth embodiment.

Figure 22:
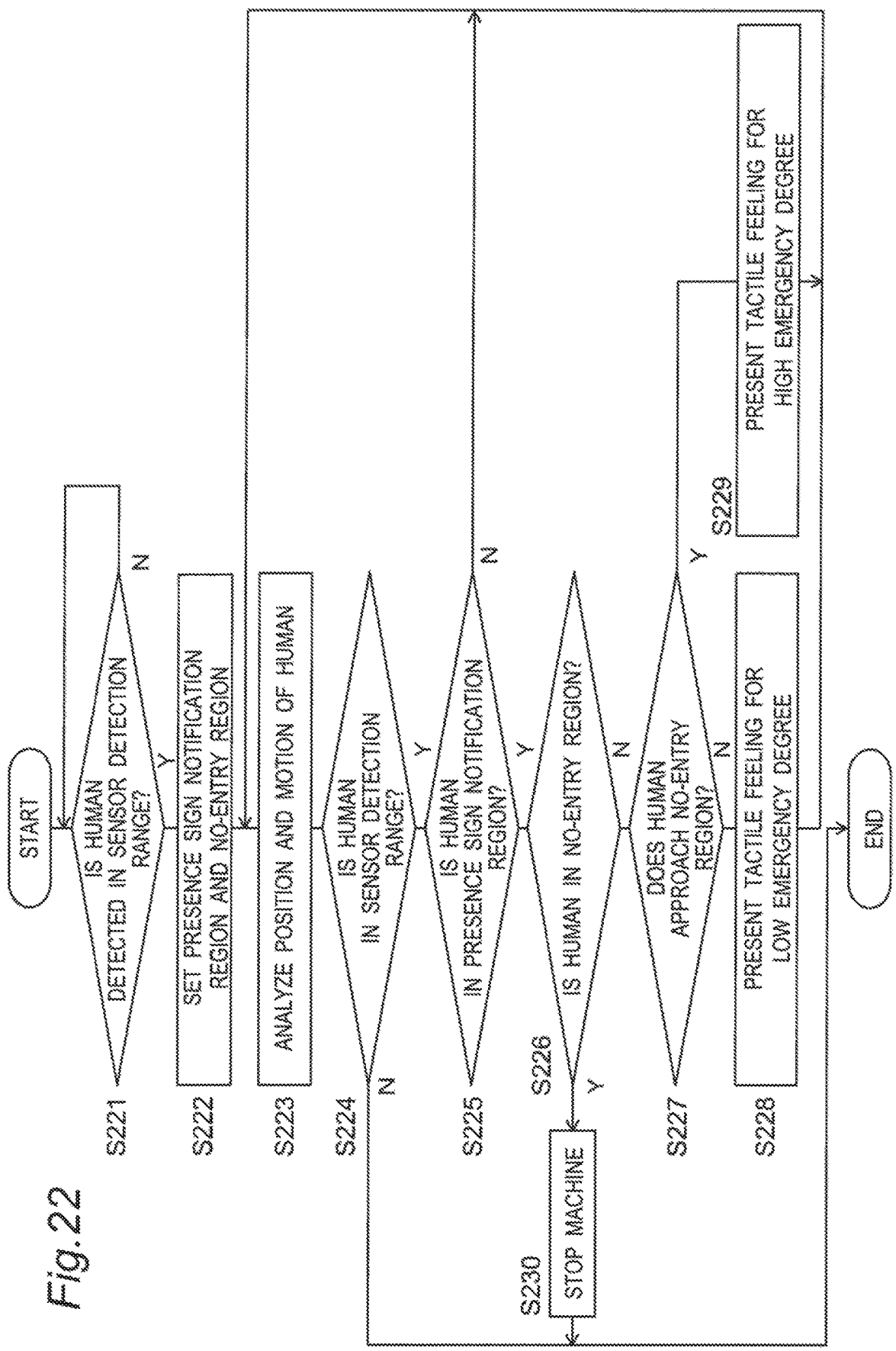
FIG. 22 is a flowchart of a warning operation of the information transmitting apparatus of the fifth embodiment.

FIG. 22 is a flowchart of an operation of the information transmitting apparatus 10b in the fifth embodiment. The operations of the information transmitting apparatus 10b will be described below with reference to the flowchart in FIG. 22.

In the information transmitting apparatus 10b, when the sensor 11 detects the entrance of the human 250 into the detection range R0 (YES at S221), the control part 15 sets the presence sign notification region R1 and the no-entry region R2 (S222). The control part 15 sets a predetermined range including the machine 262 into which any entry of the human 250 is unfavorable for safety, in the vicinity of the machine 262 as the no-entry region R2. The control part 15 further sets a predetermined range on the outer side of the no-entry region R2 to be the presence sign notification region R1.

The control part 15 receives the detection signal from the sensor 11 and analyzes the position and the motion of the human 250 based on the detection signal (S223). When the human 250 is not detected in the detection range R0 as the result of the analysis (NO at S224), this process is caused to come to an end. When the human 250 is detected in the detection range R0 as the result of the analysis (YES at S224), the control part 15 determines whether the human 250 is detected in the presence sign notification region R1 (S225).

When the control part 15 determines that the human is not detected in the presence sign notification region R1 (NO at 8225), the control part 15 returns to step S223 and executes the above processes based on the detection signal from the sensor 11.

When the control part 15 determines that the human is detected in the presence sign notification region R1 (YES at S225), the control part 15 determines whether the human 250 enters the no-entry region R2 (S226). When the control part 15 determines the detection of the fact that the human 250 enters the no-entry region R2 (YES at S226), the control part 15 stops the machine 262 (S230). The control part 15 therefore transmits an emergency stop order to the machine 262 through the communicating part 16. When the machine 262 receives the emergency stop order, the machine 262 stops its operation.

When the control part 15 determines that no entry is detected of the human 250 into the no-entry region R2 (NO at S226), the control part 215 determines whether the human 250 approaches the no-entry region R2 (S227).

When the control part 215 determines that the human 250 approaches the no-entry region R2 (YES at S227), the control part 15 presents the tactile feeling for the high emergency degree (S29). When the control part 215 determines that the human 250 does not approach the no-entry region R2 (NO at S227), the control part 15 presents the tactile feeling for the low emergency degree (S228).

The control part 15 thereafter returns to step S223 and repeats the above processes based on the detection signal from the sensor 11.

As above, in this embodiment, the information transmitting apparatus 10b changes the tactile feeling presentation method based on whether the human approaches the no-entry region R2 in the presence sign notification region R1. The human 250 entering the presence sign notification region R1 can thereby sensuously recognize the approach thereof to the no-entry region R2 and the direction of the no-entry region R2 and can thereby properly take the avoidance action against the no-entry region R2, by receiving the tactile feeling. The emergency stop order is transmitted to the machine 262 installed in the no-entry region R2 when the human 250 enters the no-entry region R2. The machine 262 installed in the no-entry region R2 can thereby be urgently stopped and the safety can be secured.

Sixth Embodiment

The dangerous target 261 in the presence sign notification region R1 does not move in the fourth embodiment while, in this embodiment, an example will be described where the presence sign notification region R1 is set based on the position of a moving machine like a vehicle, a drone, or a transport robot.

Figure 23:
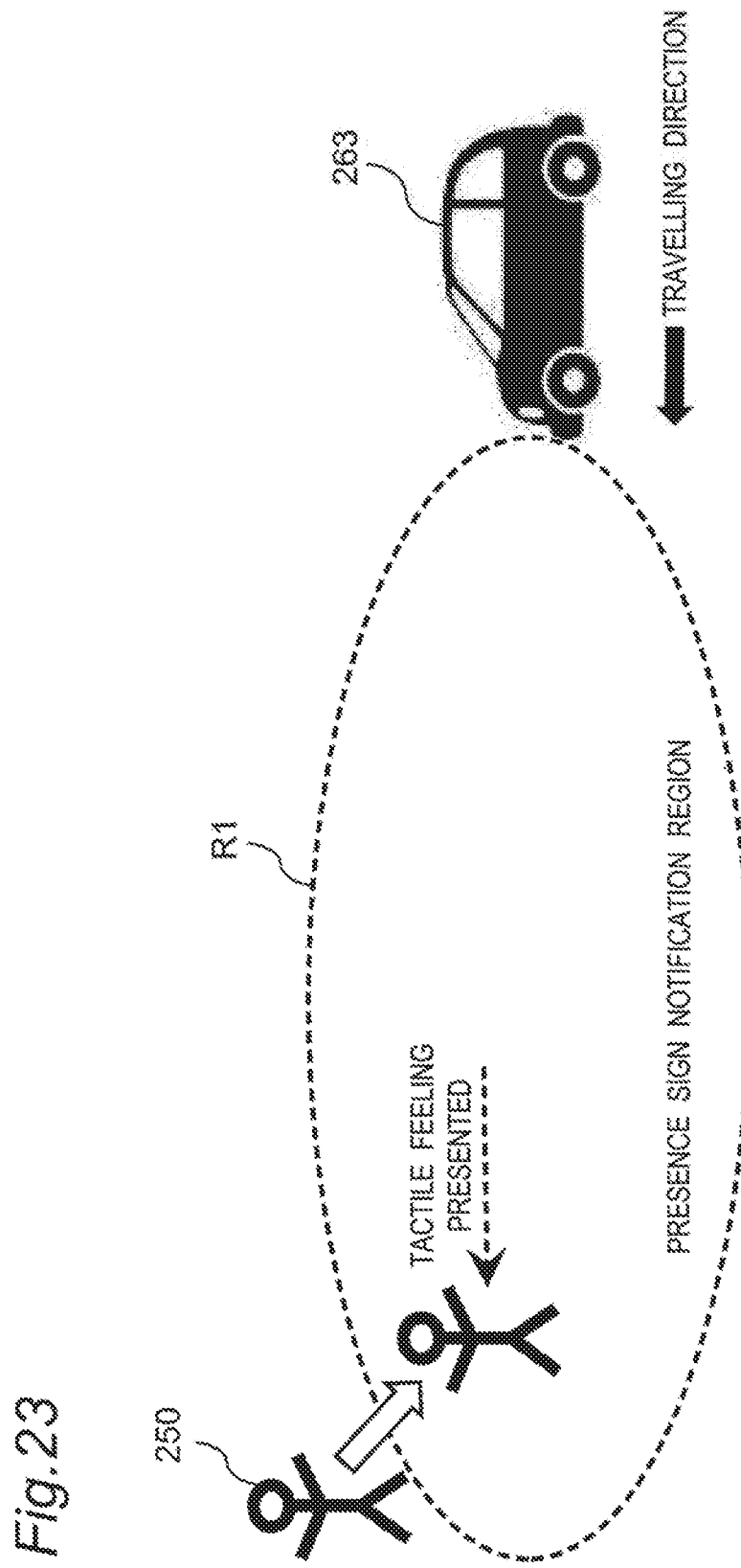
FIG. 23 is a diagram explaining a presence sign notification region set by an information transmitting apparatus in a sixth embodiment of this disclosure.
Figure 24:
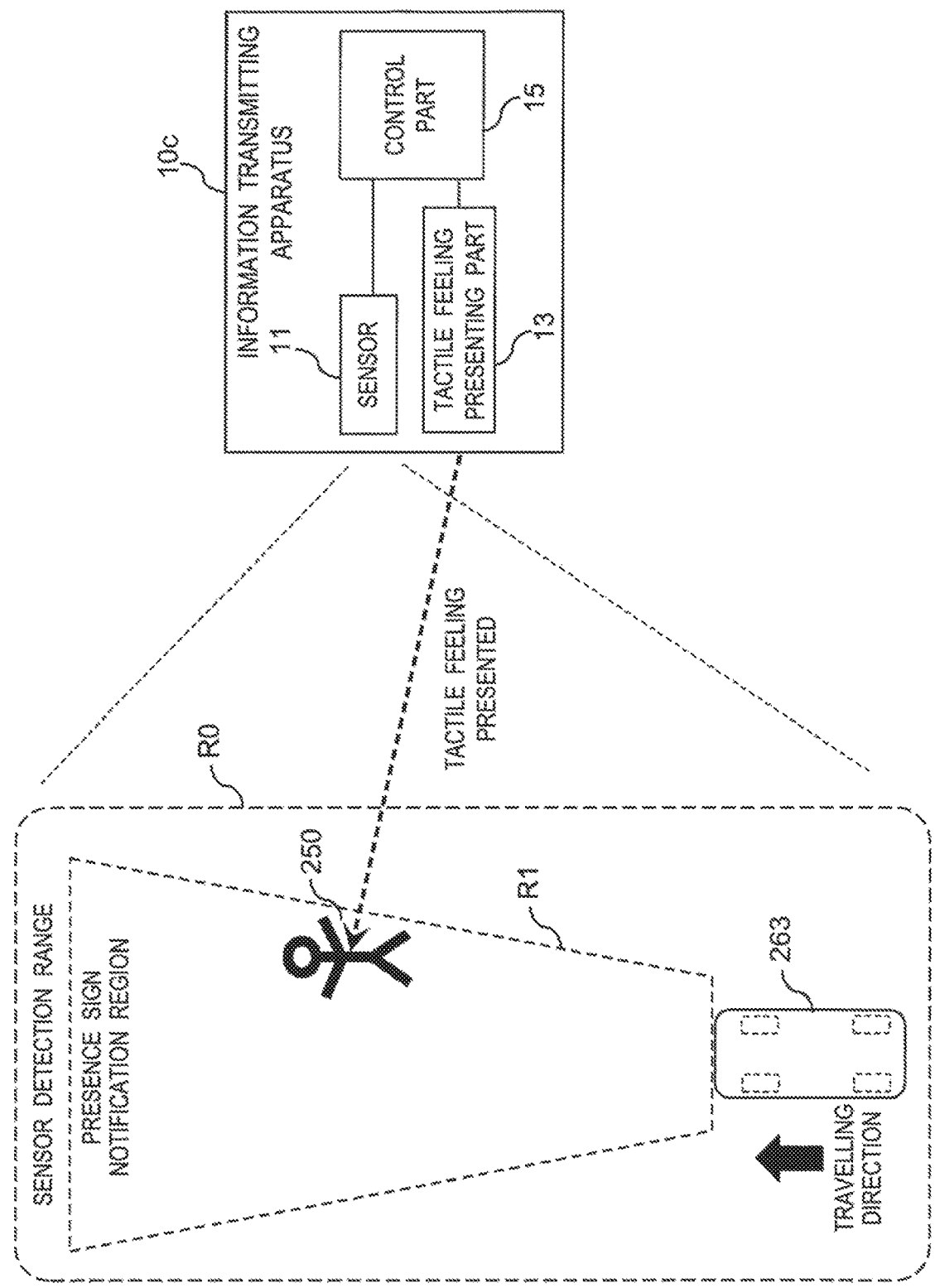
FIG. 24 is a block diagram of the configuration of the information transmitting apparatus in the sixth embodiment of this disclosure.

FIG. 23 is a diagram explaining the presence sign notification region R1 set by an information transmitting apparatus in the this embodiment. FIG. 24 is a block diagram of the configuration of the information transmitting apparatus 10c of this embodiment. As depicted in FIG. 24, the information transmitting apparatus 10c of this embodiment has the same configuration as that of the information transmitting apparatus 10 of the fourth embodiment.

As depicted in FIGS. 23 and 24, in this embodiment, the presence sign notification region R1 is set in the vicinity of a vehicle 263 (an example of the moving machine). For example, the presence sign notification region R1 is set in a predetermined region in front of the vehicle 263. Because the vehicle 263 moves, the presence sign notification region R1 also moves associated with the move of the vehicle 263. The presence sign notification region R1 is dynamically set based on at least any one of the position, the velocity, and the travelling direction of the vehicle 263. When the human 250 enters the presence sign notification region R1, a tactile feeling is presented to the human 250 for warning.

Figure 25:
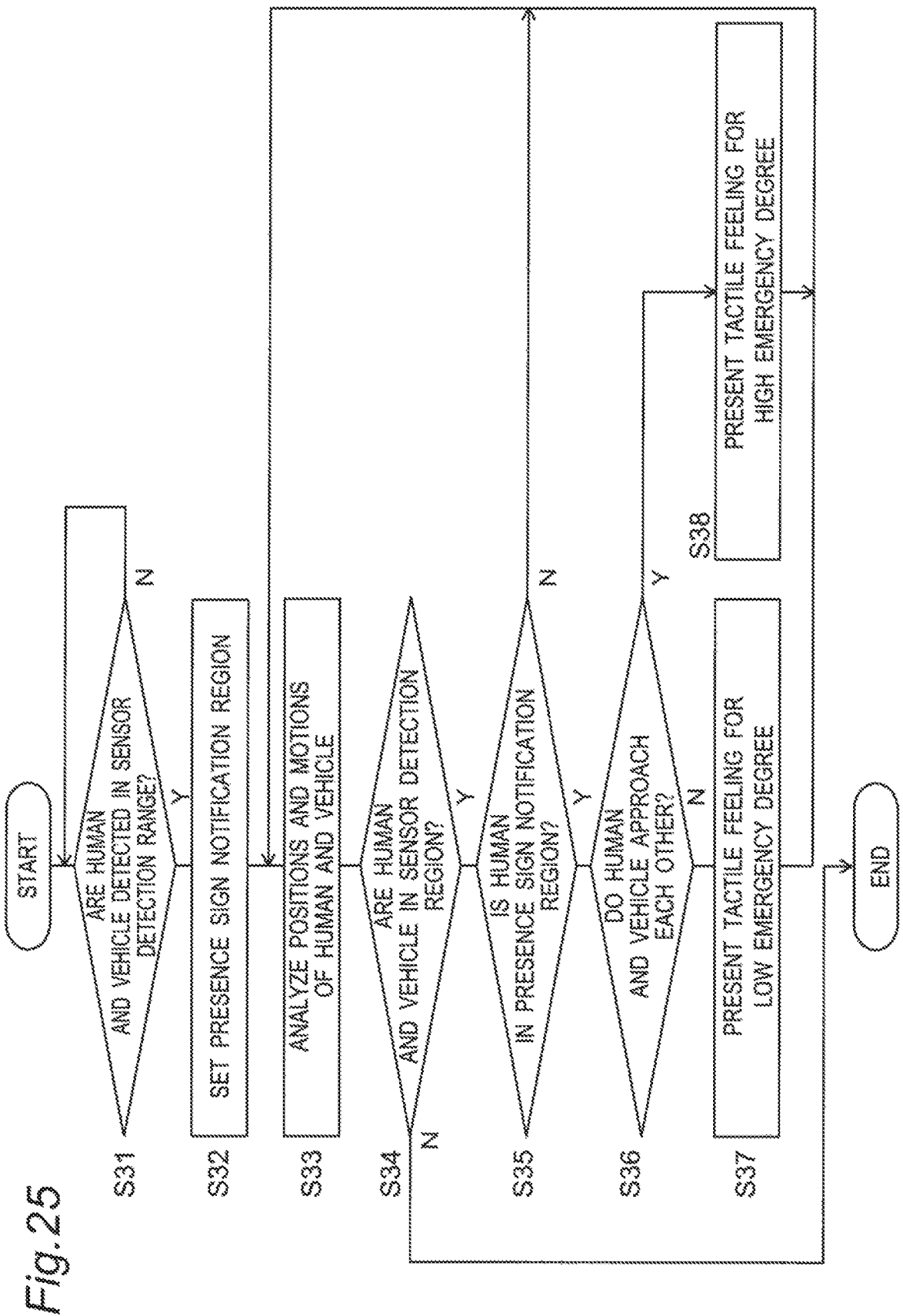
FIG. 25 is a flowchart of a warning operation of the information transmitting apparatus in the sixth embodiment.

FIG. 25 is a flowchart of operations of the information transmitting apparatus 10c in the sixth embodiment. The operations of the information transmitting apparatus 10c will be described with reference to the flowchart in FIG. 25.

In the information transmitting apparatus 10c, when the sensor 11 detects the entrance of the human 250 and the vehicle 263 into the detection range R0 (YES at S31), the control part 15 sets the presence sign notification region R1 (S32). The control part 15 recognizes the position and the move direction of the vehicle 263 based on the detection signal from the sensor 11 and sets the presence sign notification region R1 in the predetermined region in front of the vehicle 263 and in proximity to the vehicle 263.

The control part 15 receives the detection signal from the sensor 11 and analyzes the position and the motion of each of the human 250 and the vehicle 263 based on the detection signal (S33). When the human 250 and the vehicle 263 are not detected in the detection range R0 as the result of the analysis (NO at S34), this process is caused to come to an end. When the human 250 and the vehicle 263 are detected in the detection range R0 as the result of the analysis (YES at S34), the control part 15 determines whether the human 250 is detected in the presence sign notification region R1 (S35).

When the control part 15 determines that the human 250 is not detected in the presence sign notification region R1 (NO at S35), the control part 15 returns to step S33 and executes the above processes based on the output from the sensor 11.

When the control part 15 determines that the human 250 is detected in the presence sign notification region R1 (YES at S35), the control part 15 determines whether the human 250 and the vehicle 263 approach each other (S36). When the control part 15 determines that the human 250 and the vehicle 263 approach each other (YES at S36), the control part 15 presents the tactile feeling for the high emergency degree (S38). In this case, the risk is high for the human 250 and the vehicle 263 to be brought into contact with each other and the tactile feeling for the high emergency degree is therefore presented. When the control part 15 determines that the human 250 and the vehicle 263 do not approach each other (NO at S36), the control part 15 presents the tactile feeling for the low emergency degree (S37).

The control part 15 thereafter returns to step S33 and executes the above processes based on the detection signal from the sensor 11.

As above, in this embodiment, the presence sign notification region R1 is set in accordance with the motion of the moving vehicle 263 (the moving machine) and the warning can therefore be executed for the human 250 for the human 250 not to approach the vehicle 263 too closely. At this time, the presentation method for the tactile feeling is changed based on the relative positional relation between the human 250 and the vehicle 263. The human 250 can thereby feel the sign of presence of the vehicle 263, can thereby sensuously recognize the approach of the vehicle 263 and the direction of the vehicle 263, and can take a proper avoidance action against the vehicle 263.

The description has been made using the vehicle as an example of the moving machine in this embodiment while the moving machine may be another apparatus and may be, for example, a drone, or a transport robot that carries an article on the ground or in the air.

Seventh Embodiment

Figure 26:
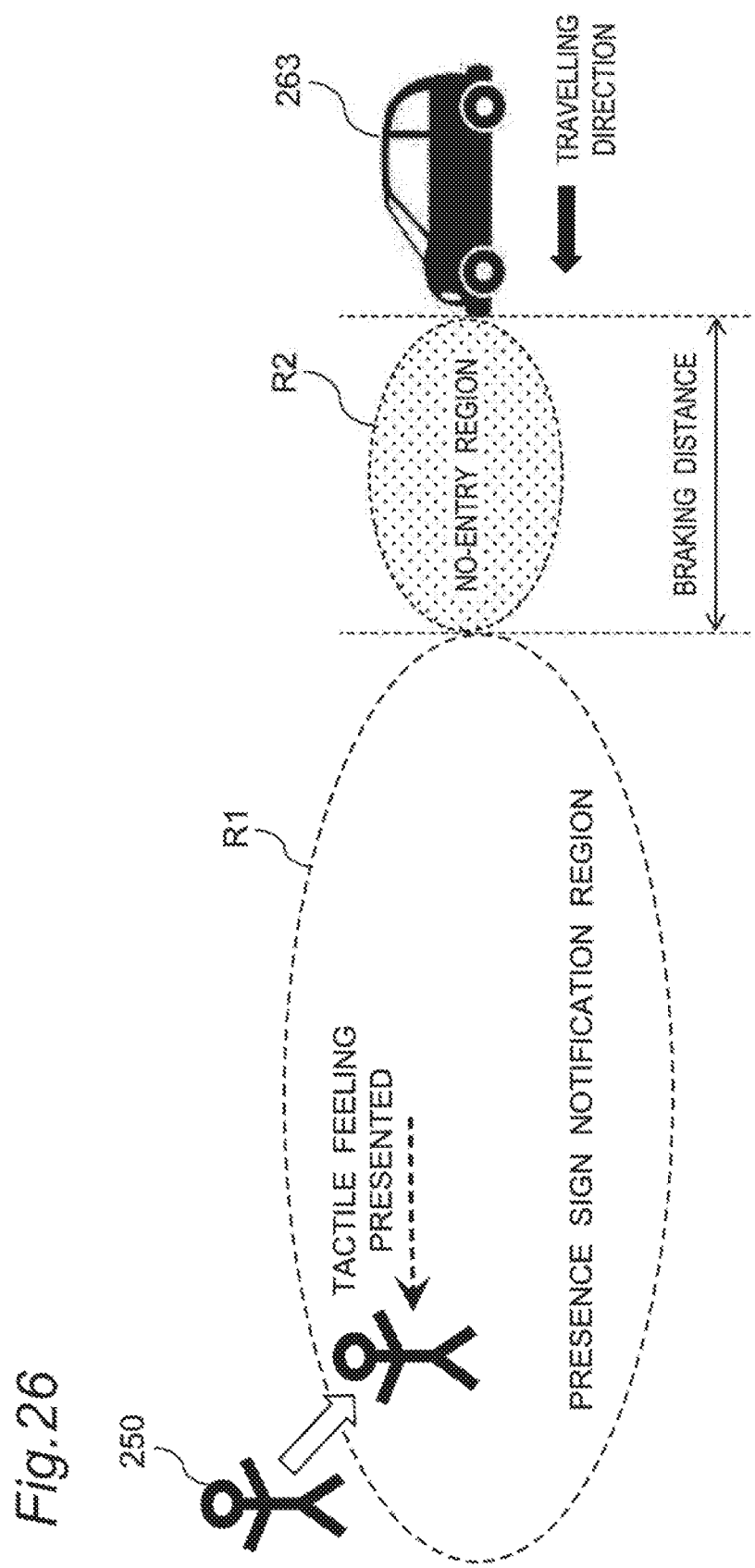
FIG. 26 is a diagram explaining a presence sign notification region and a no-entry region that are set by an information transmitting apparatus in a seventh embodiment of this disclosure.
Figure 27:
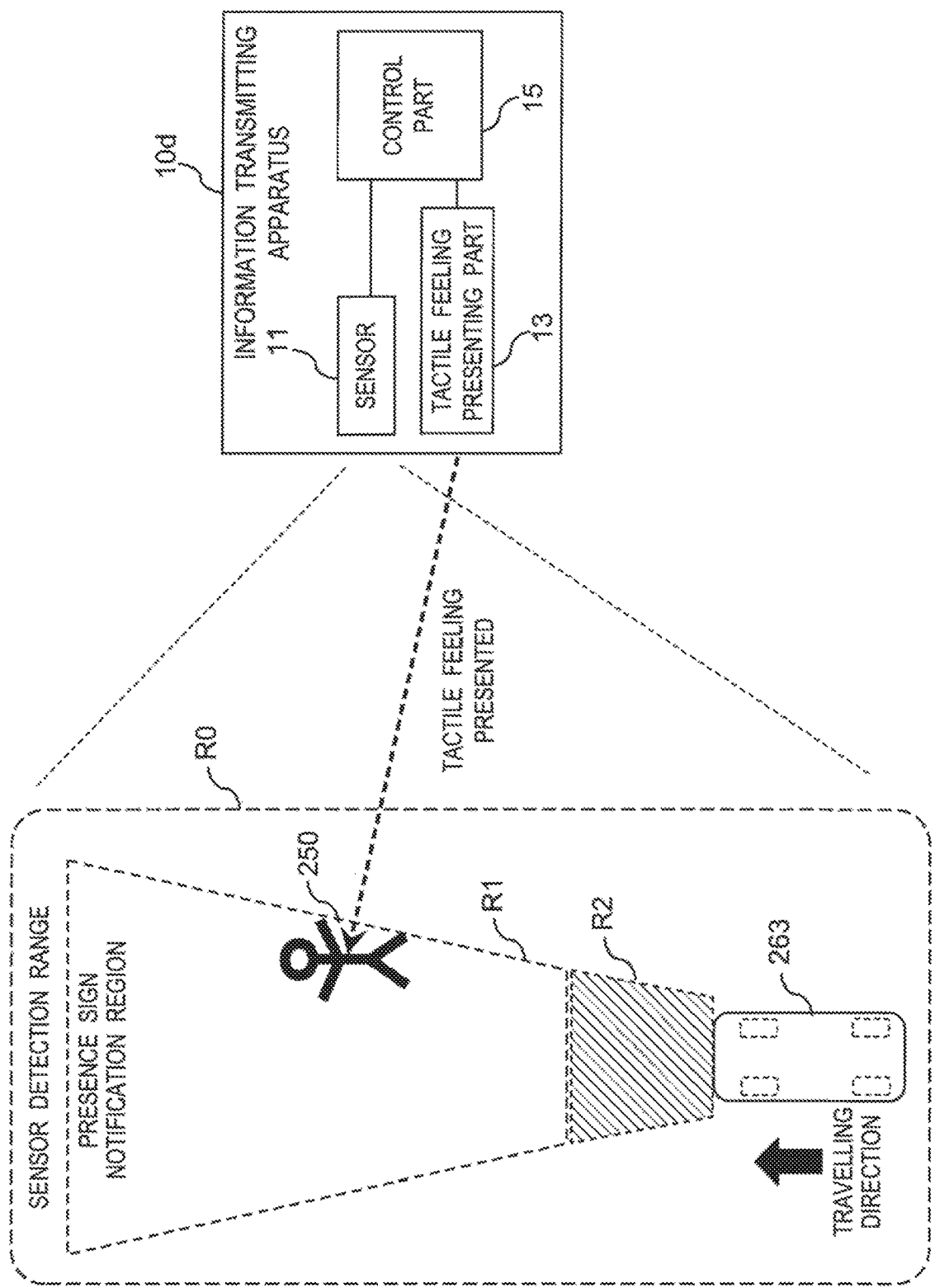
FIG. 27 is a block diagram of the configuration of the information transmitting apparatus in the seventh embodiment of this disclosure.

The presence sign notification region R1 is set in proximity to the moving vehicle 263 in the sixth embodiment. In this sixth embodiment, the presence sign notification region R1 and the no-entry region R2 are set in accordance with the motion of the moving vehicle 263. FIG. 26 is a diagram explaining the presence sign notification region R1 and the no-entry region R2 that are set by the information transmitting apparatus in the seventh embodiment. FIG. 27 is a block diagram of the configuration of the information transmitting apparatus in this embodiment. The information transmitting apparatus 10d of this embodiment has the same configuration as that of the information transmitting apparatus 10 of the fourth embodiment.

As depicted in FIG. 26 and FIG. 27, the no-entry region R2 is set in proximity to the vehicle 263 and in front thereof in the travelling direction thereof. The presence sign notification region R1 is set further in front of the no-entry region R2. The size of the no-entry region R2 may dynamically be set in accordance with the braking distance of the vehicle 263.

Similar to the above embodiments, a tactile feeling is presented to the human 250 when the human 250 enters the presence sign notification region R1.

Figure 28:
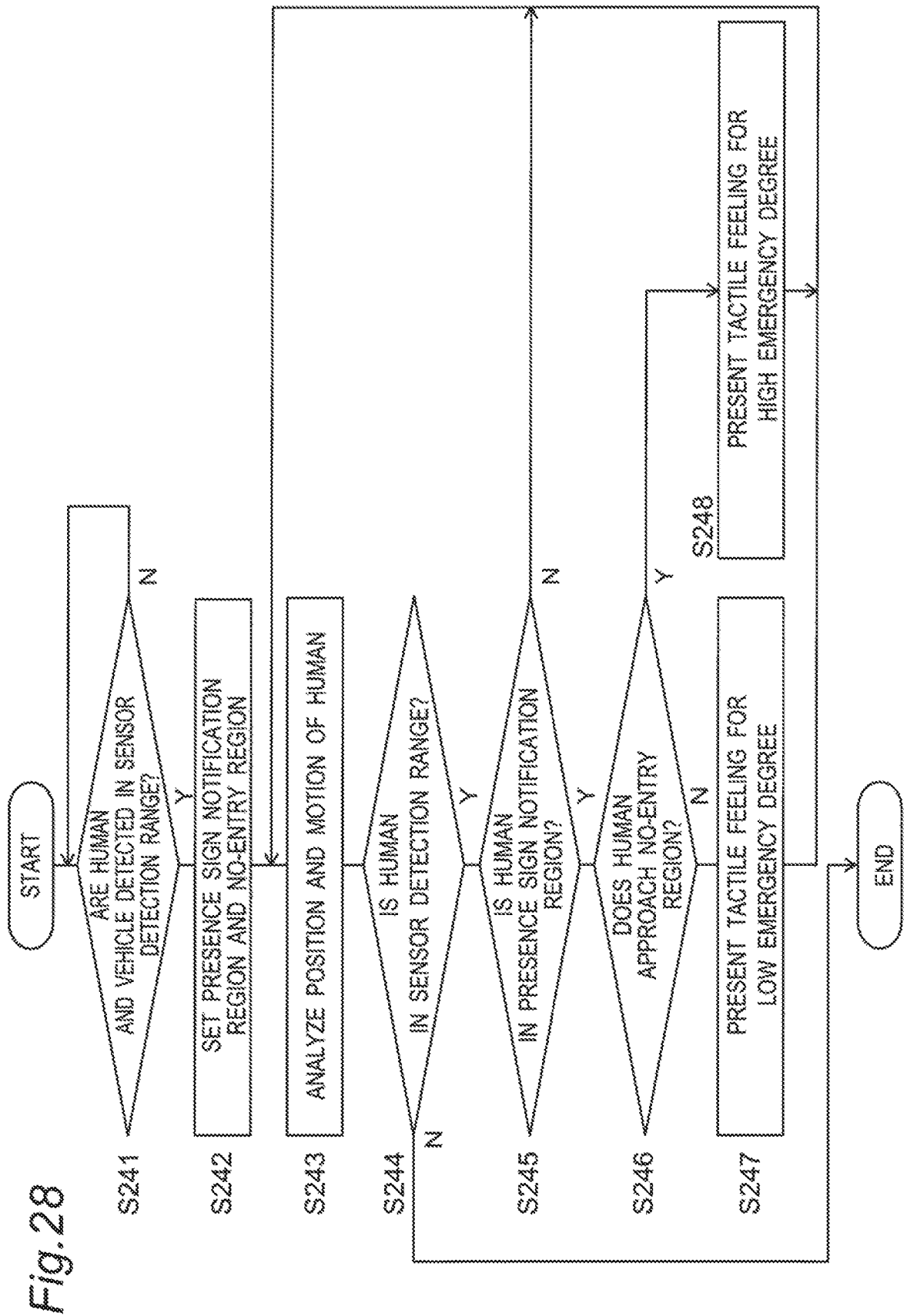
FIG. 28 is a flowchart of a warning operation of the information transmitting apparatus in the seventh embodiment.

The operations of the information transmitting apparatus 210d will be described with reference to the flowchart in FIG. 28.

In the information transmitting apparatus 10d, when the sensor 11 detects the entrance of the human 250 and the vehicle 263 into the detection range R0 (YES at S241), the control part 15 sets the presence sign notification region R1 and the no-entry region R2 (S242). The control part 15 sets a predetermined range in front of the vehicle 263 in the travelling direction thereof to be the no-entry region R2. The control part 15 further sets a predetermined range in front of the no-entry region R2 (in front of the vehicle 263 in the travelling direction thereof) to be the presence sign notification region R1.

The control part 15 receives the detection signal from the sensor 11 and analyzes the position and the motion of each of the human 250 and the vehicle 263 based on the detection signal (S243). When the human 250 and the vehicle 263 are not detected in the detection range R0 as the result of the analysis (NO at S244), this process is caused to come to an end. When the human 250 and the vehicle 263 are detected in the detection range R0 as the result of the analysis (YES at S244), the control part 15 determines whether the human 250 is detected in the presence sign notification region R1 (S245).

When the control part 15 determines that the human 250 is not detected in the presence sign notification region R1 (NO at S245), the control part 15 returns to step S243 and executes the above processes based on the output from the sensor 11.

When the control part 15 determines that the human 250 is detected in the presence sign notification region R1 (YES at S245), the control part 15 determines whether the human 250 and the no-entry region R2 approach each other (S246). The control part 15 determines whether the distance between the human 250 and the no-entry region R2 is reduced.

When the control part 15 determines that the human 250 and the no-entry region R2 approach each other (YES at S246), the control part 15 presents the tactile feeling for the high emergency degree (S248). In this case, the risk is high for the human 250 and the vehicle 263 to be brought into contact with each other and the tactile feeling for the high emergency degree is therefore presented. When the control part 15 determines that the human 250 and the vehicle 263 do not approach each other (NO at S246), the control part 15 presents the tactile feeling for the low emergency degree (S247).

The control part 15 thereafter returns to step S243 and executes the above processes based on the detection signal from the sensor 11.

As above, in this embodiment, the no-entry region R2 is set in the vicinity of the mobile vehicle (the moving machine) and the warning can therefore be made to the human 250 for the human 250 not to approach the no-entry region R2 too closely. At this time, the presentation method for the tactile feeling is changed based on the relative positional relation between the human 250 and the no-entry region R2. The human 250 can thereby sensuously recognize the fact that the no-entry region R2 approaches and the direction of the no-entry region R2, and can take a proper avoidance action against the no-entry region R2.

In this embodiment, the vehicle 263 may include a communicating apparatus to execute communication with the information transmitting apparatus 10d and the information transmitting apparatus 10d may include a communicating part to execute communication with the vehicle 263. Similar to the fifth embodiment, the information transmitting apparatus 10d may transmit an emergency stop order to stop the vehicle 263 to the vehicle 263 when the entrance of the human 250 into the no-entry region R2 is detected. The idea of this embodiment is also applicable to a mobile body that flies in the air such as a drone instead of the vehicle 263. In this case, the presence sign notification region R1 and the no-entry region R2 are set surrounding the mobile body that currently files. Each of the flying mobile body (such as, for example, a drone) and the information transmitting apparatus 10d includes a communicating apparatus to executed communication with each other. When the flying mobile body such as a drone stops its operation in accordance with the emergency stop order during its flight, the risk is present for the flying mobile body to drop. When the entrance of the human 250 into the no-entry region R2 is detected for this flying mobile body, the information transmitting apparatus 10d may therefore be adapted to transmit an emergency avoidance order (to ascend or to make a turn) for the mobile body to fly avoiding the human.

Eighth Embodiment

The configuration and the operations of the information presenting apparatus including the one sensor 11 and the one tactile feeling presenting part 13 have been described in the above embodiments. In this embodiment, the configuration and the operations of an information presenting apparatus including plural sensors 11 and plural tactile feeling presenting parts 13 will be described.

Figure 29:
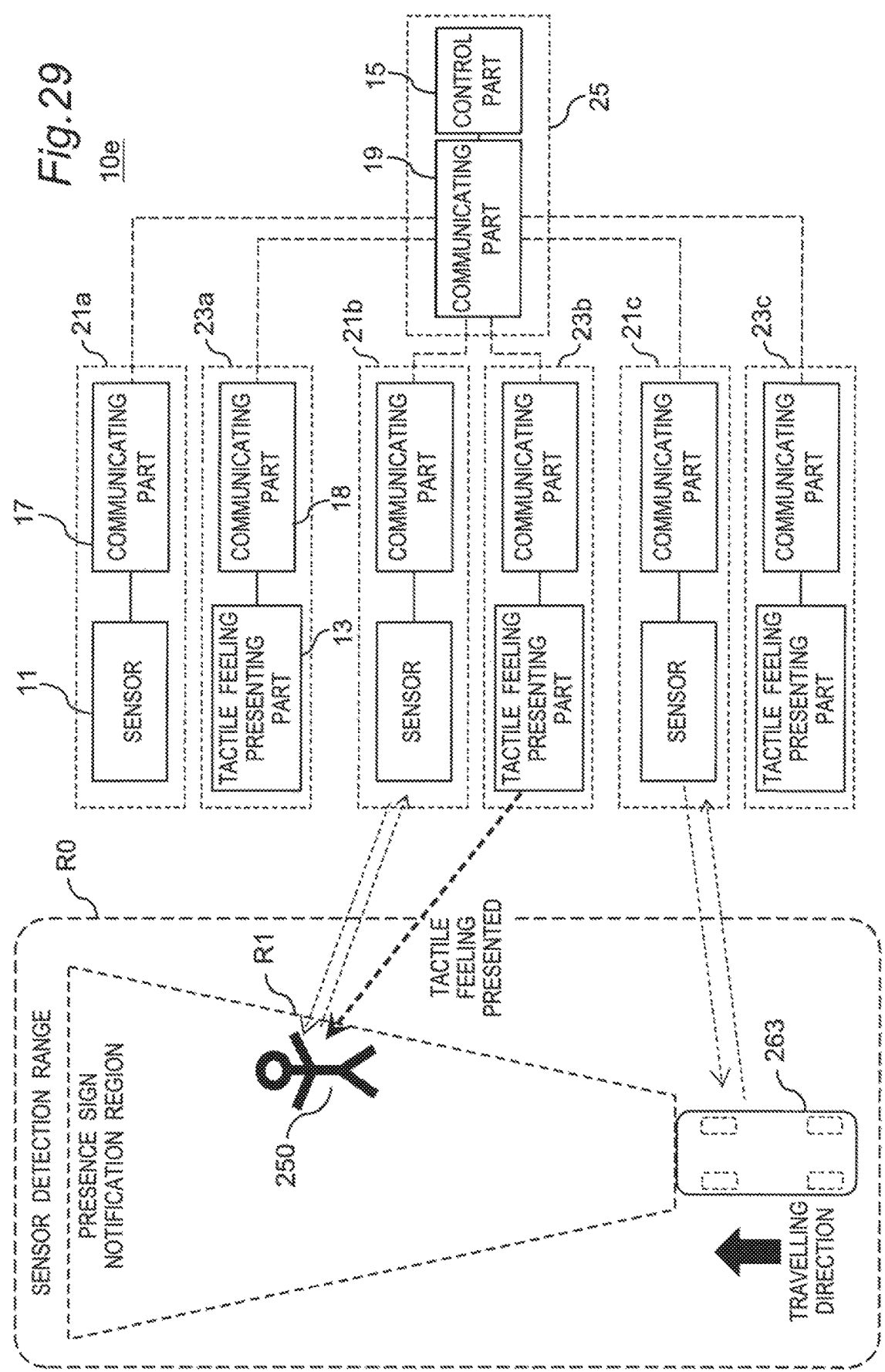
FIG. 29 is a block diagram of the configuration of an information transmitting apparatus in an eighth embodiment of this disclosure.

FIG. 29 is a block diagram of the configuration of an information transmitting apparatus 10e in the eighth embodiment. The information transmitting apparatus 10e includes plural sensor units 21a to 21c, plural tactile feeling presenting units 23a to 23c, and a control unit 25. The information transmitting apparatus 10e includes the three sensor units and the three tactile feeling presenting units in this example while the number of the units is not limited to three.

The sensor units 21a to 21c each include the sensor 11 and the communicating part 17. The sensor 11 has the configuration and the functions same as those described in the above embodiments. The communicating part 17 includes a communication module that executes communication in accordance with a communication standard such as IEEE 802.3, WIFi, or Bluetooth (a registered trademark). The communicating part 17 transmits the detection signal from the sensor 11, to the control unit 25.

The tactile feeling presenting units 23a to 23c each include the tactile feeling presenting part 13 and the communicating part 18. The tactile feeling presenting part 13 has the configuration and the functions same as those described in the above embodiments. The communicating part 18 includes a communication module that executes communication in accordance with a communication standard such as IEEE 802.3, WiFi, or Bluetooth. The communicating part 17 receives the control signal for the tactile feeling presenting part 13 from the control unit 25.

The control unit 25 includes the control part 15 and the communicating part 19. The control part 15 has the configuration same as that described in the above embodiments. The communicating part 19 includes a communication module that executes communication in accordance with a communication standard such as IEEE 802.3, WiFi, or Bluetooth. The control unit 25 executes communication with each of the sensor units 21a to 21c by radio or wired communication, and receives the detection signal from each of the sensors 11 of the sensor units 21a to 21c. The control unit 25 executes communication with each of the tactile feeling presentation units 23a to 23c by radio or wired communication, and transmits the control signal to each of the tactile feeling presenting pars 13 of the tactile feeling presentation units 23a to 23c.

The sensor units 21a, 21b, and 21c, the tactile feeling presentation units 23a, 23b, and 23c, and the control unit 25 are each independently disposed and can each be independently arranged at an optional place. For example, the sensor units 21a, 21b, and 21c, the tactile feeling presentation units 23a, 23b, and 23c are arranged at various positions in a parking lot of a facility.

Figure 30:
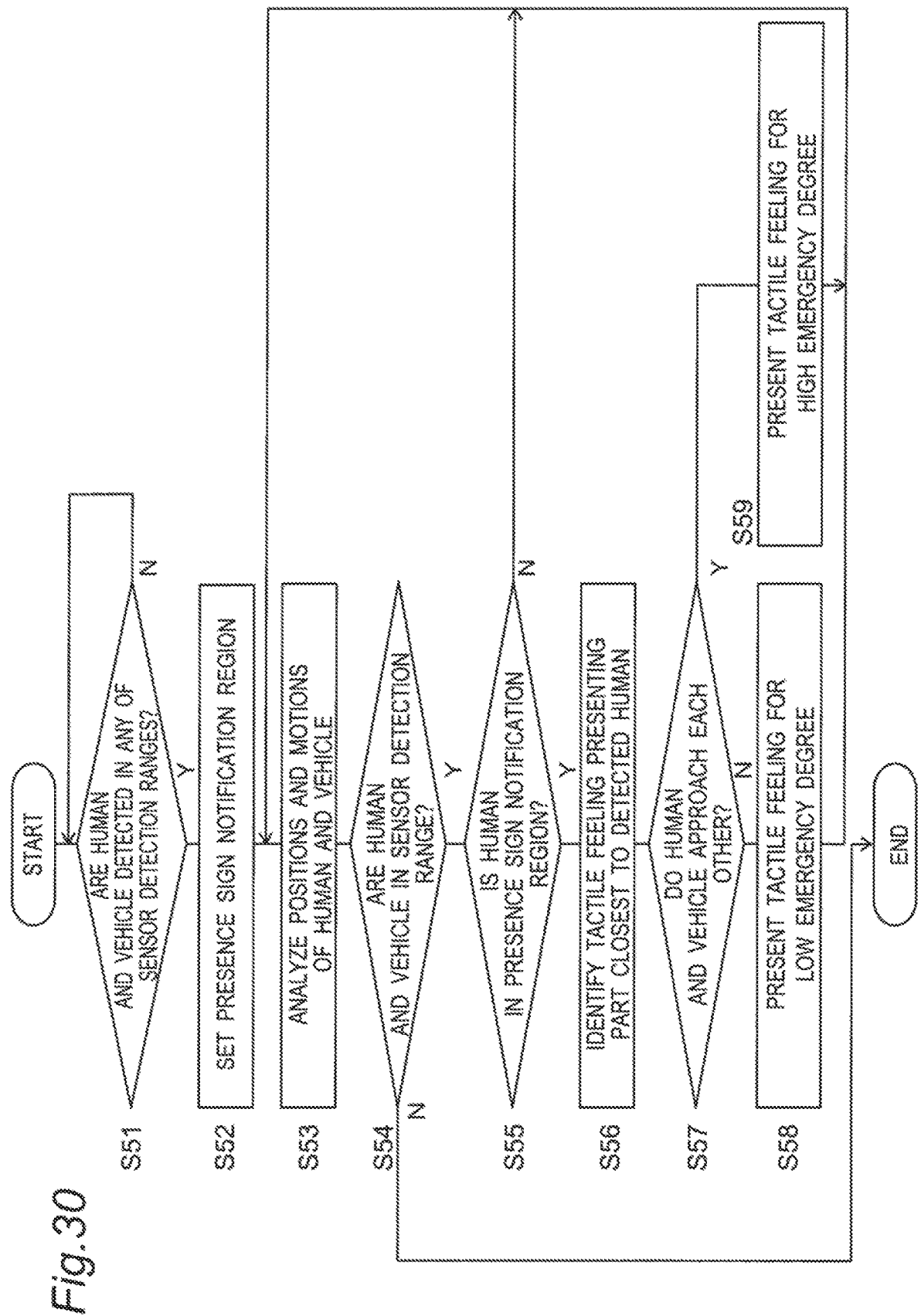
FIG. 30 is a flowchart of a warning operation of the information transmitting apparatus in the eighth embodiment.

FIG. 30 is a flowchart of operations of the information transmitting apparatus in the eighth embodiment. The operations of the information transmitting apparatus 10e will be described with reference to the flowchart in FIG. 30.

In the information transmitting apparatus 10e, when the sensor 11 of any one of the sensor units 21a to 21c detects the entrance of the human 250 and the vehicle 263 into the detection range R0 (YES at 851), the control part 15 sets the presence sign notification region R1 (S52). The control part 15 recognizes the position and the move direction of the vehicle 263 based on the detection signal from the sensor 11 and sets the presence sign notification region R1 in a predetermined region in proximity to the vehicle 263 and in front of the vehicle 263.

The control part 15 receives the detection signal from the sensor 11 and analyzes the position and the motion of each of the human 250 and the vehicle 263 based on the detection signal (S53). When the human 250 and the vehicle 263 are not detected in the detection range R0 as the result of the analysis (NO at S54), this process is caused to come to an end. When the human 250 and the vehicle 263 are detected in the detection range R0 as the result of the analysis (YES at S54), the control part 15 determines whether the human 250 is detected in the presence sign notification region R1 (S55).

When the control part 15 determines that the human 250 is not detected in the presence sign notification region R1 (NO at S55), the control part 15 returns to step S53 and executes the above processes based on the output from the sensor 11.

When the control part 15 determines that the human 250 is detected in the presence sign notification region R1 (YES at S55), the control part 15 identifies the tactile feeling presentation unit (the tactile feeling presenting part 13) arranged to be closest to the detected human 250 of the plural tactile feeling presentation units 23a to 23c (S56).

The control part 15 thereafter determines whether the human 250 and the vehicle 263 approach each other (S57). When the control part 15 determines that the human 250 and the vehicle 263 approach each other (YES at S57), the control part 15 presents the tactile feeling for the high emergency degree (S59). In this case, the risk is high for the human 250 and the vehicle 263 to be brought into contact with each other and the tactile feeling for the high emergency degree is therefore presented. When the control part 15 determines that the human 250 and the vehicle 263 do not approach each other (NO at S57), the control part 15 presents the tactile feeling for the low emergency degree (S58).

The control part 15 thereafter returns to step S53 and repeats the above processes based on the detection signal from the sensor 11.

As above, according to the information transmitting apparatus 10e of this embodiment, any risk in each of the plural regions can be notified of to the human. The information transmitting apparatus 10e of this embodiment is therefore useful for the case where the safety in a large region is secured.

Only the presence sign notification region R1 is set as the warning region in this embodiment while, similar to the second and the fourth embodiments, the no-entry region R2 may be set in addition to the presence sign notification region R1, and the same operations may be executed.

Ninth Embodiment

In this embodiment, the configuration and the operations will be described for an information transmitting apparatus loaded on a mobile machine such as a vehicle, a drone, or a transport robot. The mobile machine such as a vehicle, a drone, or a transport robot can travel forward and backward. A human and the mobile machine may therefore be brought into contact with each other in a region in front of or behind the mobile machine. The information transmitting apparatus will be described below that reduces the risk of the contact.

Figure 31:
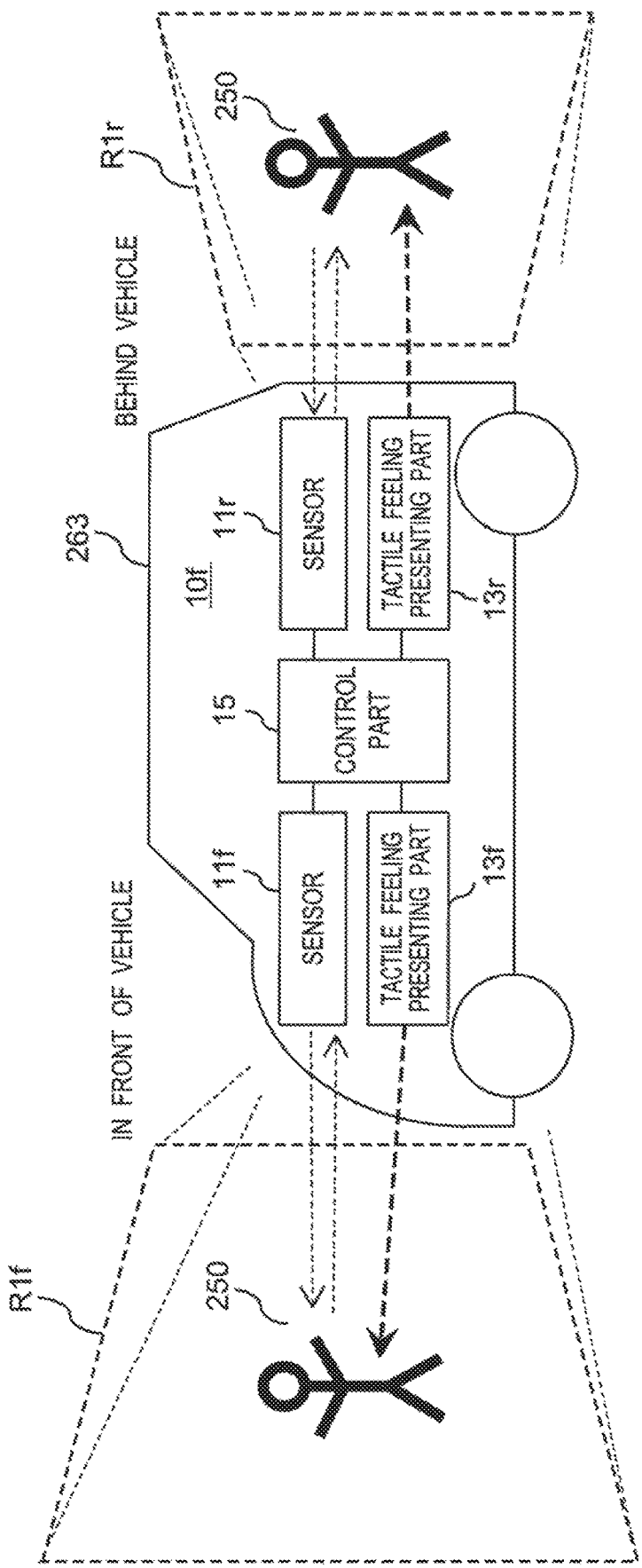
FIG. 31 is a block diagram of the configuration of an information transmitting apparatus in a ninth embodiment of this disclosure.

FIG. 31 is a block diagram of the configuration of an information transmitting apparatus 10$f$ in the ninth embodiment. The information transmitting apparatus 10$f$ is mounted on a vehicle 263 (an example of the mobile machine). The information transmitting apparatus 10$f$ includes a sensor 11$f$ and a tactile feeling presenting part 13$f$ that are disposed in the front portion of the vehicle 263, a sensor 11$r$ and a tactile feeling presenting part 13$r$ that are disposed in the rear portion of the vehicle 263, and a control part 15.

The sensor 11$f$ disposed in the front portion of the vehicle 263 has a sensor detection range on the front side of the vehicle 263. The sensor 11$r$ disposed in the rear portion of the vehicle 263 has a sensor detection range on the rear side of the vehicle 263. The tactile feeling presenting part 13$f$ disposed in the front portion of the vehicle 263 presents a tactile feeling to an object present in front of the vehicle 263. The tactile feeling presenting part 13$r$ disposed in the rear portion of the vehicle 263 presents a tactile feeling to an object present behind the vehicle 263.

Figure 32:
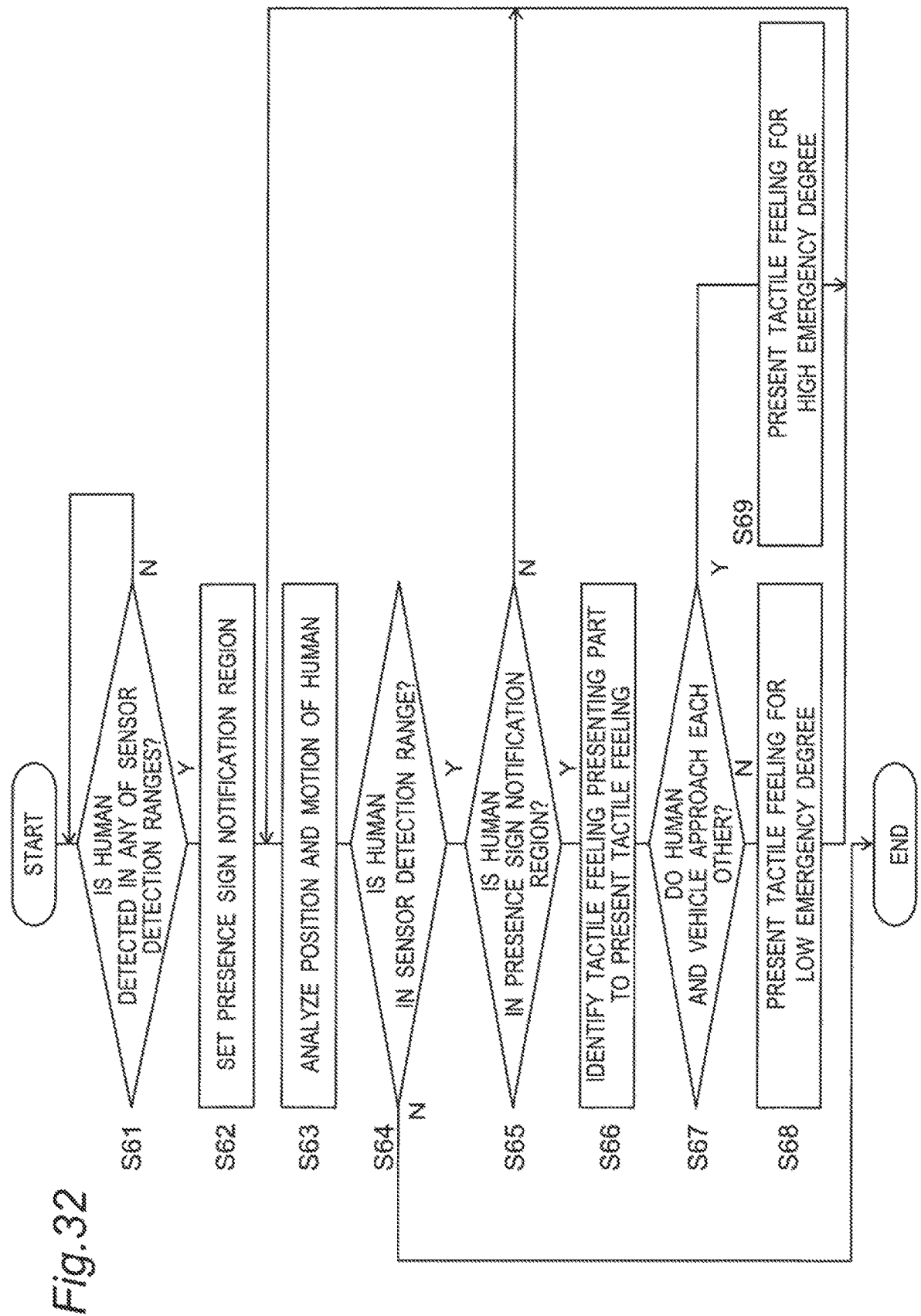
FIG. 32 is a flowchart of a warning operation of the information transmitting apparatus in the ninth embodiment.

FIG. 32 is a flowchart of operations of the information transmitting apparatus 10$f$ in the ninth embodiment. The operations of the information transmitting apparatus 10$f$ will be described with reference to the flowchart in FIG. 32.

In the information transmitting apparatus 10$f$, when at least either the sensor 11$f$ or 11$r$ detects any entry of the human 250 into the detection range R0 (YES at step S61), the control part 15 sets presence sign notification regions R1$f$ and R1$r$ (S62). The control part 15 sets the presence sign notification regions R1$f$ and R1$r$ in predetermined ranges that are regions each in the vicinity of the vehicle 263 and that are on the side for the human to be detected. In this case, the control part 15 sets the presence sign notification regions R1$f$ and R1$r$ in accordance with the position and the velocity of the human indicated by the detection signals from the sensors 11$f$ and 11$r$ that detect the human, and the velocity of the vehicle 263.

The control part 15 receives the detection signals from the sensors 11$r$ and 11$r$ that detect the human, and analyzes the position and the motion of the human 250 based on the detection signals (S63). When the human 250 is not detected in the detection ranges of the sensors 11$f$ and 11$r$ as the result of the analysis (NO at S64), this process is caused to come to an end. On the other hand, when the human 250 is detected in the detection ranges R0 as the result of the analysis (YES at S64), the control part 15 determines whether the human 250 is detected in the set presence sign notification regions R1$f$ and R1$r$ (S65).

When the control part 15 determines that the human 250 is not detected in the set presence sign notification regions R1$f$ and R1$r$ (NO at S65), the control part 15 returns to step S63 and repeats the above processes based on the output from the sensors 11.

When the control part 15 determines that the human 250 is detected in the set presence sign notification regions R1$f$ and R1$r$ (YES at S65), the control part 15 identifies the tactile feeling presentation unit arranged to be closest to the detected human 250 of the two tactile feeling presentation units 13$f$ and 13$r$ (S66).

The control part 15 thereafter determines whether the human 250 and the vehicle 263 approach each other (S67).

When the control part 15 determines that the human 250 and the vehicle 263 approach each other (YES at S67), the control part 15 presents the tactile feeling for the high emergency degree from the identified tactile feeling presenting part (S69). In this case, the risk is high for the human 250 and the vehicle 263 to be brought into contact with each other and the tactile feeling for the high emergency degree is therefore presented. When the control part 15 determines that the human 250 and the vehicle 263 do not approach each other (NO at S67), the control part 15 presents the tactile feeling for the low emergency degree from the identified tactile feeling presenting part (S58).

The control part 15 thereafter returns to step S63 and repeats the above processes based on the detection signals from the sensors 11.

As above, according to the information transmitting apparatus 10$f$ of this embodiment, any risk can be notified of to the human in the ranges in front of and behind the vehicle 263. For example, concerning each of a drone and a transport robot, the presence sign notification regions can be set not only in front and behind but also on the right and the left, and the risk can be notified of to the human in the ranges in front, behind, on the right, and on the left.

Only the presence sign notification region R1 is set as the warning region in this embodiment while, similar to the fourth embodiment, the no-entry region R2 may be set in addition to the presence sign notification regions R1, and the same notification operation may be executed.

Tenth Embodiment

The braking distance of a vehicle is generally varied in accordance with the velocity of the vehicle, the weather, and the like. For example, the braking distance becomes longer as the vehicle velocity becomes higher, and the braking distance becomes longer on a rainy day with wet road surfaces than that on a fine day. The dangerous range present surrounding the vehicle (that is, the range to which any approach of a human is unfavorable) is also varied associated with the variation of the braking distance. In this embodiment, an information transmitting apparatus will be described that varies the presence sign notification region R1 or the no-entry region R2 in accordance with the operation of a mobile machine such as a vehicle, a transport robot, or a drone, and information on the surrounding environment.

Figure 33:
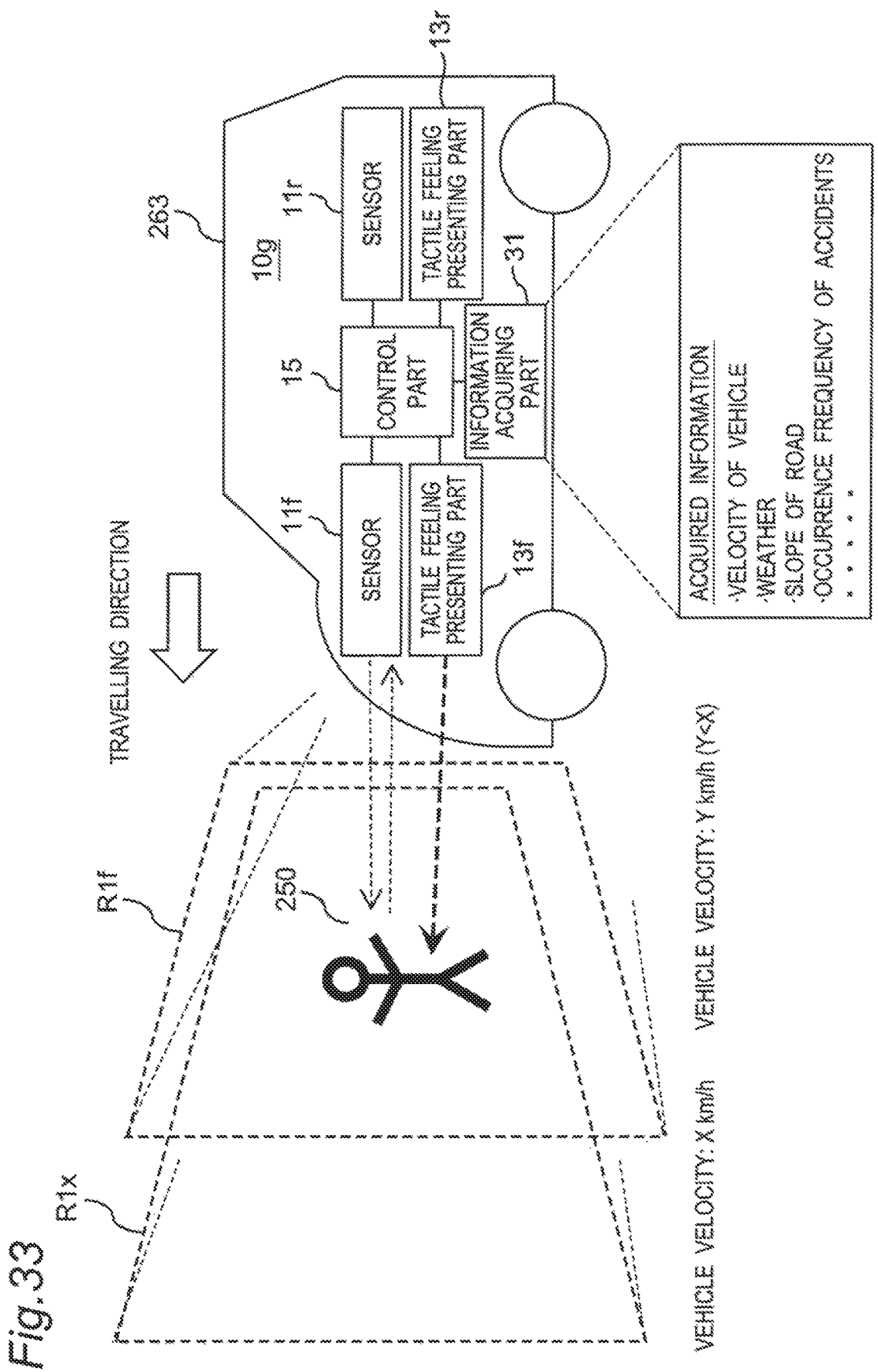
FIG. 33 is a block diagram of the configuration of an information transmitting apparatus in a tenth embodiment of this disclosure.

FIG. 33 is a block diagram of the configuration of an information transmitting apparatus 10$g$ in the tenth embodiment. In this embodiment, the description will be made taking a vehicle as an example of the mobile machine. The information transmitting apparatus 10$g$ is mounted on the vehicle 263. The information transmitting apparatus 10$g$ further includes an information acquiring part 31 in the configuration of the information transmitting apparatus 10$f$ in the ninth embodiment.

The information acquiring part 31 acquires vehicle information relating to the operations of the vehicle 263 (such as OBD2 data) and the information on the surrounding environment such as the weather and the road situation. The information acquiring part 31 includes, for example, sensors and a telemeter unit that acquire various types of operation information of the vehicle, a communication module to acquire information from the Internet, and an interface module.

The information acquiring part 31 acquires, for example, the following pieces of information.

The velocity and the acceleration of the mobile machine

The weather, the wind velocity, the wind direction (the motion of the wiper, the weather information)

The slope of the road (the car navigation information, the traffic information, and the like)

High accident areas (the car navigation information, the traffic information, and the like)

The control part 15 sets the presence sign notification region R1 and/or the no-entry region R2 based on these pieces of information. The control part 15 acquires in advance the conditions indicated by the above pieces of information, the braking distance, and the attention level, and sets in advance the presence sign notification region R1 and/or the no-entry region R2 in accordance with the braking distance and the attention level. The control part 15 can thereby set the presence sign notification region R1 and/or the no-entry region R2 that are/is suitable for the conditions indicated by the above pieces of information. For example, the braking distance becomes longer as the vehicle velocity becomes high. As depicted in FIG. 33, the braking distance necessary when the vehicle velocity is X km/h and the braking distance necessary when the vehicle velocity is Y km/h are measured in advance and the presence sign notification regions R1x and R1y suitable for the velocities are set in advance. When the vehicle velocity is Y km/h (when the velocity is relatively low), the control part 15 sets the presence sign notification region R1y that is small to cover the range relatively close to the vehicle 263. On the other hand, when the vehicle velocity is X km/h (when the velocity is relatively high), the control part 15 sets the presence sign notification region R1x that is large to be able to also cover the range relatively distant from the vehicle 263.

Figure 34:
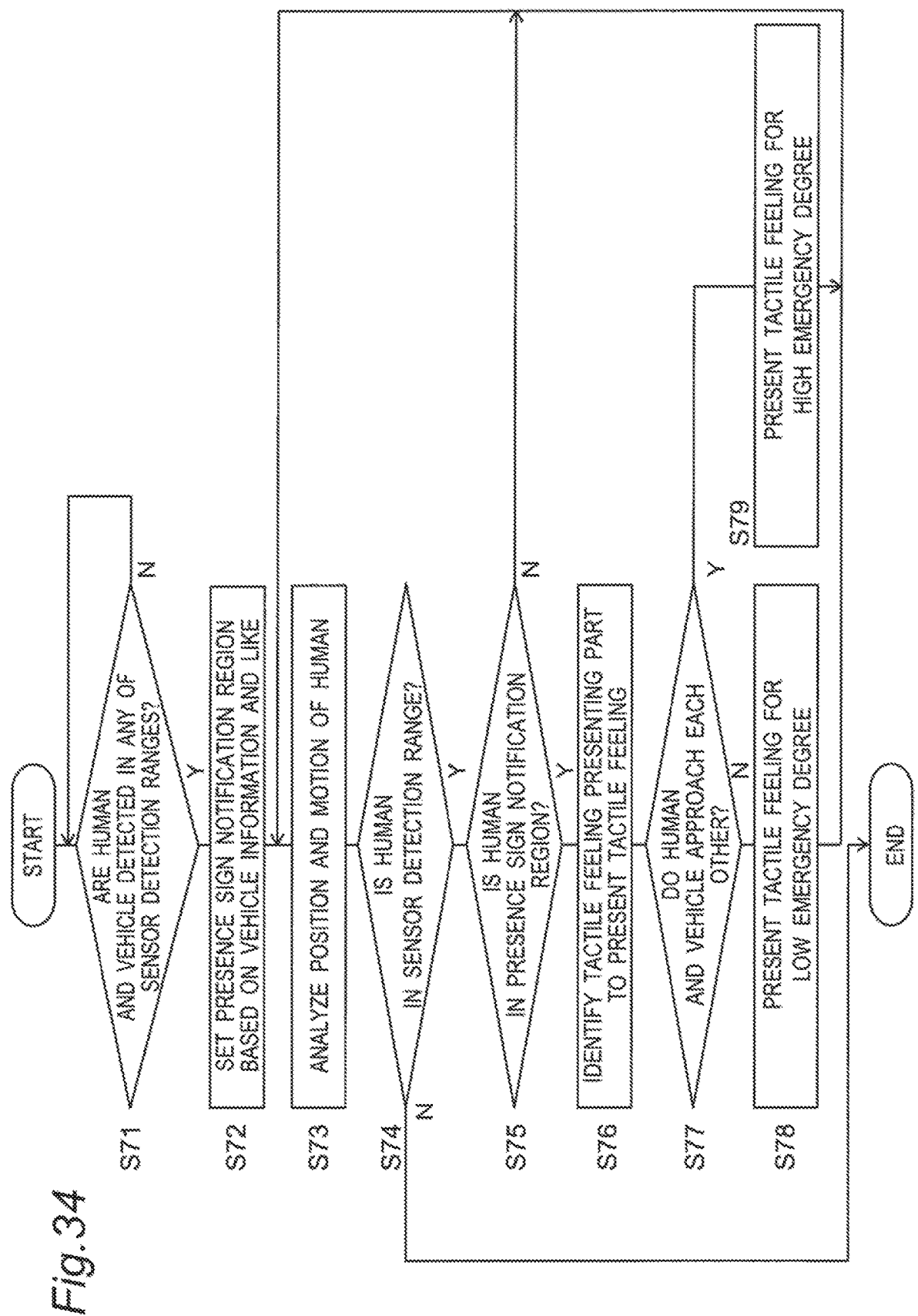
FIG. 34 is a flowchart of a warning operation of the information transmitting apparatus in the tenth embodiment.

FIG. 34 is a flowchart of operations of an information transmitting apparatus 10g in the tenth embodiment. The operations of the information transmitting apparatus 10g will be described with reference to the flowchart in FIG. 34.

In the information transmitting apparatus 10g, when at least either the sensor 11f or 11r detects any entry of the human 250 into the detection range R0 (YES at step S71), the control part 15 sets the presence sign notification region R1 (S72). The control part 15 sets the presence sign notification region R1 in a predetermined range that is a region in the vicinity of the vehicle 263 and that is on the side for the human to be detected. Especially, the control part 15 sets the presence sign notification region R1 in accordance with the position and the velocity of the human indicated by the detection signals from the sensors 11f and 11r that detect the human, and the pieces of information (such as the vehicle velocity, the weather, and the road information) acquired by the information acquiring part 31.

The control part 15 receives the detection signals from the sensors 11r and 11r that detect the human, and analyzes the position and the motion of the human 250 based on the detection signals (S73). When the human 250 is not detected in the detection ranges of the sensors 11f and 11r as the result of the analysis (NO at S74), this process is caused to come to an end. On the other hand, when the human 250 is detected in the detection ranges R0 as the result of the analysis (YES at S74), the control part 15 determines whether the human 250 is detected in the set presence sign notification regions R1 (S75).

When the control part 15 determines that the human 250 is not detected in the set presence sign notification regions R1 (NO at S75), the control part 15 returns to step S73 and repeats the above processes based on the output from the sensors 11.

When the control part 15 determines that the human 250 is detected in the set presence sign notification region R1 (YES at S75), the control part 15 identifies the tactile feeling presenting part arranged to be closest to the detected human 250 of the two tactile feeling presenting parts 13f and 13r (S76).

The control part 15 thereafter determines whether the human 250 and the vehicle 263 approach each other (S77). When the control part 15 determines that the human 250 and the vehicle 263 approach each other (YES at S77), the control part 15 presents the tactile feeling for the high emergency degree from the identified tactile feeling presenting part (S79). In this case, the risk is high for the human 250 and the vehicle 263 to be brought into contact with each other and the tactile feeling for the high emergency degree is therefore presented. When the control part 15 determines that the human 250 and the vehicle 263 do not approach each other (NO at S77), the control part 15 presents the tactile feeling for the low emergency degree from the identified tactile feeling presenting part (S78).

The control part 15 thereafter returns to step S73 and repeats the above processes based on the detection signals from the sensors 11.

As above, according to the information transmitting apparatus 10g of this embodiment, the warning region is varied in accordance with the pieces of information on the operation of the mobile machine and the surrounding environment, and the risk can therefore be notified of to the human in the suitable range in accordance with the braking distance that is varied by the operation of the mobile machine and the surrounding environment.

Only the presence sign notification region R1 is set as the warning region in this embodiment while, similar to the fourth embodiment, the no-entry region R2 may be set in addition to the presence sign notification region R1, and the same notification operation may be executed.

In each of the fourth to the tenth embodiments, the emergency degree is determined in the two stages of "high" and "low" while the emergency degree may be set in more stages (or in a continuous manner). For example, the emergency degree may be more minutely set in accordance with the distance from the outer circumference of the presence sign notification region R1 or that of the non-entry region R2 to the human 250. In this case, the strength of the tactile feeling, the frequency of the tactile feeling, and/or the presentation position of the tactile feeling each only have to be minutely varied in accordance with the emergency degree.

The emergency degree is determined based on the move direction of the human in each of the fourth to the tenth embodiments while the emergency degree may be determined taking into consideration the move velocity of the human in addition to the move direction of the human or instead thereof. For example, in the first embodiment, when it is detected that the human 250 moves in the direction for the human 250 to be distant from the outer circumference of the presence sign notification region R1, in the presence sign notification region R1 (that is, that the human 250 approaches the dangerous target 261), it is determined that the emergency degree becomes higher as the move velocity becomes higher, and a stronger tactile feeling may be presented in accordance with the emergency degree. In the case where the human 250 moves toward the outer circumference of the presence sign notification region R1, in the presence sign notification region R1, when it is detected (that the human 250 becomes distant from the dangerous target 261), it is determined that the emergency degree becomes lower as the move velocity becomes higher, and a weaker tactile feeling may be presented in accordance with the emergency degree. Not only the strength of the tactile feeling but also the frequency of the tactile feeling and the presentation position of the tactile feeling may be varied based on the move velocity.

In each of the fourth to the tenth embodiments, the type of the tactile feeling may be changed as the change of the presentation method for the tactile feeling. For example, a tactile feeling by an ultrasonic wave may be presented when the emergency degree is low, and a tactile feeling by an air flow may be presented when the emergency degree is high. (This Disclosure 2)

The fourth to the tenth embodiments disclose the following technical ideas.

(1) The above embodiments disclose information presenting apparatuses (10 to 10g) that each include a sensor (11) capable of detecting the position and the velocity of an object (such as a human or a vehicle) entering a predetermined region (R0), a tactile feeling presenting part (13) presenting a tactile feeling in a non-contact manner to a target object (such as a human), and a control part (15) controlling the tactile feeling presenting part (13) to present the tactile feeling to the detected human when the sensor (11) detects the human in warning regions (R1 and R2) set in predetermined regions. The control part (15) determines the presentation method for the tactile feeling to be presented by the tactile feeling presenting part (13) based on the behavior (the move direction, the move velocity, and the like) of the human in the warning region.

(2) In (1), the control part may vary at least one of the type, the strength, the frequency, and the temperature of the tactile feeling, and the site of the body of the human to whom the tactile feeling is presented, as a change of the presentation method for the tactile feeling.

(3) In (1), the control part (15) may detect the behavior of the human in the warning region based on the relative distance of the human detected by the sensor (11) relative to the outer circumference of the warning region and/or the velocity of the human.

(4) In (1), the information transmitting apparatus (10b) may further include a communicating part (16) that communicates with an external apparatus (262). The warning region may include a first region (R1) and a second region (R2). When the sensor (11) detects the human in the first region (R1), the control part (15) may present the tactile feeling to the human and, when the sensor (11) detects the human in the second region (R2), may transmit a control order to urgently stop the external apparatus, to the external apparatus through the communicating part (16).

(5) In (1), the sensor (11) may detect the position and the velocity of the apparatus (262) in addition to the human (250) in a predetermined region (R0). When the sensor (11) detects the human and the apparatus in the predetermined region (R0) and further detects the human in the warning region (R1), the control part (15) may control the tactile feeling presenting part (13) to present the tactile feeling to the detected human. The control part (15) may change the presentation method for the tactile feeling based on the behavior of the human detected in the warning region (R1) and the behavior of the apparatus (262).

(6) In (5), the control part (15) may detect the behavior of the human (250) and the behavior of the apparatus (262) based on a relative distance and/or the relative velocity of the apparatus relative to the human detected by the sensor (11).

(7) In (5), a communicating part (16) communicating with the apparatus (262) may further be included. The warning region may include the first region (R1) and the second region (R2). When the sensor (11) detects the human in the first region (R1), the control part (15) may present the tactile feeling to the human and, when the sensor (11) detects the human in the second region (R2), may transmit a control order to urgently stop the apparatus (62) to the apparatus through the communicating part (S30).

(8) In (4) or (7), the control part (15) may detect the behavior of the human based on the distance between the detected human and the second region (R2).

(9) in (4) or (7), the control part (15) may set the strength of the tactile feeling and/or the frequency of the variation of the tactile feeling to be presented to the human, to be higher as the human becomes closer to the second region (R2).

(10) In (1), the information transmitting apparatus (10e) may include plural sensors (11) and plural tactile feeling presenting parts (13). The control part (15) may control the tactile feeling presenting parts (13) to present the tactile feeling from the tactile feeling presenting part closest to the detected human.

(11) in (1), the information transmitting apparatus (10g) may further include an information acquiring part (31) that acquires predetermined information. The control part (15) may set the range(s) of the warning region(s) (the first region (R1) and/or the second region (R2)) based on the information acquired from the information acquiring part (31).

(12) in (10), the predetermined information may include at least any one of the velocity of a moving apparatus (such as a vehicle, a transport robot, or a drone), the weather, and the traffic information.

(13) in any one of (1) to (12), the tactile feeling presenting part (13) may present the tactile feeling using an acoustic radiation pressure or an air flow.

(14) in (13), the control part (15) may vary the strength, the frequency, and/or the temperature of the acoustic radiation pressure or the air flow based on the behavior of the human in the warning region.

(15) The above embodiments further disclose an information transmission method.

The information transmission method includes a step of detecting whether a human enters warning regions (R1 and R2), a step of presenting a tactile feeling using a tactile feeling presenting part (13) to a detected human when the sensor (11) detects the human in the warning region, and a step of varying the type and/or the position of the tactile feeling to be presented by the tactile feeling presenting part based on the behavior (the move direction, the move velocity, and the like) of the human in the warning region.

INDUSTRIAL APPLICABILITY

According to the gesture input system of this disclosure, the convenience for a gesture operation can be improved and the gesture input system is therefore useful as an input means for each of various types of electronic device. The gesture input system is useful as an input means of, for example, a personal computer, a car navigation apparatus, an air conditioner, an audio apparatus, or a gaming machine.

According to the information transmitting apparatus of this disclosure, when a human approaches or enters a region or an apparatus to which any approach of a human needs to be avoided or into which any entrance is desired to be prevented, a warning using a tactile feeling can be presented to the human. The information transmitting apparatus of this disclosure is therefore useful for an apparatus that presents a warning to a human entering a predetermined region.

EXPLANATIONS OF LETTERS OR NUMBERS 1, sensor
2 input control apparatus
3 tactile feeling presenting apparatus
21 control part
22 storage part
50 hand of a user
51 chasing point
53 input acceptable area
61 base point
63 tactile feeling presentation area
100 gesture input system
200 electronic device (target of control)
300 information processing apparatus
311 controller
313 displaying part
323 tactile feeling presenting part

The invention claimed is:

1. A gesture input system that accepts a user operation based on a motion of a portion of a body of a user and that produces an input signal indicating a direction of the motion and/or an amount of the motion of the portion of the body, the gesture input system comprising:
   a sensor that detects the motion of the portion of the body of the user;
   a tactile feeling presenting apparatus that presents a tactile feeling at a base point set inside a space; and
   a control apparatus that sets a chasing point on the portion of the body detected by the sensor, the control apparatus producing an input signal based on a variation of a relative positional relation between the chasing point and the base point, wherein
   the tactile feeling presenting apparatus continuously presents the tactile feeling at the base point during a time period for the gesture input system to be in an input acceptable state where the gesture input system is able to accept the user operation, and
   wherein
   in a time period during which the input acceptable state is not established, when the sensor detects a predetermined motion of the portion of the body of the user, the control apparatus sets the base point inside a space, sets the gesture input system to be in the input acceptable state, and thereafter fixes a position of the base point until the base point is again set.

2. The gesture input system according to claim 1, wherein the base point is set on the portion of the body of the user.

3. An electronic device comprising the gesture input system according to claim 2.

4. The gesture input system according to claim 1, wherein the tactile feeling presenting apparatus present the tactile feeling in a tactile feeling presentation area that is a predetermined range including the base point inside the space.

5. The gesture input system according to claim 4, wherein the control apparatus sets an input acceptable area on the portion of the body, sets the gesture input system to be in the input acceptable state when at least a portion of the input acceptable area overlaps on the tactile feeling presentation area, and
   sets the gesture input system to be in an input unacceptable state where the user operation is not accepted when the input acceptable area does not overlap on the tactile feeling presentation area.

6. The gesture input system according to claim 5, wherein the tactile feeling presenting apparatus stops the presentation of the tactile feeling when the gesture input system is in the input unacceptable state.

7. An electronic device comprising the gesture input system according to claim 6.

8. The gesture input system according to claim 5, wherein the control apparatus varies a rate of a variation of an amount of a motion indicated by the input signal to an actual motion of the portion of the body in accordance with a position of the chasing point in the tactile feeling presentation area.

9. An electronic device comprising the gesture input system according to claim 8.

10. An electronic device comprising the gesture input system according to claim 5.

11. An electronic device comprising the gesture input system according to claim 4.

12. The gesture input system according to claim 1, wherein
   the tactile feeling presenting apparatus presents the tactile feeling using an acoustic radiation pressure or an air flow.

13. An electronic device comprising the gesture input system according to claim 12.

14. An electronic device comprising the gesture input system according to claim 1.

15. A gesture input method of accepting a user operation based on a motion of a portion of a body of a user and producing an input signal indicating a direction of the motion and/or an amount of the motion of the portion of the body, the gesture input method comprising the steps of:
   detecting the motion of the portion of the body of the user using a sensor;
   presenting a tactile feeling at a base point set inside a space, using a tactile feeling presenting apparatus;
   setting a chasing point on the portion of the body detected by the sensor, using a control apparatus; and
   producing the input signal based on a variation of a relative positional relation between the chasing point and the base point, using the control apparatus, wherein
   the tactile feeling presenting apparatus continuously presents the tactile feeling at the base point during a time period for an input acceptable state where the user operation is acceptable to be established, and
   wherein
   in a time period during which the input acceptable state is not established, when a predetermined motion of the portion of the body of the user is detected by the sensor, using the control apparatus, setting the base point inside a space, setting the gesture input system to be in the input acceptable state, and thereafter fixing a position of the base point until the base point is again set are executed.

* * * * *